United States Patent
Haartsen et al.

(10) Patent No.: US 11,956,084 B2
(45) Date of Patent: Apr. 9, 2024

(54) WIRELESS STEREO HEADSET WITH BIDIRECTIONAL DIVERSITY

(71) Applicant: Dopple IP B.V., Emmen (NL)

(72) Inventors: Jacobus Cornelis Haartsen, Rolde (NL); Tjapko Uildriks, Anderen (NL); Aalbert Stek, Emmen (NL)

(73) Assignee: DOPPLE IP B.V., Emmen (NL)

( * ) Notice: Subject to any disclaimer, the term of this patent is extended or adjusted under 35 U.S.C. 154(b) by 847 days.

(21) Appl. No.: 16/957,777

(22) PCT Filed: Jun. 27, 2019

(86) PCT No.: PCT/EP2019/067219
§ 371 (c)(1),
(2) Date: Jun. 25, 2020

(87) PCT Pub. No.: WO2020/259841
PCT Pub. Date: Dec. 30, 2020

(65) Prior Publication Data
US 2023/0030553 A1    Feb. 2, 2023

(51) Int. Cl.
*H04L 1/1829* (2023.01)
*H04L 1/1809* (2023.01)
*H04R 1/08* (2006.01)
*H04R 1/10* (2006.01)
*H04R 5/033* (2006.01)
*H04W 84/18* (2009.01)

(52) U.S. Cl.
CPC .......... *H04L 1/1864* (2013.01); *H04L 1/1809* (2013.01); *H04R 1/08* (2013.01); *H04R 1/1041* (2013.01); *H04R 5/033* (2013.01); *H04R 2201/107* (2013.01); *H04R 2420/07* (2013.01); *H04W 84/18* (2013.01)

(58) Field of Classification Search
CPC ..... H04L 1/1864; H04L 1/1809; H04L 69/14; H04L 1/1896; H04L 69/40; H04R 1/08; H04R 1/1041; H04R 5/033; H04R 2201/107; H04R 2420/07; H04R 1/1016; H04W 84/18; H04W 76/19; H04W 4/80
USPC ........................................................ 455/41.3
See application file for complete search history.

(56) References Cited

U.S. PATENT DOCUMENTS

2018/0084456 A1    3/2018  Gostev et al.
2019/0327778 A1*  10/2019  Morris ..................... H04W 4/70

* cited by examiner

*Primary Examiner* — Eugene Yun
(74) *Attorney, Agent, or Firm* — COATS & BENNETT, PLLC

(57) ABSTRACT

A communication protocol provides improved bidirectional communication performance between a wireless stereo headset (12) and a host device (19). The communication protocol provides communication paths between the host device (19) and each ear piece (12a, 12b) of the wireless stereo headset (12), as well as a communication path (17) between the two ear pieces (12a, 12b). In addition to receiving audio information from the host device (19), each ear piece (12a, 12b) may request audio information from the other ear piece (12b, 12a), thus obtaining path diversity in the downlink. One ear piece (12a, 12b) may acknowledge the host device (10) for a correctly received packet, which the other ear piece (12a, 12b) missed, avoiding retransmissions. The ear pieces (12a, 12b) may exchange picked-up voice content to send to the host device (19), providing for path diversity in the uplink.

34 Claims, 39 Drawing Sheets

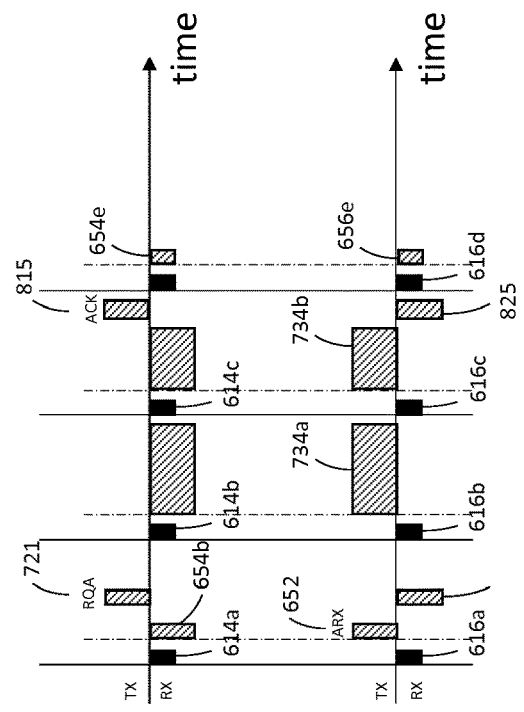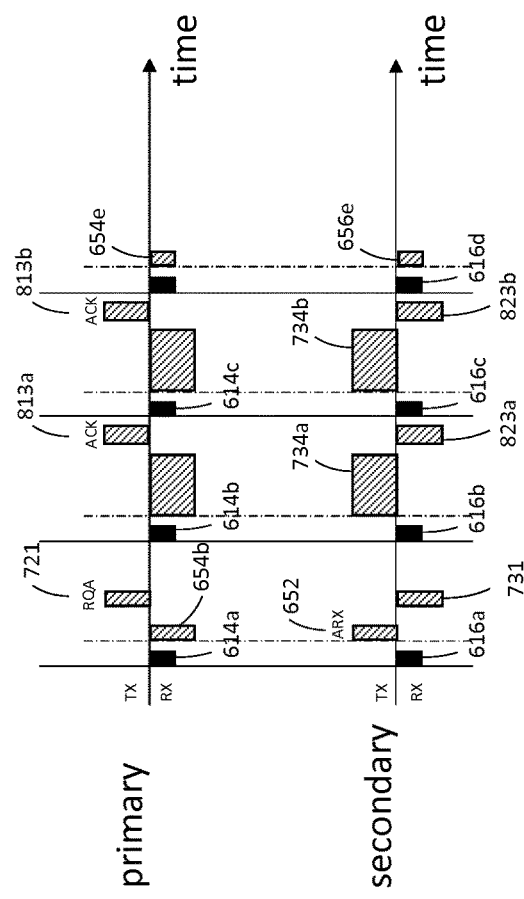
FIG. 8A
FIG. 8B

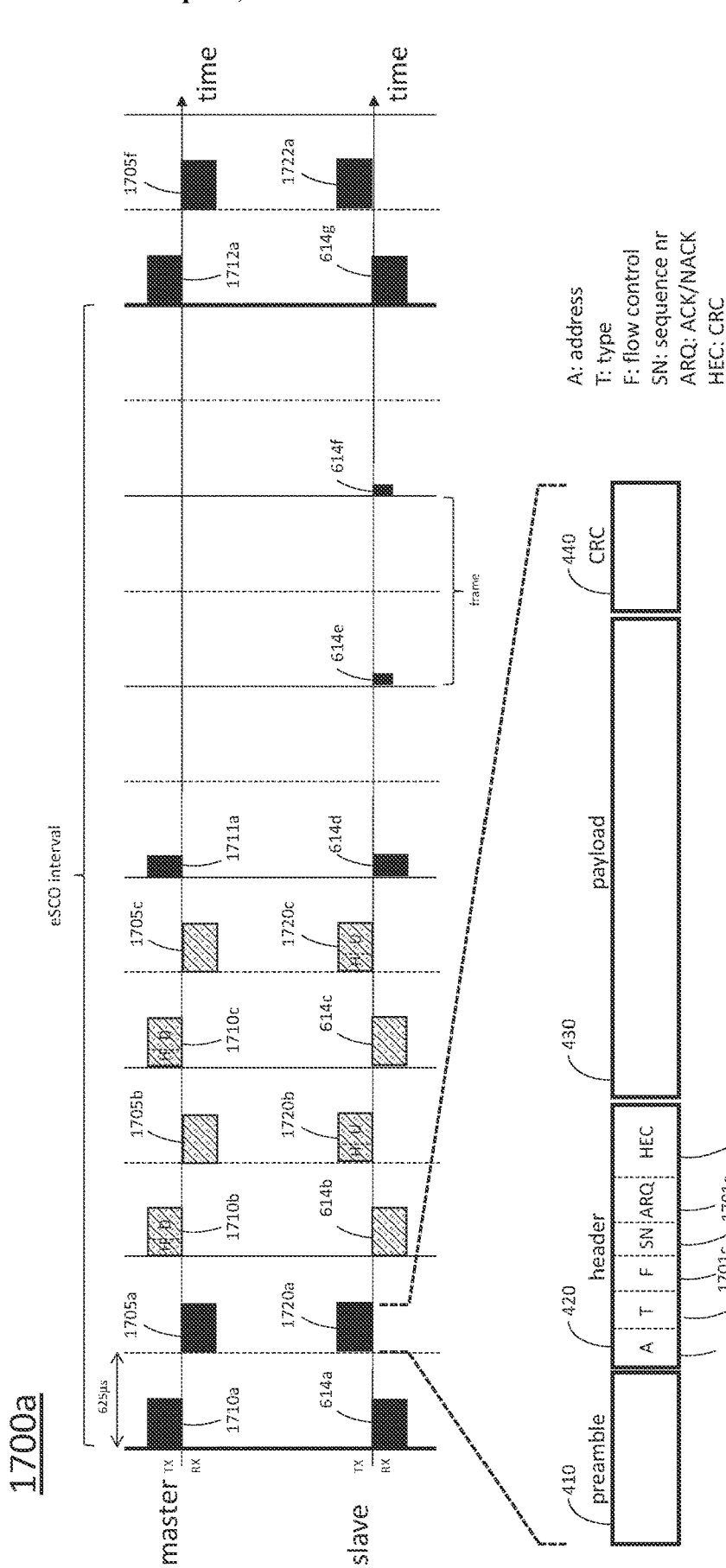

WIRELESS STEREO HEADSET WITH BIDIRECTIONAL DIVERSITY

TECHNICAL FIELD

The present invention relates generally to audio devices and in particular to truly wireless stereo headsets with robust radio performance in both forward and reverse links.

BACKGROUND

The use of headsets wirelessly connected to host devices like smartphones, laptops, and tablets is becoming increasingly popular. Whereas consumers used to be tethered to their electronic device with wired headsets, wireless headsets are gaining more traction due to the enhanced user experience, providing the user more freedom of movement and comfort of use. Further momentum for wireless headsets has been gained by certain smartphone manufacturers abandoning the implementation of the 3.5 mm audio jack in the smartphone, and promoting voice communications and music listening wirelessly, for example by using Bluetooth® technology.

Wireless headsets typically have a radio transceiver in one ear piece (for example the right ear piece), supporting the communication between the headset and the host device. Since the radio transceiver receives the stereo channels for both the left and right ear, one of the audio channels must be transferred to the other ear piece. This is typically achieved by a galvanic connection, such as a cable or a wire carrying currents and/or voltage signals.

Radio signals tend to be disturbed during propagation from the host device to the headset. Obstacles come between these two, blocking the radio waves and resulting in a Non-Line-of-Sight (NLOS) propagation condition. This is typically encountered when the user is outdoors and his body comes between the host device, such as a smartphone's wireless transceiver, and the headset wireless transceiver. Radio waves are greatly attenuated when they propagate through human tissue. In indoor environments, the radio waves usually reflect from surfaces such as walls and ceiling, thus finding alternative radio paths between the host device and the headset.

More recently, so called truly wireless headsets have appeared on the market. These wireless headsets lack a galvanic connection between the ear pieces, resulting in a product consisting of two completely separate ear pieces. The host device typically communicates the stereo information to one ear piece wirelessly; forwarding of an audio channel to the other ear piece also occurs wirelessly. Technologies used for the ear-to-ear (e2e) communication can comprise magnetic coupling using near-field communications, or can be based on radio frequency (RF). In the latter case, each ear piece contains a radio transceiver. Since in truly wireless headsets, the host device still communicates with only one ear piece, the same propagation challenges are encountered when used outdoors. Wireless headsets with improved radio performance are therefore desirable.

The Background section of this document is provided to place embodiments of the present invention in technological and operational context to assist those of skill in the art in understanding their scope and utility. Unless explicitly identified as such, no statement herein is admitted being prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, novel and nonobvious aspects of a communication protocol provide improved communication performance between a wireless stereo headset and a host device. The communications protocol provides communication paths between the host device and at least one ear piece of the wireless stereo headset, as well as a communication path between the two ear pieces of the wireless stereo headset. In addition to receiving and transmitting bidirectional audio information from the host device, such as voice content, each ear piece may request audio information from the other ear piece, and send audio information to the host device, thus obtaining path (also called space) diversity. Using special control messages on the connection between the ear pieces, the ear pieces inform each other which audio information has been successfully received from or transmitted to the host device. Using a common clock broadcast by the host device, the ear pieces may indicate which audio information was missed or remains to be sent, and should be forwarded on the communication path between the two ear pieces. Using special control messages on the connection between the ear pieces and knowledge of the success or failure of the audio information reception/transmission, either ear piece can send an acknowledgement to the host device, as well as audio information, such as voice content.

In one embodiment, the communication path between the two ear pieces utilizes an RF connection, reusing the radio transceiver also used by ear pieces to communicate with the host device. Time multiplexing is used by the radio transceivers in the ear pieces to either communicate with the host device or communicate with each other. In another embodiment, the communication path between the two ear pieces utilizes magnetic coupling, applying the Near Field Magnetic Induction (NFMI) technology. In this case, since the connection between the two ear pieces operates at a completely different carrier frequency than that used on the connection to the host device, and in addition uses transceivers different from the transceivers used on the connection to the host device, no time multiplexing is required. In yet another embodiment, the communication path between the two ear pieces utilizes a wire. A digital modem is used to transmit and receive packets between the two ear pieces. In this case also, since the connection between the two ear pieces operates at a completely different carrier frequency than used on the connection to the host device, and in addition uses transceivers different from the transceivers used on the connection to the host device, no time multiplexing is required.

One embodiment relates to a method of receiving and transmitting voice content in a wireless stereo headset comprising first and second ear pieces. The ear pieces have a bidirectional communication channel between them. A bidirectional communication channel is established between the first ear piece and a host device over a first wireless communication piconet. The first wireless communication piconet is monitored, by both the first and second ear pieces, for voice content from the host device. The second ear piece correctly receives a first packet of voice content transmitted by the host device on the first wireless communication piconet. In response to not receiving from the first ear piece, within a predetermined duration, an indication that the first ear piece successfully received the first packet of voice content, the second ear piece transmits an acknowledgement of the first packet of voice content to the host device to prevent a retransmission of the first packet of audio content by the host device; transmits a second packet of voice content picked up in the headset to the host device; and sends an indication to the first ear piece that the second ear piece successfully received the first packet of voice content.

Another embodiment relates to a wireless stereo headset comprising first and second ear pieces, and a bidirectional communication channel between the first and second ear pieces. The second ear piece includes a first transceiver adapted to: monitor a first wireless communication piconet, established between the first ear piece and a host device, for voice content from the host device; correctly receive a first packet of voice content from the host device on the first wireless communication piconet; and, in response to a failure of the first ear piece to have correctly received the first packet, transmit to the host device, on the first wireless communication piconet, an acknowledgement of the first packet of voice content and a second packet of voice content picked up in the headset.

BRIEF DESCRIPTION OF THE DRAWINGS

The present invention will now be described more fully hereinafter with reference to the accompanying drawings, showing several embodiments of the invention. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIGS. 8A and 8B are data flow and timing diagrams of e2e link control signaling in the first communication protocol.

FIG. 17A is a data flow and timing diagram of a voice protocol deployed in the Bluetooth® Classic wireless standard.

DETAILED DESCRIPTION

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Electronic devices, such as mobile phones and smartphones, are in widespread use throughput the world. Although the mobile phone was initially developed for providing wireless voice communications, its capabilities have been increased tremendously. Modern mobile phones can access the worldwide web, store a large amount of video and music content, include numerous applications ("apps") that enhance the phone's capabilities (often taking advantage of additional electronics, such as still and video cameras, satellite positioning receivers, inertial sensors, and the like), and provide an interface for social networking. Many smartphones feature a large screen with touch capabilities for easy user interaction. In interacting with modern smartphones, wearable headsets are often preferred for enjoying private audio, for example voice communications, music listening, or watching video, thus not interfering with or irritating other people sharing the same area. Because it represents such a major use case, embodiments of the present invention are described herein with reference to a smartphone, or simply "phone" as the host device. However, those of skill in the art will readily recognize that embodiments described herein are not limited to mobile phones, but in general apply to any electronic device capable of providing audio content.

Figure 1:
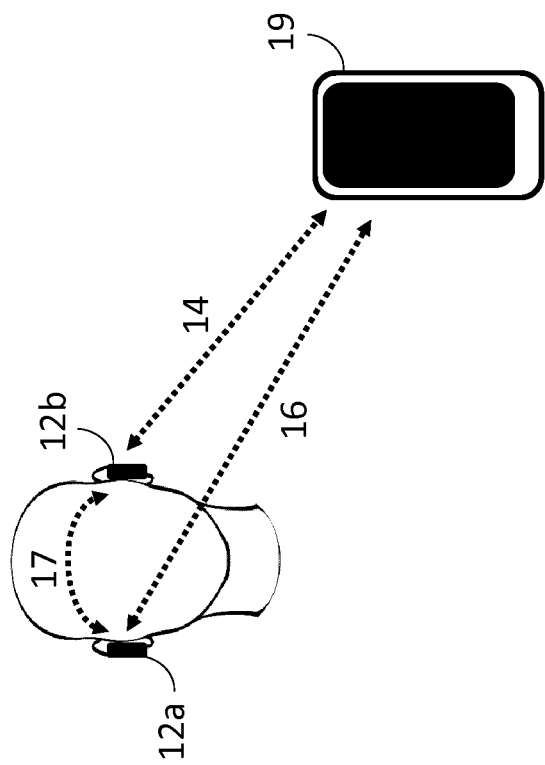
FIG. 1 shows a high-level block diagram of an exemplary use scenario of a user wearing a wireless stereo headset and wirelessly receiving audio content from a host device.

FIG. 1 depicts a typical use case 10, in which a host device 19, such as a smartphone, contains audio content which can stream over wireless connection 14 and/or 16 towards the right ear piece 12a and/or left ear piece 12b of the headset 12. Headset 12 can consist of two separate ear pieces, or the ear pieces may be connected via a string, which may be insulating or conducting. Communication between the ear pieces 12a, 12b (ear-to-ear or e2e communications) is provided via connection 17 which can be wired or wireless.

Figure 2:
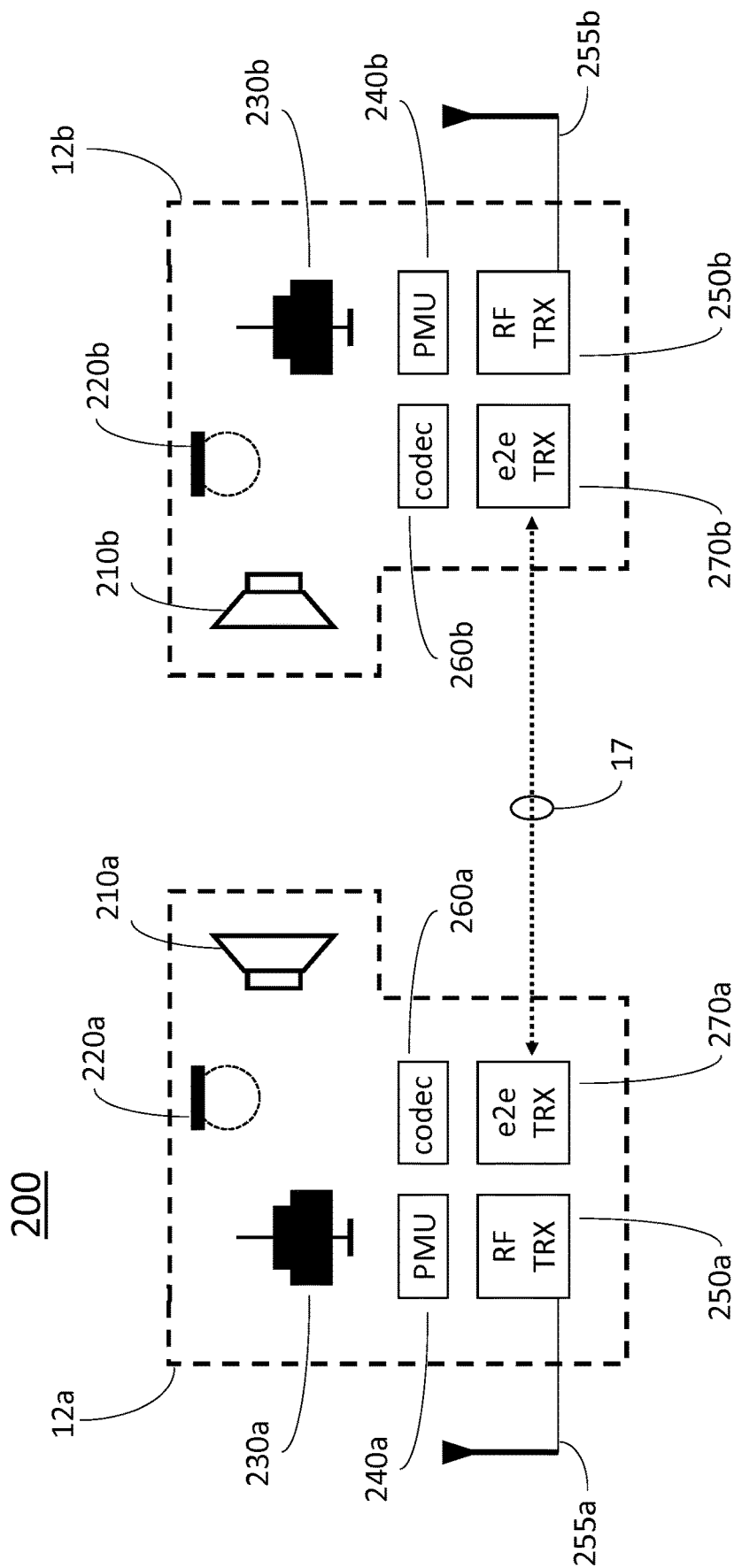
FIG. 2 is a block diagram of a first exemplary wireless stereo headset.

FIG. 2 depicts a high-level block diagram 200 of an exemplary wireless stereo headset 12 consistent with embodiments of the present invention. Ear pieces 12a and 12b consist substantially of the same components, although the placement within the ear piece (e.g., on a printed circuit board) may be different, for example mirrored. Wireless communication between the phone 19 (or any other host device) and the headset 12 is provided by an antenna 255a and a radio transceiver 250a in the right ear piece 12a, and/or is provided by an antenna 255b and a radio transceiver 250b in the left ear piece 12b (viewed facing a user, as in FIG. 1). Radio transceivers 250a and 250b are low-power radio transceivers covering short distances, for example a radio based on the Bluetooth® wireless standard (operating in the 2.4 GHz ISM band). The use of radio transceivers 250a and 250b, which by definition provide two-way communication capability, allows for efficient use of air time (and consequently low power consumption) because it enables the use of a digital modulation scheme with an automatic repeat request (ARQ) protocol.

Transceivers 250a and 250b may include a microprocessor (not shown) controlling the radio signals, applying audio processing (for example voice processing such as echo suppression or music decoding) on the signals exchanged with radio transceivers 250a and 250b, or may control other devices and/or signal paths within the ear piece 12a and 12b, respectively. Alternatively, this microprocessor may be a separate circuit in the ear piece, or may be integrated into another component present in the ear piece.

Codecs 260a and 260b include Digital-to-Analog (D/A) converters, the outputs of which connect to a right speaker 210a and left speaker 210b, respectively. For embodiments that further include a voice mode, the codecs 260a and/or 260b may further include Analog-to-Digital (A/D) converters that receive input signals from microphones 220a and 220b, respectively. To obtain beamforming for enhanced voice pickup, more than one microphone 220 may be embedded in one ear piece, then also requiring additional Analog-to-Digital (ND) converters in the codec 260. Alternatively, digital microphones may be used, which do not require ND conversion and may provide digital audio directly to the microprocessor.

Power Management Units (PMU) 240a and 240b provide stable voltage and current supplies to all electronic circuitry. Finally, each ear piece is powered by a battery 230 which typically provide a 3.7V voltage and may be of the coin cell type. The battery 230 can be a primary battery, but is preferably a rechargeable battery.

Additionally, ear-to-ear (e2e) transceivers 270a and 270b support a communication link 17 between right ear piece 12a and left ear piece 12b. In one embodiment, the RF transceivers 250a and 250b are reused for the e2e communications, in which case there are no separate components 270a and 270b. In another embodiment, 270a and 270b are transceivers using magnetic coupling, for example using the Near-Field Magnetic Induction (NFMI). A suitable transceiver is the NFMI radio chip Nx2280 available from NXP Semiconductors of The Netherlands. In yet another embodiment, transceivers 270a and 270b represent modems supporting a digital communication protocol over a wire 17 between ear pieces 12a and 12b.

Host devices, for example smartphone 19, make use of standardized wireless protocols to insure interoperability with a range of wireless and wearable devices from different vendors, used in various parts of the world. The most widely deployed protocol for wireless (mono and stereo) headsets is the Bluetooth® wireless protocol. Although the phone 19, acting as master, could support multiple radio connections simultaneously (like wireless connections 14 and 16 in FIG. 1), the profile A2DP (Advanced Audio Distribution Profile) is used for streaming stereo information from the phone 19 to the headset 12 using a single radio connection. In FIG. 1 this means that wireless connections 14 and 16 are substantially the same, albeit that the propagation conditions from the phone 19 to the right ear piece 12a may differ from the propagation conditions from the phone 19 to the left ear piece 12b. The phone 19 can establish a two-way communication link to only one of the ear pieces 12, referred to herein as the primary ear piece. Yet, since radio signals propagate through space in an unconfined manner, the other, secondary, ear piece can still receive the radio signals transmitted by the phone 19. It should be noted that only one ear piece 12 (the primary ear piece—referred to herein as 12p, which may be either 12a or 12b as depicted in the Figures) can sustain a two-way connection to the phone 19;

the other (secondary) ear piece 12s merely supports a one-way connection from the phone 19 to the ear piece 12s (that is, the secondary ear piece 12s listens on the connection from the phone 19 to the primary ear piece 12p). Information needed by the secondary ear piece 12s to decode and decrypt the data sent by the phone 19 is provided by the primary ear piece 12p via the e2e link 17.

In order to obtain a robust connection between the phone 19 and the primary ear piece 12p, and between the phone 19 and the secondary ear piece 12s, diversity is applied in both directions. This means that audio information sent by the phone 19 can arrive at the ear pieces 12p, 12s (or vice versa) along different paths, thus providing bidirectional space or path diversity. For example, audio information for ear piece 12b may be delivered directly via connection 14, but may also be delivered indirectly via connection 16 cascaded with connection 17. Likewise, audio information for ear piece 12a may be delivered directly via connection 16, but may also be delivered indirectly via connection 14 cascaded with connection 17. Furthermore, acknowledgement information may be sent by ear piece 12a to phone 19 or may be sent by ear piece 12b to phone 19; phone 19 will abstain from retransmissions if it has received acknowledgement information from at least one ear piece 12p or 12s. Note that connection 17 may be a wireless or wired connection. Indeed, connection 17 may use the same radio transceivers as being used for the wireless links 14 and 16 between the ear pieces 12 and the phone 19. The phone 19 only needs to retransmit a packet if the audio information has not arrived in ear piece 12a and not arrived in ear piece 12b. Several embodiments are discussed herein, where details of the diversity protocols are presented.

Figure 3:
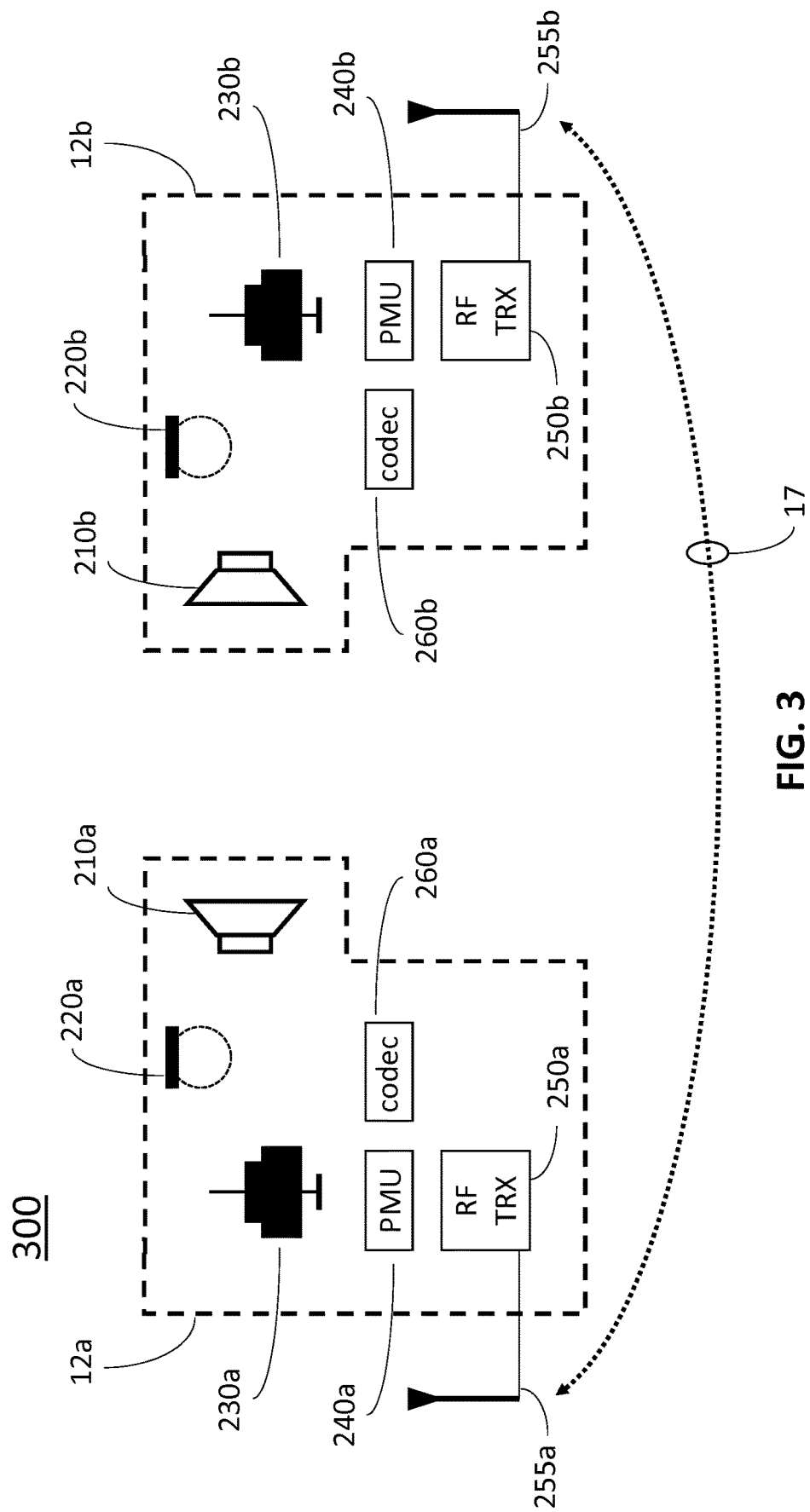
FIG. 3 is a block diagram of a second exemplary wireless stereo headset.

One embodiment of a wireless headset 300 using bidirectional space diversity is shown in FIG. 3. The headset configuration is substantially the same as shown in FIG. 2, with the exception of the lack of e2e transceivers 270a and 270b. In the embodiment of 300, the e2e communication link 17 is supported by RF transceivers 250a and 250b, which also support the wireless communication links to the smartphone 19. Packets exchanged between the ear pieces 12 and the smartphone 19 are based on a standard protocol, such as the Bluetooth® Wireless Technology standard.

Figure 4:
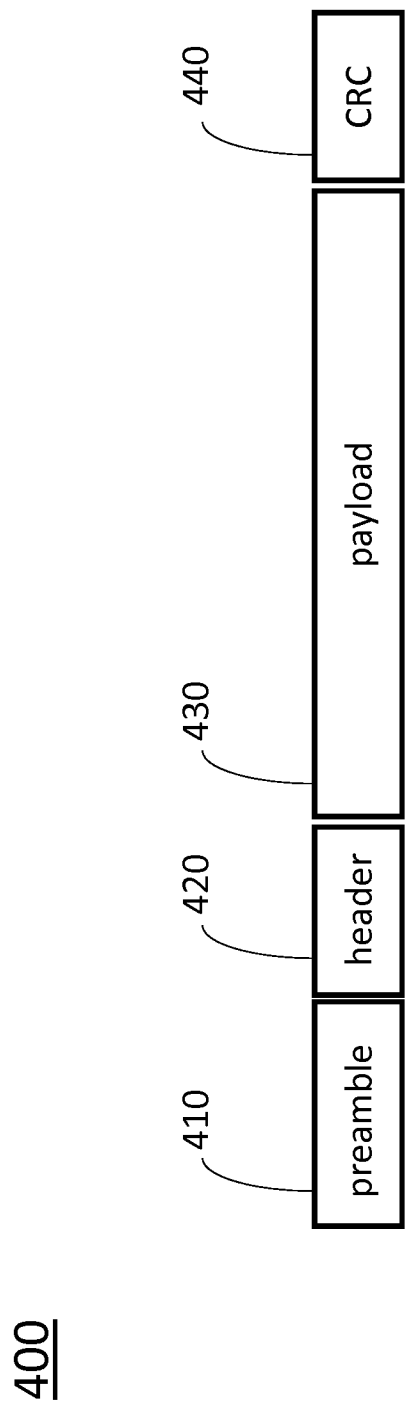
FIG. 4 is an example of a radio packet as used by the Bluetooth® wireless standard.

An example of a typical Bluetooth® packet 400 is shown in FIG. 4. The packet may consist of a preamble 410, a header 420, a payload 430, and a Cyclic Redundancy Check (CRC) 440. The preamble 410 may train the receiver to obtain proper frequency synchronization and symbol timing. The preamble 410 may further contain a unique identifier that identifies the connection (such as an access code). The header 420 may include an indication what type of payload is used (for example including Forward Error Correction, FEC, or not), how many time slots are covered by the packet (which is a coarse indication of the packet length), and may include information about an Automatic Retransmission Query (ARQ) scheme like sequence numbers and ACK/NACK information. The payload 430 typically contains the audio information. It may include a length indicator, providing the exact number of bits carried in the packet. The receiver can check the received packet for errors using the CRC or another checksum 440.

Usually, the preamble 410 and header 420 are short and heavily coded. In the Bluetooth® Classic standard, the preamble and header contain 126 symbols, corresponding to a duration of 126 µs. Errors will most likely occur in the payload 430. Two types of packet errors may occur— referred to herein as an erroneous packet and a missed packed. If the noise or interference is moderate, most likely, the preamble 410 and header 420 will be received correctly, but the payload 430 may have errors, resulting in a CRC check failure and a discarding of the packet. Although the receiver will discard the packet, it will have knowledge about the timing of the packet and its length (and, more importantly, when subsequent packets may arrive). This type of packet error is referred to herein as an erroneous packet. On the other hand, if noise or interference is substantial, the receiver may not notice at all that a packet has arrived. Therefore, it will have no knowledge of the packet arrival time and its length. This type of packet error is referred to herein as a missed packet. In embodiments of the present invention, actions taken by the receiver will be different for an erroneous packet and for a missed packet.

Figure 5A:
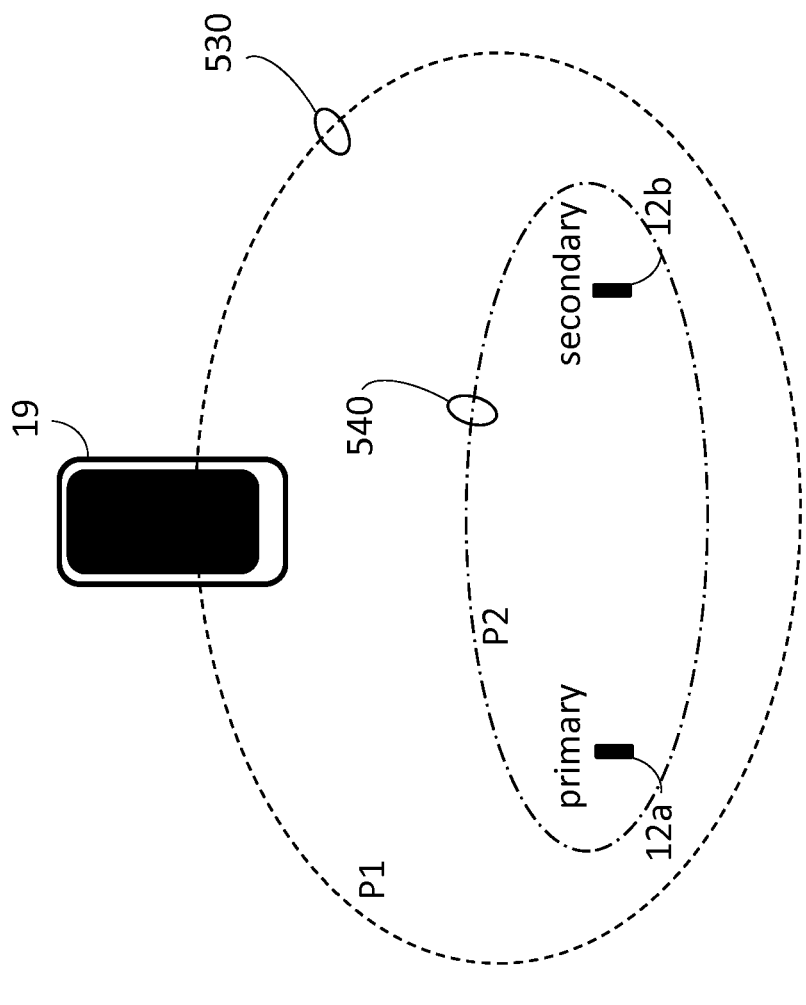
FIG. 5A shows two Bluetooth® piconets.

In one embodiment, wherein the link 17 is RF, preferably Bluetooth® transceivers support the connections between the different wireless transceivers 250a, 250b. FIG. 5A depicts a use case 500 in which two piconets, P1 530 and P2 540 are active. The first piconet P1 provides the communication between smartphone 19 and the primary and secondary ear pieces 12p and 12s (either of which could be either 12a or 12b, in the alternative). The smartphone 19 has a two-way connection towards the primary ear piece 12p. The secondary ear piece 12s in piconet P1 can receive radio packets from the smartphone 19, and may also receive radio packets from the primary ear piece 12p. Yet, in piconet P1, the smartphone 19 has only knowledge about the primary ear piece 12p. For communicating with the primary ear piece 12p, the secondary ear piece 12s makes use of the second piconet P2 540, which forms the e2e communication link between the ear pieces 12p, 12s. Since in each ear piece 12, a single radio transceiver 250 is used to support both piconet P1 530 and piconet P2 540, time division multiplexing (also called scatternet) must be applied where the transceiver alternatively operates in piconet P1 530 and in piconet P2 540, but never in both piconets at the same time.

Figure 5B:
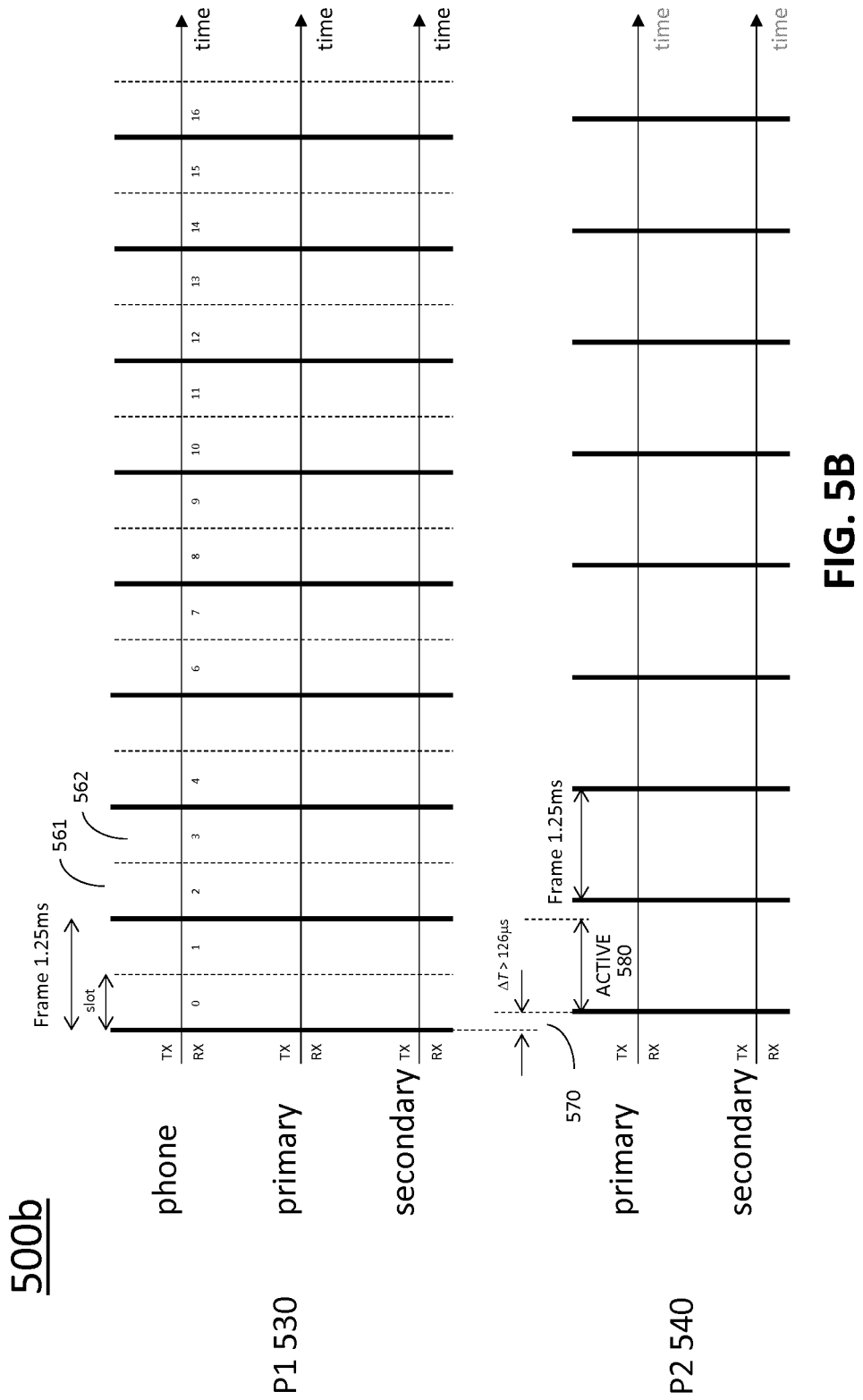
FIG. 5B shows two timing diagrams staggered with respect to each other.

Example timing diagrams for P1 530 and P2 540 are shown in FIG. 5B. Frames of length 1.25 ms are defined. The frames for P1 are divided into a downlink slot 561 (from the host device 19 to the ear pieces 12p, 12s) and an uplink slot 562 (from the primary ear piece 12p to host device 19). For P2, the time line is divided into frames of 1.25 ms as well, but various slot alternatives are possible. Important to note is the time staggering 570 between the frames in P1 and frames in P2, by an offset ΔT of at least 126 µs. This allows both primary and secondary ear pieces 12p, 12s to detect any packet transmission sent by the host device 19 on P1. Referring to the packet 400 in FIG. 4, 126 µs corresponds to the length of preamble 410 and header 420 combined. When receiving the preamble and header, the ear pieces 12p, 12s can derive whether a valid packet was sent on P1 addressing the primary ear piece 12p. If this is the case, both ear pieces 12p, 12s will continue to listen for this host device packet. If this is not the case, both ear pieces 12p, 12s may switch to P2 to communicate between each other. Activity on P2 must have stopped before the arrival of the next frame boundary on P1, so that primary and secondary ear pieces 12p, 12s can again listen on P1—that is, communication on P2 is restricted to the ACTIVE window 580 shown in FIG. 5B. With this setup, a packet sent by the host device 19 will never be missed by the ear pieces 12p, 12s because they happened to be communicating with each other on P2.

It will be readily apparent to one of ordinary skill in the art that the role of primary ear piece 12p and the role of secondary ear piece 12s may be interchanged. In fact, these roles may be interchanged dynamically based on the propagation conditions the ear pieces 12 experience instantaneously towards the smartphone 19. For the purpose of discussion, assume that initially the right ear piece 12a assumes the role of primary ear piece 12p; the left ear piece 12b is then the secondary ear piece 12s.

Figure 6:
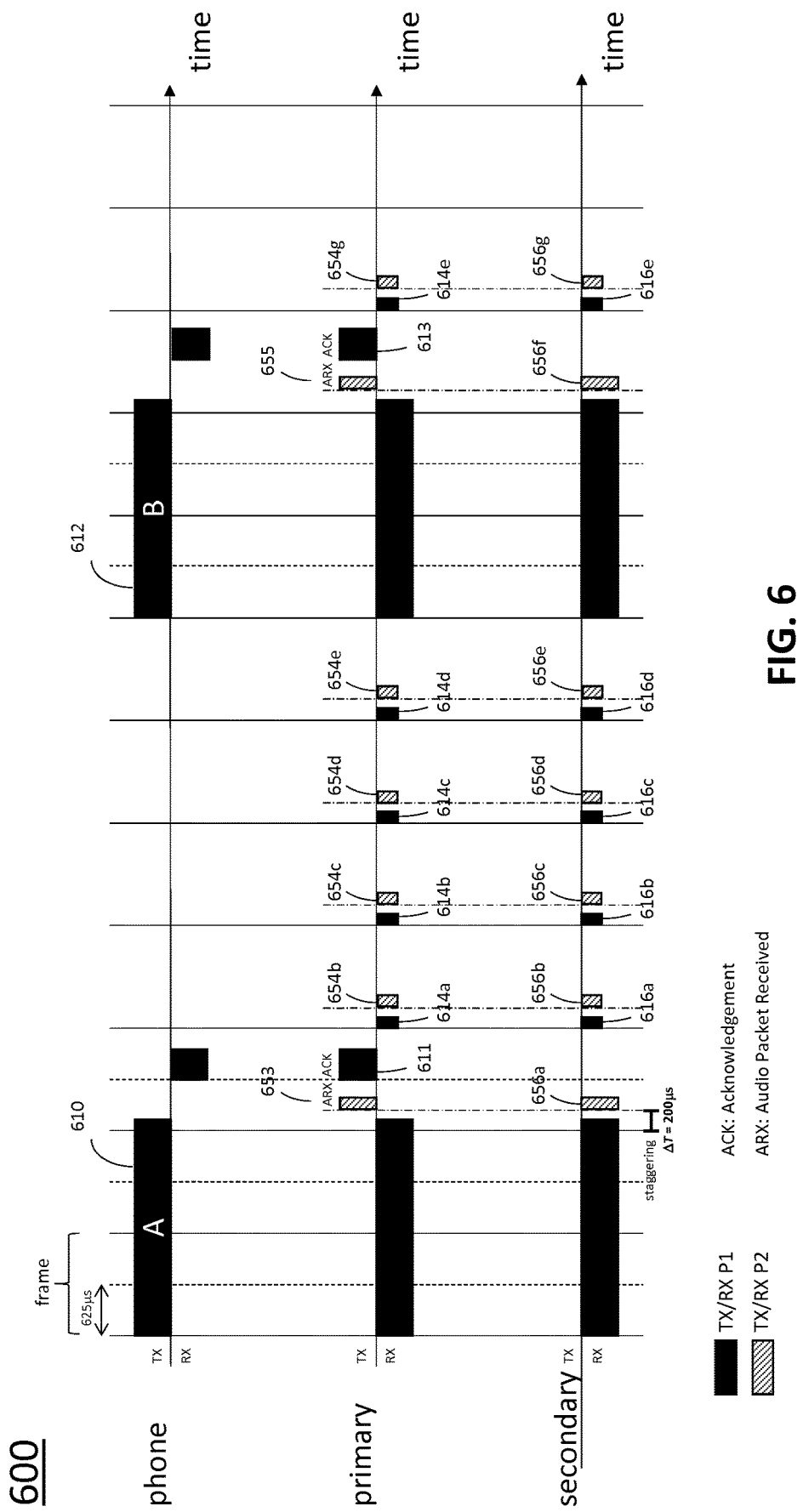
FIG. 6 is a first data flow and timing diagram of a first communication protocol showing successful operation.

FIG. 6 is a first data flow and timing diagram 600 of a communication protocol providing diversity in the embodiment of FIGS. 3 and 5. A time-slotted scheme is used with a time slot having a nominal duration of 625 µs, and a frame containing two consecutive slots. As an example, the time offset ΔT between the frames of P1 and P2 can be chosen to be 200 µs, long enough for a Classic Bluetooth® receiver to receive the preamble and the header of a packet. Packets sent by the phone 19 are aligned with the frame timing, and for each new packet a different carrier frequency is used according to a pseudo-random frequency hopping pattern as defined in the Bluetooth® standard. A Bluetooth® transceiver alternatively transmits and receives. A first piece of stereo audio information A is carried by a standard Bluetooth® packet 610 (for example of type 2-DHS, using 2 Mb/s pi/4-QPSK without coding in the payload and covering 5 time slots). This packet 610 is sent by the smartphone 19 on piconet P1 530 and may be received by both the primary ear piece 12p and the secondary ear piece 12s. In response to the successful reception of packet 610, the primary ear piece 12p returns an acknowledgement (ACK) packet 611 to the smartphone 19, also on piconet P1 530. According to the Bluetooth® standard, the carrier frequency used for ACK packet 611 is the same as the carrier frequency used for audio packet 610.

In FIG. 6, all packets transmitted on P1 530 (the link to smartphone 19) are represented by a solid black box located above the time line; the solid black boxes below the timeline represent receive windows with the receiver listening on piconet P1 530. Similarly, all packets transmitted on the piconet P2 540 (the e2e link) are represented by a dashed black box located above the time line; the dashed black boxes below the timeline represent receive windows with the receiver listening on piconet P2 540. Furthermore, in FIG. 6, frame boundaries on P1 are denoted by solid vertical lines; slot boundaries on P1 are denoted by dotted vertical lines. Due to the time staggering offset of one slot, frame boundaries on P2 are denoted by dash-dotted vertical lines. Packet transmission on P1 is aligned with the solid vertical lines whereas packet transmission on P2 is aligned with the dash-dotted vertical lines.

Since the smartphone 19 may transmit a packet at the beginning of any frame in P1 530 piconet, primary and secondary ear pieces 12p and 12s must listen on the P1 530 piconet at the beginning of each frame, as depicted by listen instances 614a-e for primary ear piece 12p and listen instances 616a-e for secondary ear piece 12s. Note that a Bluetooth® receiver must check only the first part of the frame to detect whether a valid access code (in preamble 410) is present, and may go to sleep for the remainder of the frame if no valid access code is detected. Audio packet A 610 is sent by the phone 19 on piconet P1 530 and received successfully by both ear pieces 12p and 12s. After receipt of the audio packet 610, primary ear piece 12p transmits an Audio Packet Received (ARX) 653 on piconet P2 540 to indicate to the secondary ear piece 12s that it has received the audio packet 610 successfully. The secondary ear piece 12s will receive this packet, as both the primary and secondary ear pieces 12p, 12s will listen to the piconet P2 540 at the beginning of every frame start of piconet P2 540, unless they are active in communications on P1 or P2. The listen instances on piconet P2 540 are represented by 654b-g for primary ear piece 12p and by 656a-g for secondary ear piece 12s. Note that when there is no activity on P1, the activity on P2 may be reduced as well; in this case, primary ear piece 12p and secondary ear piece 12s may not listen during the beginning of every P2 frame 654a-c and 656a-c, but at a lower duty cycle.

After sending the ARX packet 653, primary ear piece 12p sends an ACK packet 611 on piconet P1 530 to inform phone 19 that it has successfully received audio packet 610. Over successive frames, both the primary ear piece 12p and the secondary ear piece 12s alternatively listen on piconet P1 530 (at the first slot of each frame of piconet P1 530) and piconet P2 540 (at the beginning of every frame of piconet P2 540) until a second audio packet B 612 arrives from the smartphone 19, and the procedure is repeated.

Figure 7:
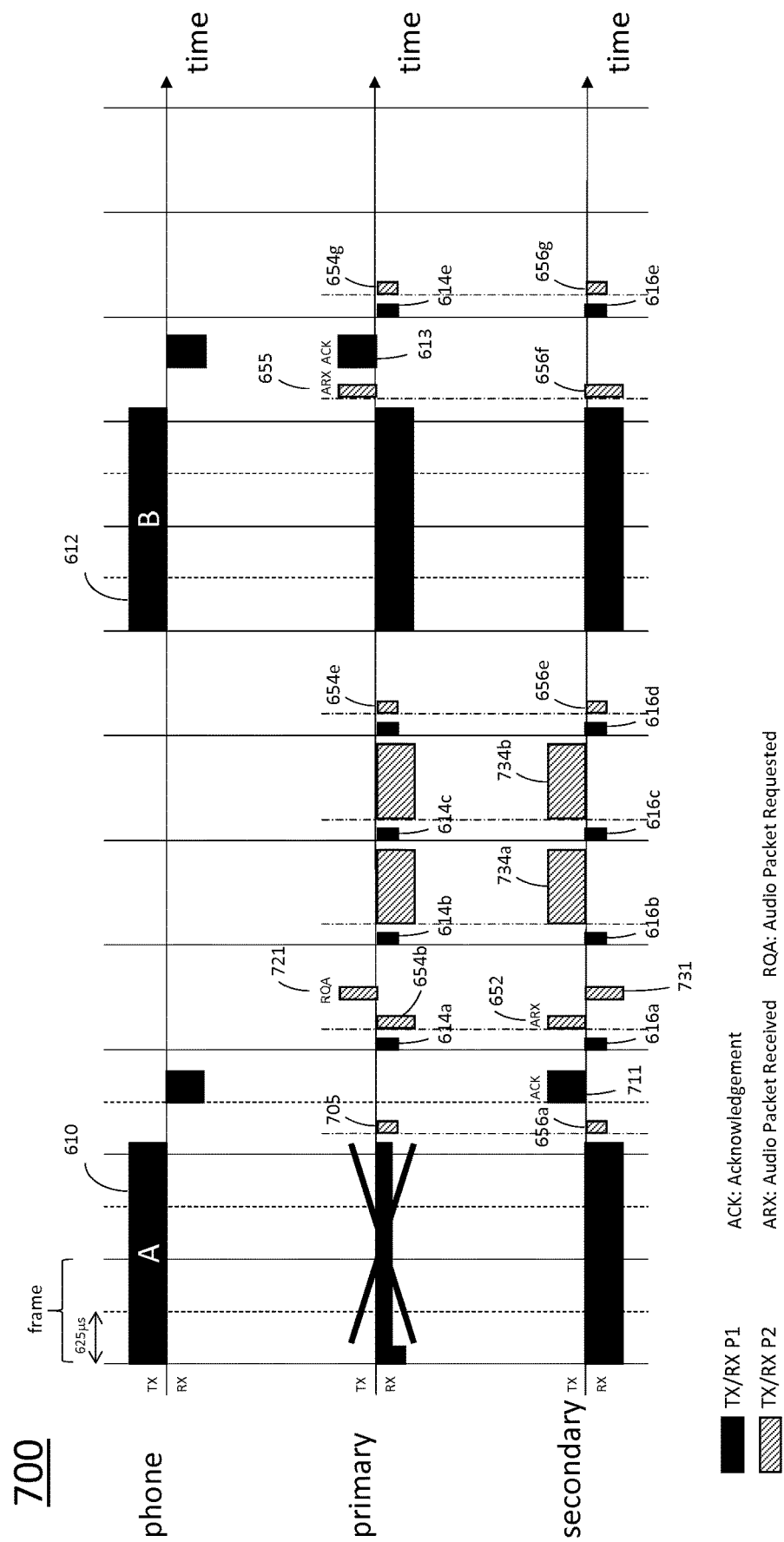
FIG. 7 is a second data flow and timing diagram of the first communication protocol showing erroneous reception by the primary ear piece.

FIG. 7 is a second data flow and timing diagram 700 of a communication protocol providing diversity in the embodiment of FIGS. 3 and 5. In this case, it is assumed that the primary ear piece 12p erroneously receives audio packet A 610 sent by smartphone 19. That is, the preamble (access code) and header are received correctly, but the CRC does not check and the packet is discarded by the primary ear piece 12p. This is indicated in FIG. 7 by a reduced-size reception, crossed out by an "X." Consequently, the primary ear piece 12p will not send an ACK packet to smartphone 19 on the first piconet P1 530 at the next slot boundary as before. Neither will it send ARX packet 653 to secondary ear piece 12s on second piconet P2 540. Instead, it may listen in P2 540 at scan instance 705. Secondary ear piece 12s receives audio packet A 610 correctly. Since it does not receive ARX packet 653 from the primary ear piece at scan instance 656a, it will conclude that the primary ear piece has not received the audio packet A 610 correctly. Therefore, secondary ear piece 12s will send an ACK packet 711 to smartphone 19 over the first piconet P1 530 to confirm successful reception. As a result, the smartphone 19 will not start a retransmission of audio packet A 610. Furthermore, since primary ear piece 12p does not send an ACK packet, there is no chance of collision between packets sent by both the primary and secondary ear pieces. At the next frame boundary in piconet P2 540, the secondary ear piece 12s will send an ARX packet 652 to the primary ear piece 12p to inform 12p that 12s has successfully received the audio packet A 610. Since primary ear piece 12p knows that the desired audio information is present in secondary ear piece 12s (the indication of which was transmitted in ARX packet 652, and received at 654b), the primary ear piece 12p can now retrieve the desired audio information from the secondary ear piece 12s. It therefore will send a Request Audio (RQA) packet 721 on piconet P2 540 to ear piece 12s. On receiving this RQA packet at 731, the secondary ear piece 12s will start a data exchange to the primary ear piece 12p to transfer the desired audio information in the subsequent frames using data packets 734a-b.

Note that at the beginning of each frame boundary in P1 530, the ear pieces 12 first listen to piconet P1 530 for transmissions from the smartphone 19. Similarly, if there is no transmission from the smartphone 19, the ear pieces 12 each listen to piconet P2 540 at the beginning of each frame boundary on that piconet (offset from P1 frames), as indicated at the 654 and 656 instances. However, the primary ear piece did not transmit request RQA 721 on a P2 frame boundary, nor did the secondary ear piece 12b listen for it at a frame boundary at 731. In general, each ear piece 12 will remain active on the piconet P2 540 for a brief duration following a beginning-of-frame instance 654, 656 in which there was some activity. For example, the secondary ear piece 12s transmitted the ARX packet 652 on a P2 frame boundary. The primary ear piece 12p may transmit the request RQA 721 immediately following the reception of this packet, knowing that the secondary ear piece 12s will continue to monitor P2 in anticipation of just such a request. After some few microseconds of inactivity on P2 following the listening instances 654, 656, both ear pieces 12a, 12b may safely put their e2e channel transceivers to sleep for power conservation, until the next P1 listening instance 614, 616.

An ARQ procedure may be applied on the e2e link 540 as well, two examples of which are shown in FIGS. 8A and 8B. In FIG. 8A, each data packet sent on the e2e link is directly acknowledged in the same frame. For example, data packet 734a sent by the secondary ear piece 12s on piconet P2 540 is directly acknowledged by ACK packet 813a sent by the primary ear piece 12p inside the same frame. ACK packet 813a may not necessary have the same format as the ACK packets 611, 613, 711 (FIGS. 6-7) used on piconet P1 530. Likewise, data packet 734b sent by the secondary ear piece 12s on piconet P2 540 is directly acknowledged by the primary ear piece 12p by ACK packet 813b inside the same frame. Additional listen instances 823a and 823b are inserted after every transmission to scan for ACK messages on piconet P2 540.

In FIG. 8B, multiple data packets sent on the e2e link are acknowledged at the end of the transaction. For example, data packets 734a and 734b sent by the secondary ear piece 12s on piconet P2 540 are acknowledged by a single ACK packet 815 sent by the primary ear piece 12p after the last packet. The ACK packet 815 may point at specific packets that are missing (selective-repeat ARQ), or it may indicate the last packet in sequence it has received successfully (Go-back-N ARQ).

It is understood that as long as the smartphone 19 sends packets, the ear pieces 12 are active on piconet P1 530 and no data can be exchanged on the e2e link, piconet P2 540. This is because the transceiver 250 can be active on only one piconet at one point in time. It may happen that the smartphone 19 sends audio information in bursts, i.e., a number of consecutive audio packets 610 are sent in short sequence, leaving no time window for the e2e link 17 to forward packets if so requested. If a number of audio packets is missed by one of the ear pieces, the other ear piece must buffer those audio packets and forward them on request as soon as no more audio information is sent on piconet P1 530. Some audio packets in the burst may have been received correctly, and some not. In order avoid redundant forwarding, the received audio packets should be numbered. The media packet inside audio packet 610 may have a sequence number, depending on the audio codec protocol used, but this is not the case for all protocols. Therefore, it is sometimes desirable to apply (additional) numbering in embodiments of the present invention.

In some embodiments, the Bluetooth® system clock on piconet P1 530 is used for packet numbering. For a frequency-hopping and time-slotted communication system like Bluetooth®, timing synchronization is essential to keep the transceivers aligned both in frequency and time. The Bluetooth® system clock nominally runs at the half slot rate of 3200 ticks per second. The Bluetooth® system clock in P1 530 also serves as a common clock to keep the audio streams in the right and left ear pieces aligned in time, thus avoiding any offset between the sound production in each ear. In some embodiments, the clock value is used as it is present at the leading frame boundary when the audio packet arrives, as a sequence identity (or time stamp) for the audio contents. The Bluetooth® piconet clock covers 28 bits and at a rate of 3200 ticks per second; it takes about 23.3 hours before it wraps around. For the purpose of packet sequencing, not all bits of the Bluetooth® clock are needed, but only, e.g., the 12 least significant bits (LSB), which covers a time window up to 1.28 s. Optionally, a local sequence number may be added to each data packet 734 to keep the order when sending several forwarding packets 734 over piconet P2 540 to carry one audio packet 610.

Returning to FIG. 7, when a burst of audio packets 610 arrives, the secondary ear piece 12s may not have the opportunity to send ARX messages 652 via P2 since it is preoccupied on P1 530. In that case, individual ARX message corresponding to each received audio packet can be exchanged later once bandwidth on P2 540 comes available. Alternatively, a single ARX message may include information of all received audio packets since the last sent ARX message. This ARX message may then include multiple time stamps corresponding to multiple audio packets.

Figure 9:
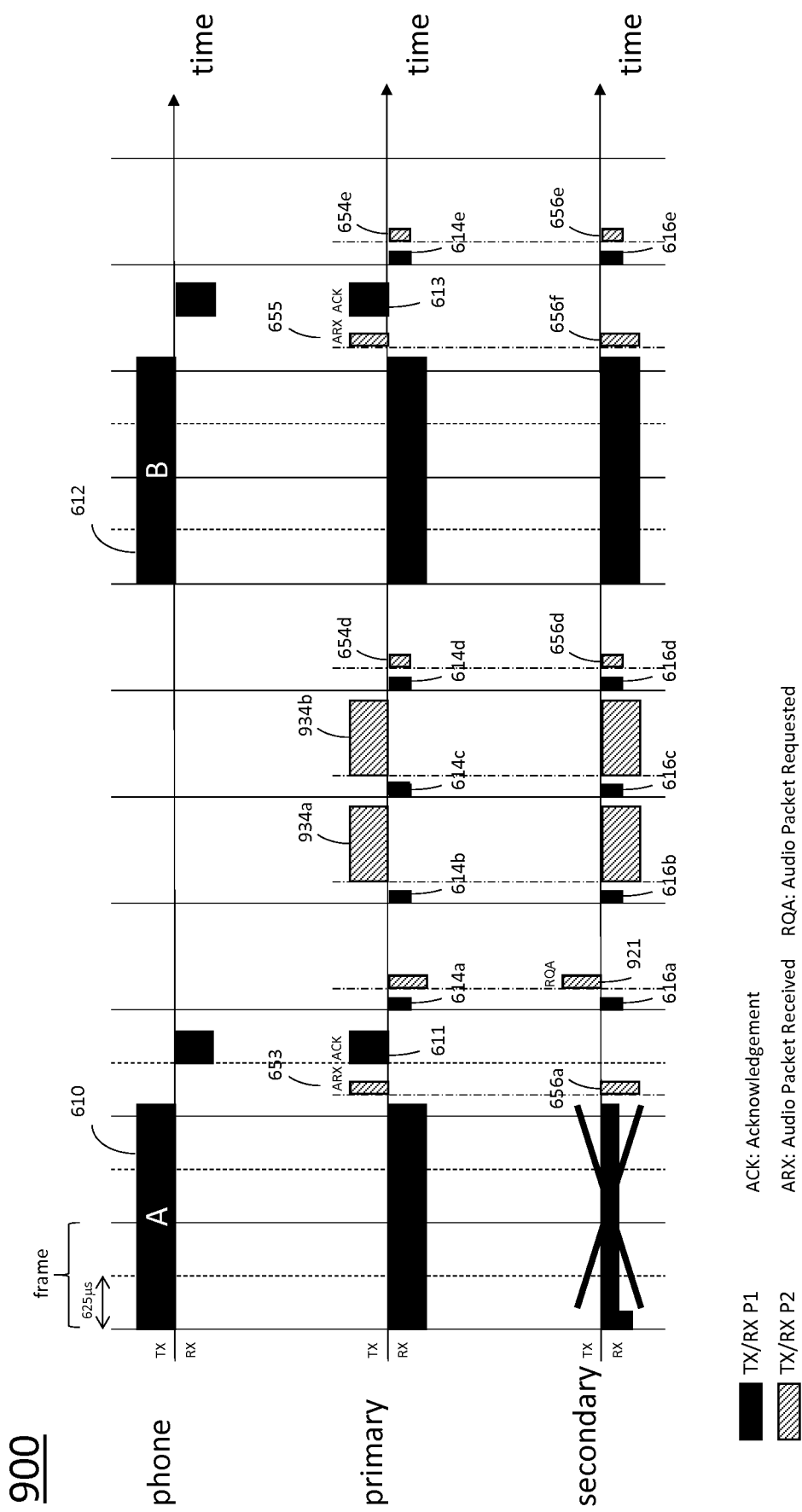
FIG. 9 is a third data flow and timing diagram of the first communication protocol showing erroneous reception by the secondary ear piece.

FIG. 9 is a third data flow and timing diagram 900 of a communication protocol providing diversity in the embodiment of FIGS. 3 and 5. In this case, it is assumed that the secondary ear piece 12s erroneously receives audio packet A 610 sent by smartphone 19. That is, the preamble (access code) and header are received correctly, but the CRC does not check and the packet is discarded by the secondary ear piece 12s. This is indicated in FIG. 9 by a reduced-size reception, crossed out by an "X" in the payload section of the packet reception. The primary ear piece 12p receives the audio packet 610 correctly, and subsequently sends an ARX packet 653 to secondary ear piece 12s on second piconet P2 540 and an ACK packet 611 to the smartphone 19 over the first piconet P1 530 to confirm successful reception. On receiving the ARX packet 653 on listen instance 656a, the secondary ear piece 12p knows that the desired audio information is present in primary ear piece 12p. It will therefore abstain from sending an ACK packet (711) as described in the previous example (FIG. 7). The secondary ear piece 12s can now retrieve the desired audio information from the primary ear piece 12p. It therefore will send a Request Audio (RQA) packet 921 on piconet P2 540 to primary ear piece 12p. On receiving this RQA packet 921, the primary ear piece 12p will start a data exchange to the secondary ear piece 12s to transfer the desired audio information in the subsequent frames using data packets 934a-b. Note that at the beginning of each frame boundary in P1 530, the ear pieces 12 first listen to piconet P1 530 for transmissions from the smartphone 19.

Figure 10:
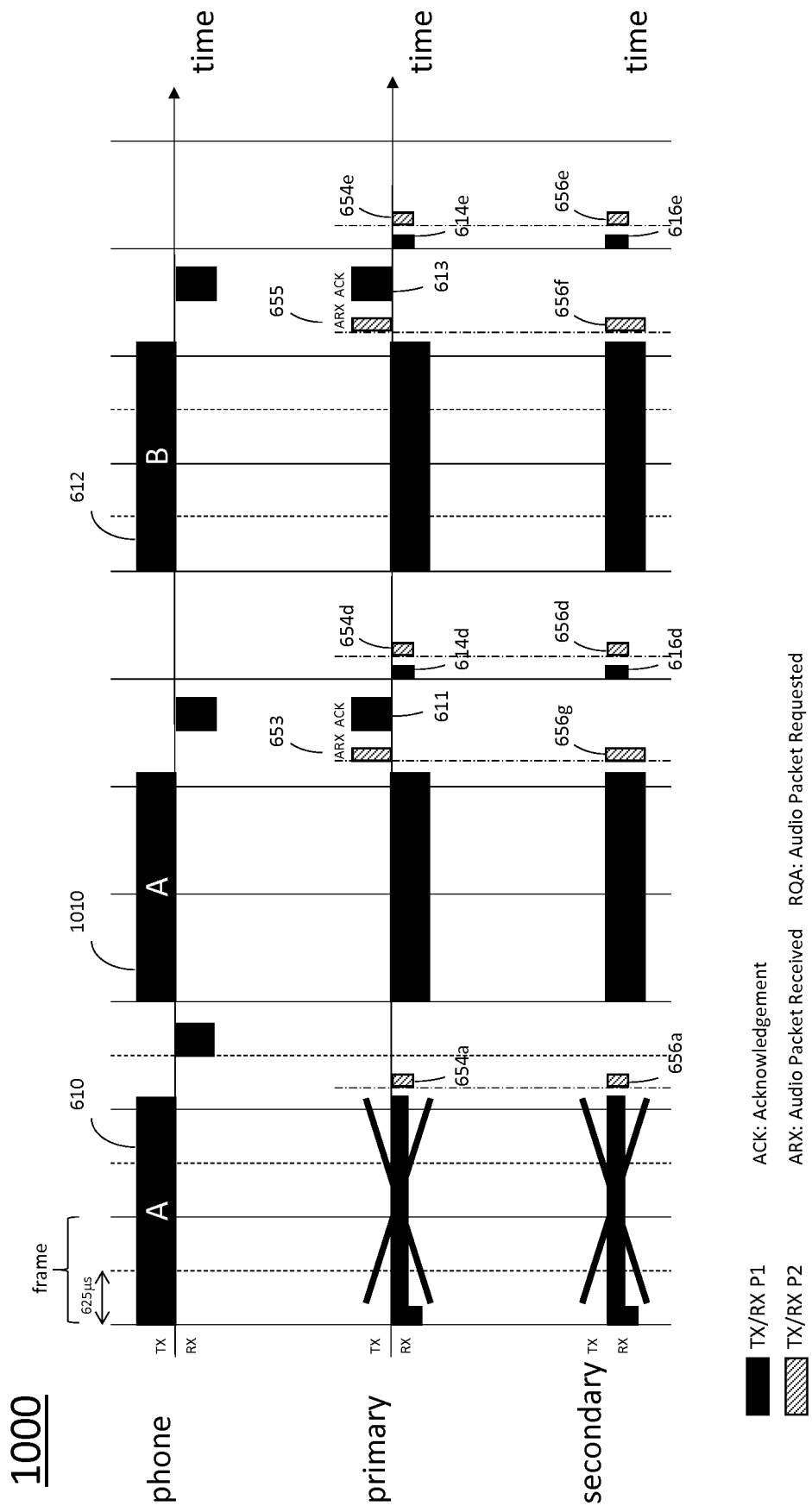
FIG. 10 is a fourth data flow and timing diagram of the first communication protocol showing erroneous reception by both ear pieces.

FIG. 10 is a fourth data flow and timing diagram 1000 of a communication protocol providing diversity in the embodiment of FIGS. 3 and 5. In this case, it is assumed that both the primary and secondary ear pieces 12p, 12s erroneously receive audio packet A 610 sent by smartphone 19. Since the primary ear piece 12p has not received a correct audio packet, it will not send an ARX packet on the second piconet P2 P540, nor will it send an ACK packet on the first piconet P1 P530. Since the secondary ear piece 12s has not received a correct audio packet, it will not send an ACK packet on the first piconet P1 P530, nor will it send an ARX packet on the second piconet P2 P540. Because the smartphone 19 does not receive an ACK packet, it will start a retransmission by sending the audio information sent in packet 610 again in a new packet 1010. Assuming no more errors, the transactions as shown in FIG. 6 will follow.

Figure 11:
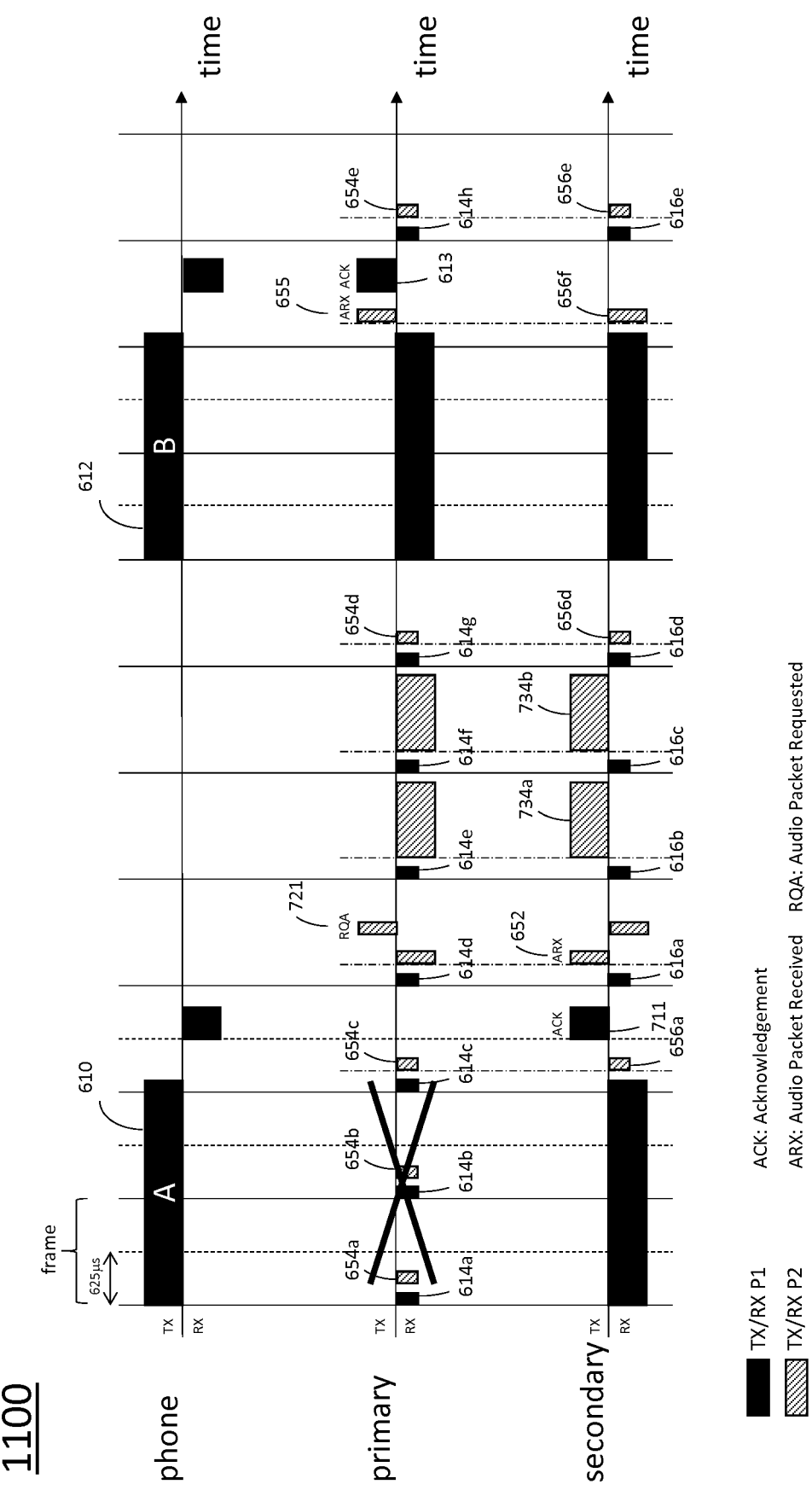
FIG. 11 is a fifth data flow and timing diagram of the first communication protocol showing a missed reception by the primary ear piece.

In the scenarios discussed so far, failures on piconet P1 530 resulted in erroneous packet reception, i.e., the audio packet was discarded because of errors in the payload, but the preamble and header were received correctly. This meant that the receiver knew that a packet had arrived, and knew its timing and length (or at least how many time slots it occupied as can be derived from the packet type information in the header 420), but was unable to use the audio information in the payload. In the following, cases are considered when a packet is missed by the receiver, i.e., the receiver does not know a packet has arrived, and is not aware of any timing information. Such a case is shown in the timing diagram 1100 of FIG. 11, where the primary ear piece 12p misses the arrival of packet 610. It will just continue to alternatively scan piconets P1 and P2. A missed packet, as opposed to one erroneously received, is indicated in the figures by an "X" over the indications of the relevant ear piece scanning piconets P1 and P2. Note that this indicates a missed packet only for the indicated ear piece—the other ear piece may (or may not) have received the packet correctly.

In the case depicted, the primary ear piece 12p will not sent an ARX packet (such as 653 in FIG. 9) over second piconet P2 540 after audio packet 610 has been sent. Since the secondary ear piece 12s has not received such an ARX packet on listen instance 656a but was successful in the reception of audio packet 610, it will send an ACK 711 on the first piconet P1 530 to smartphone 19. Primary ear piece 12p will subsequently be notified that it has missed an audio packet by the ARX packet 652 sent by the secondary ear piece 12s on piconet P2 540. Thereafter, the primary ear piece 12p will request for audio forwarding by sending an RQA packet 721 to secondary ear piece 12s on second piconet P2 540. The secondary ear piece 12s will start forwarding the requested audio information using packets 734a-b over second piconet P2 540. This procedure is identical to the procedure when the primary received an erroneous packet as previously described in FIG. 7.

Figure 12:
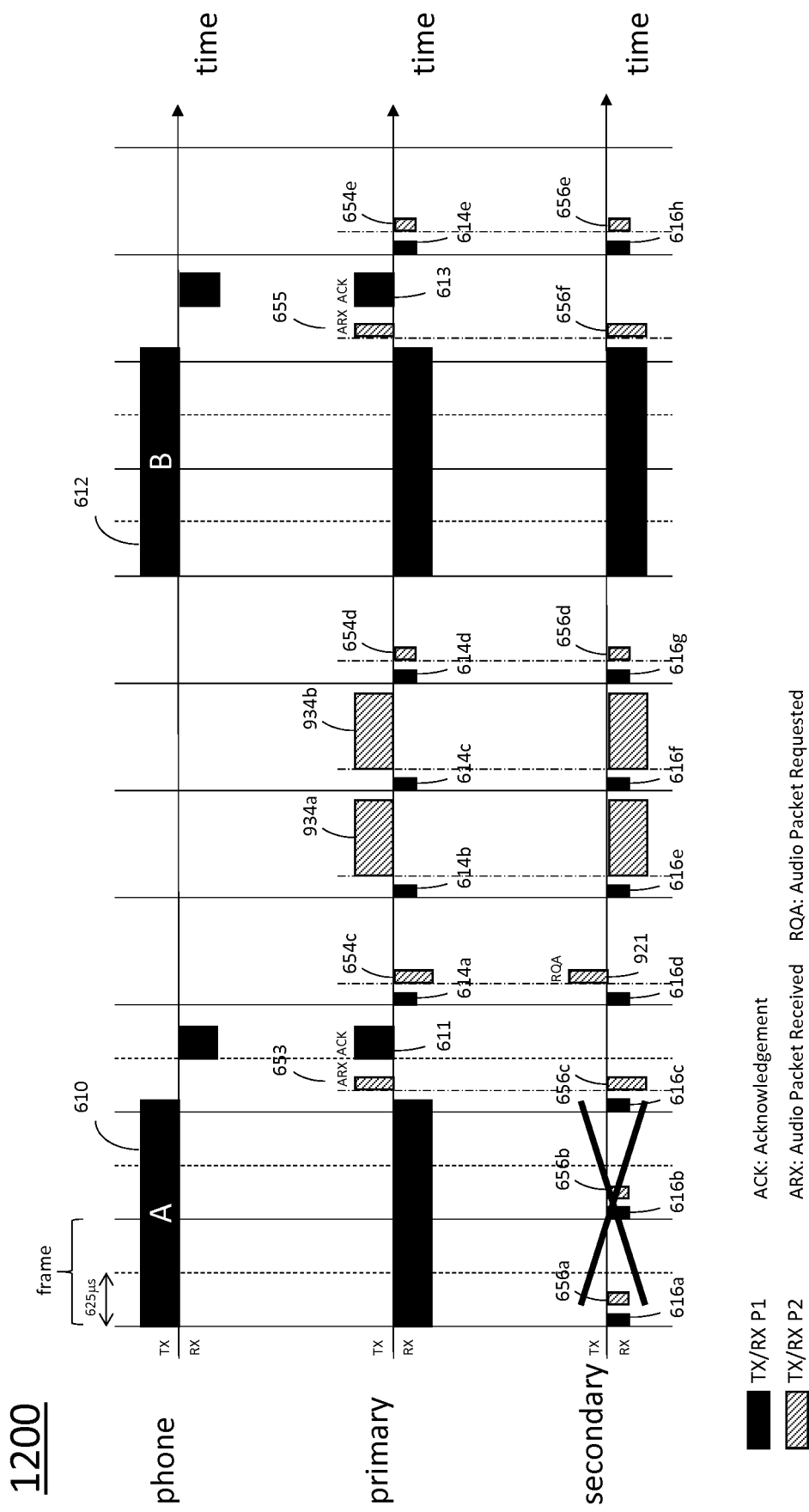
FIG. 12 is a sixth data flow and timing diagram of the first communication protocol showing a missed reception by the secondary ear piece.

In the case shown in the timing diagram 1200 of FIG. 12, instead of the primary ear piece 12p, the secondary ear piece 12s misses the arrival of packet 610. The primary ear piece 12p sends the ARX packet 653 and ACK packet 611 on piconet P2 540 and piconet P1 530, respectively. On receiving the ARX packet 653 on listen instance 656c, the secondary ear piece 12s knows that it has missed an audio packet and that the desired audio information is residing in primary ear piece 12p. The secondary ear piece 12s can now retrieve the desired audio information from the primary ear piece 12p. It therefore sends a Request Audio (RQA) packet 921 on piconet P2 540 to ear piece 12p. On receiving this RQA packet at listen instance 654c, the primary ear piece 12p will start a data exchange to the secondary ear piece 12s to transfer the desired audio information in the subsequent frames using data packets 934a-b. This procedure the identical to the procedure when the primary received an erroneous packet as previously described in FIG. 9.

Figure 13:
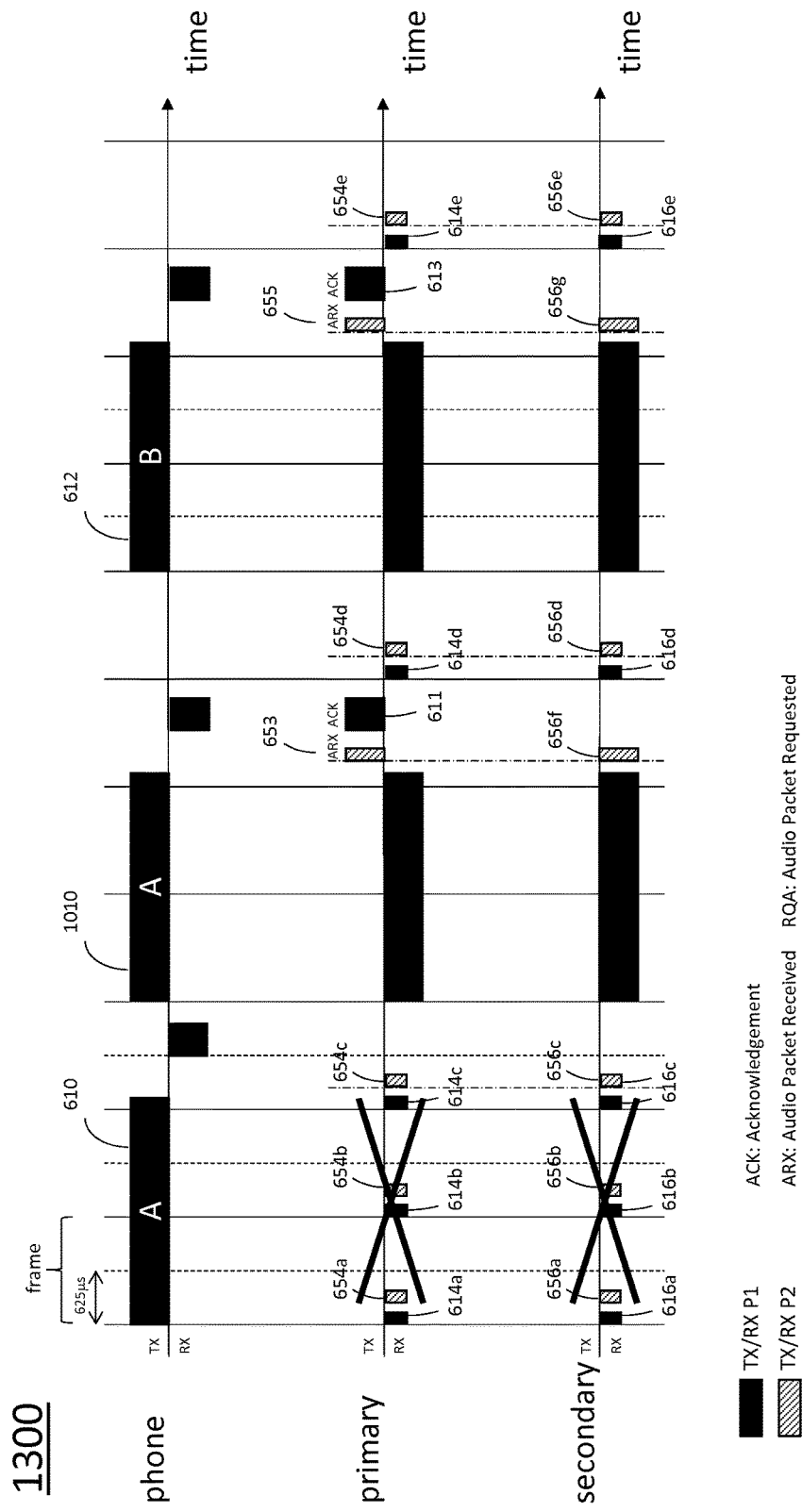
FIG. 13 is a seventh data flow and timing diagram of the first communication protocol showing a missed reception by both ear pieces.

Finally, in the case shown in the timing diagram 1300 of FIG. 13, both the primary ear piece 12p and the secondary ear piece 12s miss the arrival of packet 610. Neither of them will send an ACK packet or ARX packet. Since no ACK packet is received by smartphone 19, it will retransmit the audio information contained in packet 610 again in a new packet 1010. This procedure the identical to the procedure when the primary received an erroneous packet as previously described in FIG. 10.

Figure 14:
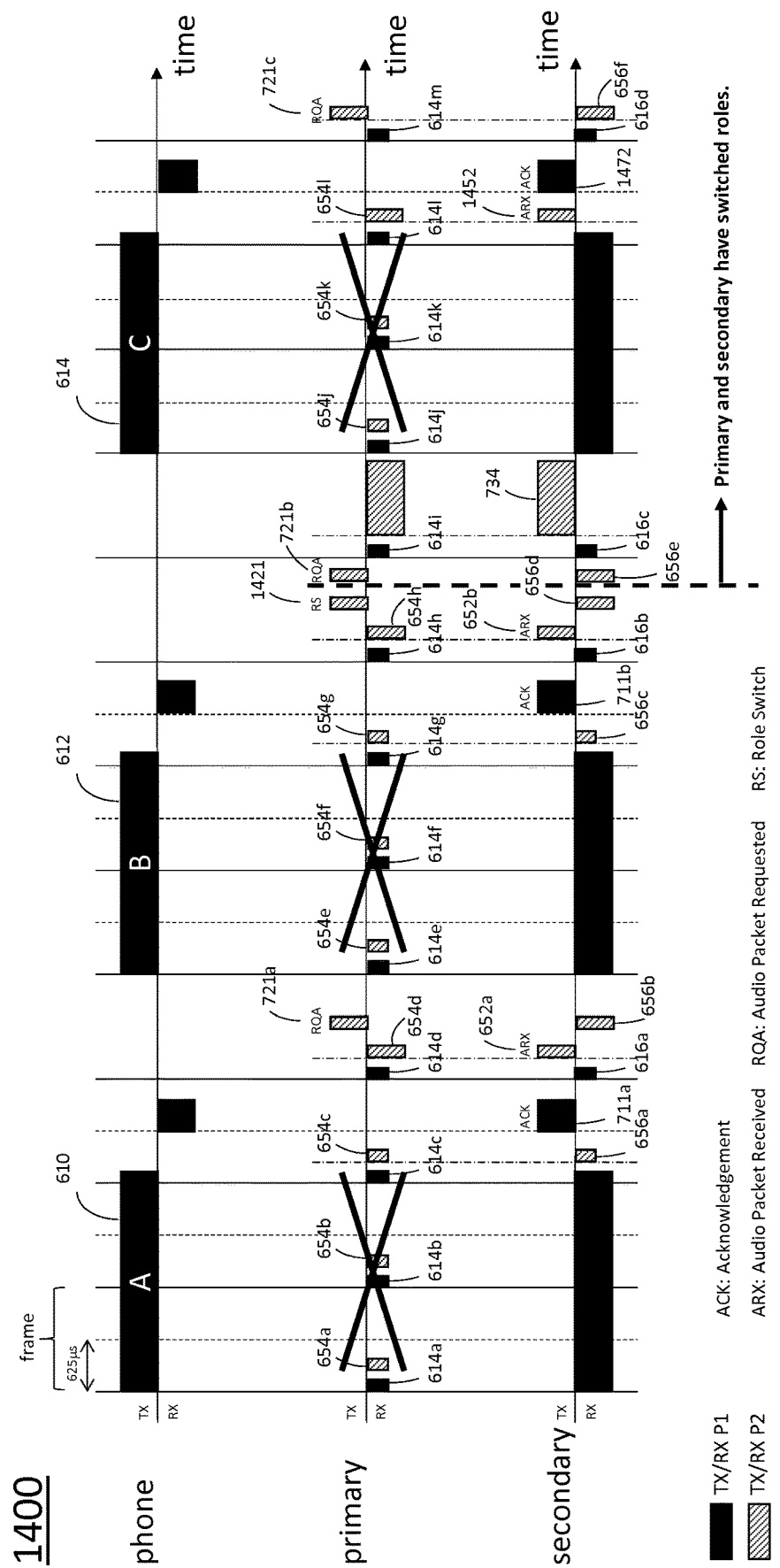
FIG. 14 is an eighth data flow and timing diagram of the first communication protocol showing a role switch after multiple missed receptions.

In the data flow and timing diagram 1400 of a communication protocol providing diversity shown in FIG. 14, a very bad link to the primary ear piece 12p is assumed. As a result, the primary ear piece 12p misses each of the packets 610, 612, 614 sent by smartphone 19. Instead, the secondary ear piece 12s acknowledges the audio reception to the smartphone 19 using ACK packets 711a-b sent on the first piconet P1 530, and informs the primary ear piece 12p via the second piconet P2 540 using ARX packets 652a-b related to the first two packets 610 and 612 sent by the smartphone 19. Primary ear piece 12p will request forwarding by sending RQA packet 721a on the second piconet P2 540. However, before the secondary ear piece 12s can start forwarding, it needs to handle the reception of the next audio packet 612 sent by the smartphone 19 on the first piconet P1 530. On the detection of multiple missed audio packets, the primary ear piece 12p may request a role switch, in which the secondary ear piece 12s becomes the primary ear piece, and vice versa. Primary ear piece 12p therefore sends an RS (Role Switch) packet 1421. Knowing it still misses audio information, again a request for forwarding is issued by primary ear piece 12p by sending an RQA packet 721b on the second piconet P2 540. Since no activity on the first piconet P1 530 is detected during scan instance 616c, the new primary ear piece 12p start to forward the audio information using packet 734 sent to the new secondary ear piece 12s using the second piconet P2 540. When a new audio packet 614 arrives, the new primary ear piece 12p will send its ARX packet 1452 directly after successful receipt of the audio packet 614. The new secondary ear piece 12s will continue to ask for forwarding (RQA packet 721c) and the new primary ear piece 12p will respond by forwarding audio data (not shown). In this example, it is the erstwhile primary ear piece 12p (e.g., right ear piece 12a) that requests a role switch after the detection of multiple (consecutive) missed audio packets. Since the secondary (left) ear piece 12b is also aware of the missed audio packets in primary (right) ear piece 12a, secondary (left) ear piece can also take the initiative for the role switch and suggesting to the primary (right) ear piece 12a to switch roles.

In the previous description, it was assumed that piconet P1 530 is based on the Bluetooth® Classic specification using the 2 Mb/s Enhanced Data Rate mode. Other modes could be used, such as the 1 Mb/s Basic Rate mode, or the 3 Mb/s Enhanced Data Rate mode. Secondly, an audio mode based on Bluetooth® Low Energy can be used, possibly using the (more robust) Long Range mode defined in Bluetooth® Low Energy. Thirdly, another standard different from Bluetooth® can be used, for example ANT, WiFi® or ZigBee®, or another system based on IEEE 802.15.4. Finally, a proprietary RF technology can be used. Similar RF technologies as listed above can be applied for piconet P2 540. Moreover, piconet P1 530 and piconet P2 540 may use different RF technologies. Preferably, the same radio component 250 can be used, but even that is not necessary. If piconets P1 and P2 would use different operating bands and/or bandwidths, two separate radio components would be needed to support the two different piconets.

The embodiments described above used a radio technology for the e2e link 17 between the right and left ear pieces 12, reusing the Bluetooth® radio receivers 520 that are used to send information back and forth between the ear pieces 12 and the host device 19. In another embodiment, the e2e link is based on magnetic coupling, for example based on a Near Field Magnetic Induction (NFMI) technology. In FIG. 2, this means that transceivers 270a and 270b use NFMI components, for example the NxH2280 fully integrated chip solution, available from NXP Semiconductors of Eindhoven, Netherlands. In this case, piconet P2 540 in FIG. 5 is based on NFMI technology. Since magnetic induction technology used in piconet P2 540 operates at a much lower carrier frequency (such as 10 MHz) than the RF technology used in piconet P1 530, there is no mutual interference.

Furthermore, in each ear piece 12, separate transceivers are used to support communications in piconet P1 530 (transceiver 250) and piconet P2 540 (transceiver 270). As a result, timing alignment considerations as applied in the RF embodiments are not as strict as before, i.e., transmission and reception in piconets P1 and P2 may occur in parallel, simultaneously. An example of the protocol carried over e2e link 17 is visualized in the diagram 1500 shown in FIG. 15. Piconet P1 530 handles the traffic between the smartphone 19 and the primary and secondary ear pieces 12p, 12s. On successful arrival of Bluetooth® audio packets 610 and 612, the primary ear piece 12p returns Bluetooth® ACK packets 611 and 613, respectively. The secondary ear piece 12s merely listens on piconet P1 530. Piconet P2 540 now is the NFMI wireless interface, which may have a completely different timing.

In this example, NFMI transceiver 270 located in the primary ear piece 12p listens to the NFMI transceiver 270 located in the secondary ear piece 12s during receive windows 1509a-c. Likewise, NFMI transceiver 270 located in the secondary ear piece 12s listens to the NFMI transceiver 270 located in the primary ear piece 12p during receive windows 1508a-c. As soon as the primary ear piece 12p receives a successful audio packet, it will send an ARX packet 1511a over piconet P2 540 to the secondary ear piece 12s. This ARX packet 1511a will be sent over piconet P2 540 before the primary ear piece 12p sends the ACK packet 611 over the piconet P1 530. Since the secondary ear piece 12s has correctly received audio packet 610 and it is aware that the primary ear piece 12p also received that audio packet 610 correctly, no further actions are required, i.e., no ARX packet needs to be sent by the secondary ear piece 12s to the primary ear piece 12p. During the next time window until the next audio packet 612 arrives, the radios in the primary and secondary ear pieces 12p, 12s periodically wake up at scan instances 614a-c and 616a-c to check for traffic on the first piconet P1 530, and simultaneously, the transceivers 270a-b scan on the second piconet P2 540. In this example, the scanning is done continuously, but this could also happen at a low duty cycle, for example at the frame boundaries in piconet P2 540 (which are staggered with the frame boundaries in piconet P1 530). When the next audio packet 612 arrives, the same transactions on piconet P1 530 and piconet P2 540 are repeated. Since in the example of FIG. 15 no packets fail, no further action is taken on the piconet P2 540 apart from the ARX packets sent by the primary ear piece 12p.

Figure 15:
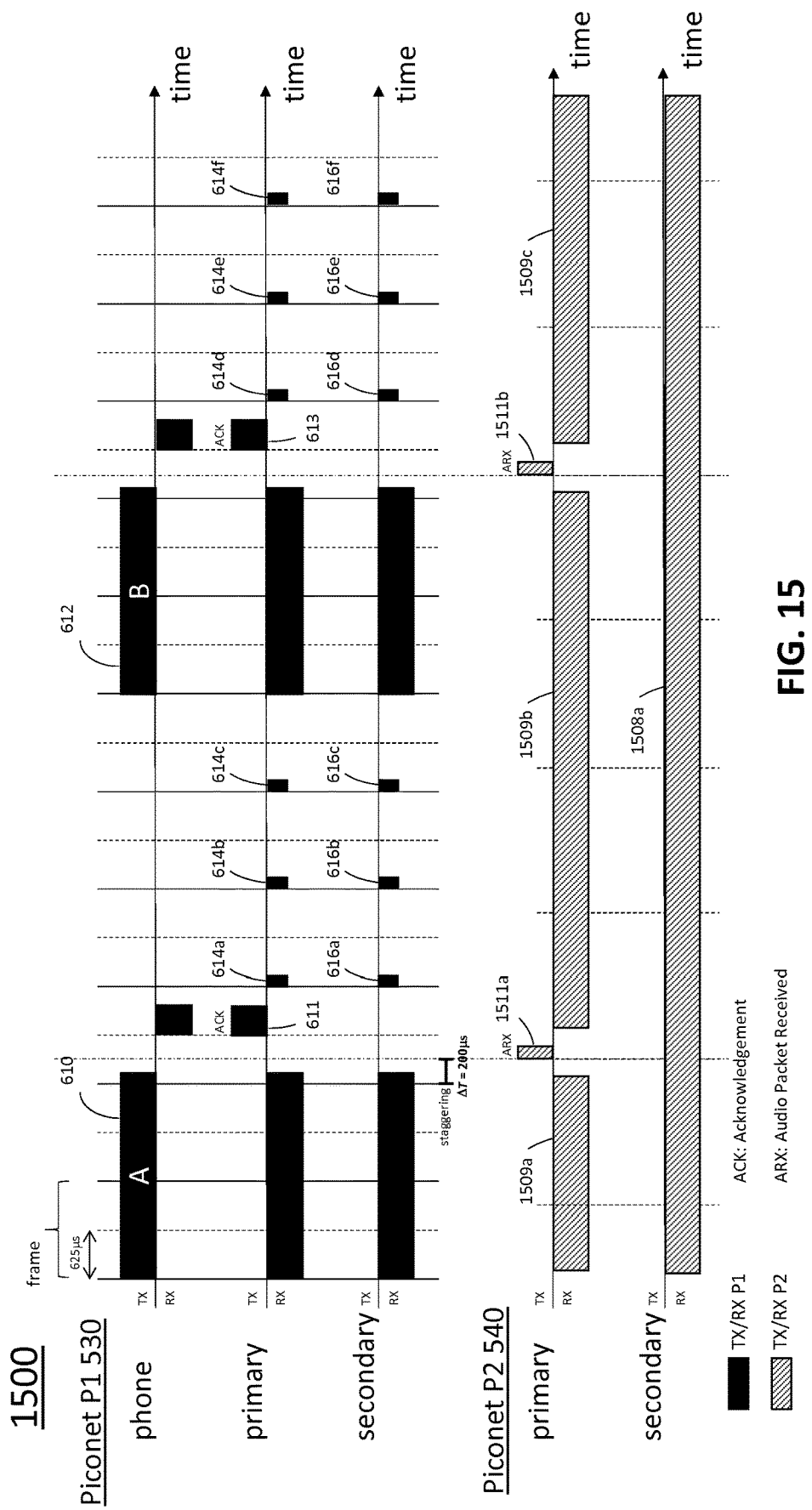
FIG. 15 is a first data flow and timing diagram of a second communication protocol showing successful operation.
Figure 16:
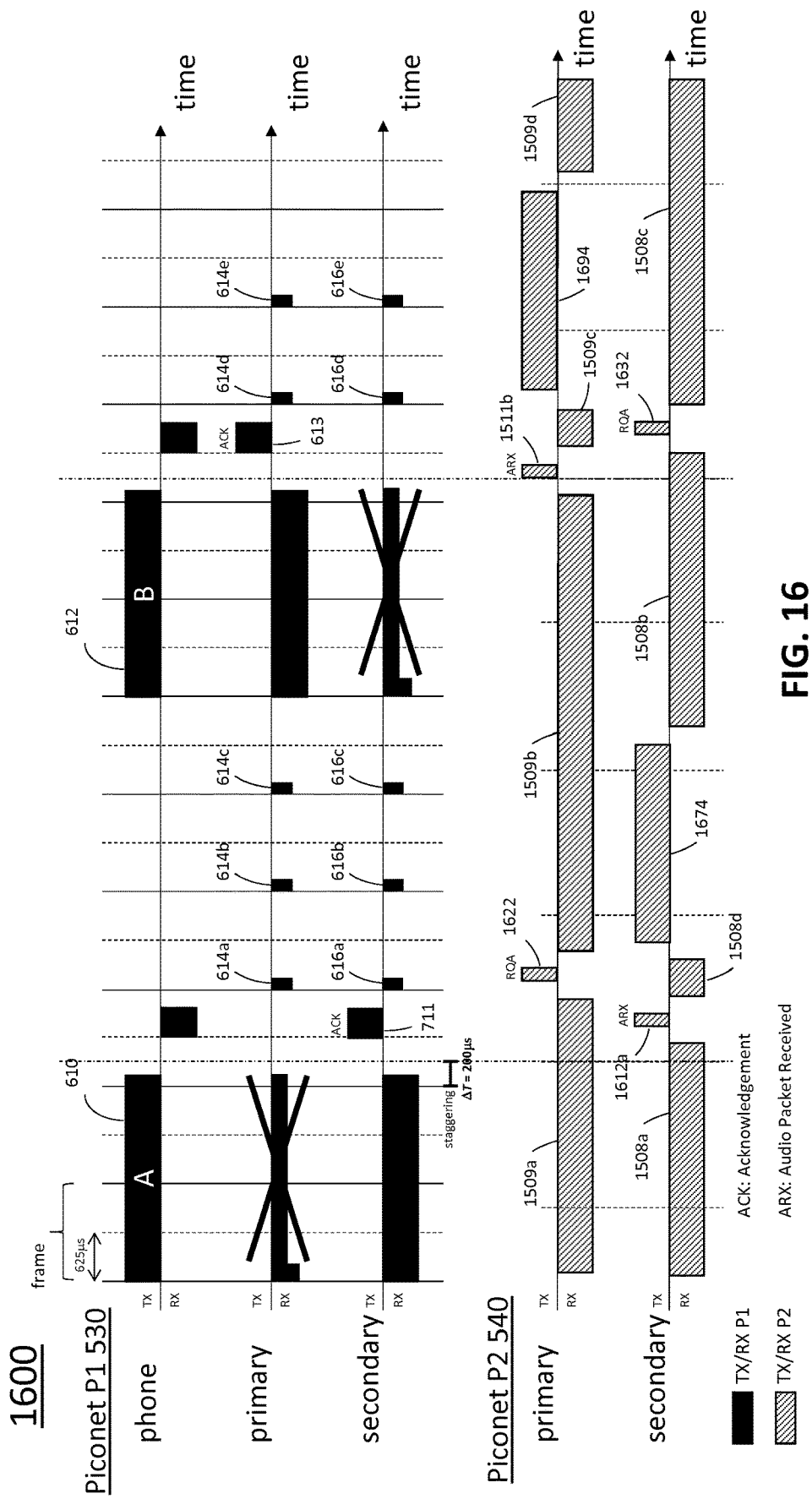
FIG. 16 is a second data flow and timing diagram of the second communication protocol showing erroneous reception by the primary and secondary ear pieces.

This is different in the situation shown in timing diagram 1600 of FIG. 16. Bluetooth® Audio packet 610 sent by the smartphone 19 on piconet P1 530 is received erroneously by the primary ear piece 12p whereas the audio packet 610 is correctly received by the secondary ear piece 12s. Since secondary ear piece 12s does not receive an ARX packet from the primary ear piece 12p just after the audio packet 610 arrival, the secondary ear piece 12s will send an ACK packet 711 on the first piconet P1 530 to inform the smartphone 19 of a successful reception. In addition, it will send an ARX packet 1612a over the second piconet P2 540. The timing of this ARX packet 1612a is not critical, but should be delayed with respect to the transmit timing of the missing ARX packet 1511a of FIG. 15 that would have been sent if the reception had been successful in primary ear piece 12p (unless the e2e transceivers 270a and 270b allow transmission and reception to happen simultaneously, in which case the transmissions of ARX packets 1511a and 1612a can happen at the same time). On reception of the ARX packet 1612a, the primary ear piece 12p requests a forwarding of the audio information by sending an RQA packet 1622 to secondary ear piece 12s. Next, the audio information contained in audio packet 610 is forwarded in packet 1674 from the secondary ear piece 12s to the primary ear piece 12p. At the next audio packet 612 sent on the first piconet P1 530, the primary ear piece 12p receives the audio packet 610 correctly, whereas the audio packet 610 is received erroneously in secondary ear piece 12s. Directly after the reception of audio packet 612, primary ear piece 12p sends an ARX packet 1511b over the second piconet P2 540 and an ACK packet 613 over the first piconet P1 530 to the smartphone 19. The secondary ear piece 12s will then send an RQA packet 1632 to request to the primary ear piece 12p to forward the audio information. In response, the primary ear piece 12p sends the audio information contained in audio packet 612 to the secondary ear piece 12p over the second piconet P2 540 using packet 1694. On piconet P2 540, an ARQ scheme can be added wherein each data packet is acknowledged by the receiver (not shown). It will be understood to those of skill in the art that the other packet failure scenarios as described for the RF embodiments in FIGS. 7-14 are applicable to this NFMI embodiment as well. The same commands and data flow can be used, albeit with different timing and data protocol.

In yet another embodiment, the e2e link 17 is not wireless but wired. The e2e transceivers 270a and 270b shown in FIG. 2 are modems, preferably sending digital signals over a wire or a cable. The wire can be used to provide diversity just as described with respect to the RF and NFMI embodiments described above. Moreover, since the signals over the wire, now representing piconet P2 540, will not interfere with the RF signals used in piconet P1 530, communications occurring in P1 530 and P2 540 can take place simultaneously. In this respect, the wired embodiment is similar to the NFMI embodiment. In fact, the data flow and timing diagrams shown in FIGS. 15 and 16 also apply for the wired embodiment.

Until now, bidirectional diversity for audio streaming (e.g., music streaming) in the downlink, from a host device (smartphone 19) to a left and right ear pieces 12a, 12b, has been discussed (although the content flows in only one direction, control signals such as ACKs in the uplink also enjoy path diversity). Yet, in wireless standards like Bluetooth®, also bidirectional voice is supported in which case, audio content as well as control signals are bidirectional. As used herein, the term "audio content" refers to data representing any audio information—that is, data that will (eventually) be transduced to generate sound waves. Music and voice are two specific (non-exclusive) types of audio content. These cases are discussed separately herein due to their significant differences (e.g., voice is generally bi-directional, and the location of a mic must be considered). However, both music and voice are simply specific examples of "audio content."

In the Bluetooth® standard, voice was originally supported by a Synchronous Connection-Oriented (SCO) connection. This connection type was later extended with ARQ capabilities, which is indicated by eSCO. The eSCO connection uses fixed intervals, typical covering 12 time slots (7.5 ms), see the timing diagram 1700a shown in FIG. 17A. The master on the link alternatively sends and receives voice packets in consecutive time slots. Likewise, the slave alternatively sends and receives voice packets in consecutive time slots, but its timing is staggered by one time slot with respect to the master timing. According to the Bluetooth® standard, the carrier frequency used by the master for the transmission changes for each voice packet and uses a pseudo-random hopping sequence. The carrier frequency used by the slave is identical to the carrier frequency used by the master in the previous time slot. So the master-to-slave time slot and the following slave-to-master time slot, together forming a frame, use the same carrier frequency.

In the first time slot of the eSCO interval, the master sends a voice packet 1710a to the slave. In the second time slot, the slave sends a voice packet 1720a to the master using the same carrier frequency as was used for the transmission of packet 1710a. For voice, typically a 2-EV3 type of packet is used, which contains 60 Bytes of voice data. At a 7.5 ms eSCO interval, this results in a 64 kb/s voice rate. In eSCO, an ARQ scheme is used separately for the master-to-slave connection and for the slave-to-master connection. A typical voice packet used on the eSCO link is also shown in FIG. 17A. Like for data packets shown in FIG. 4, the voice packets have a CRC 440 which can be used to detect bit errors in the packet. In the header 420, there is a 1-bit ARQ field 1701e which is set at logical "1" when the previous voice packet was received successfully and is set at logical "0" otherwise. Therefore, in the header of packet 1720a, the slave can directly indicate whether the voice packet 1710a sent by the master was received correctly or not. If not, the ARQ field 1701e in the header of slave packet 1720a is set at "0" and the master will retransmit the same voice payload in the next master packet 1710b. If this retransmission is also unsuccessful, it can send the same payload again in the next packet 1710c, and so further. The number of retransmissions is a parameter which is negotiated at eSCO link setup, but for the interval shown in FIG. 17A this number cannot be larger than five. All retransmissions of the same voice payload must happen in the same interval. At the start of a new eSCO interval, the old voice payload is flushed and a new voice payload is used in master packet 1712a, the first packet of the next eSCO interval. In practice, the number of retransmissions for voice packets is limited to one or two in order to have capacity available for other services on first piconet P1 530. If the payload in the first direction is acknowledged but not yet in the other direction, acknowledge information (in the packet header) is still needed in the first direction. In that case, the payload in the first direction does not need to be retransmitted as it was received successfully already. Instead a NULL packet 1711a can be used that consists of a preamble 410 and a header 420 only. The header has its own CRC: the Header Error Check (HEC) code 1701f. Typically, this NULL packet is the last packet a master sends in an eSCO interval.

For a bidirectional voice connection, path diversity in the downlink (from phone 19 to ear pieces 12p and 12p) means that a voice packet sent by the phone 19 can reach the primary ear piece 12p directly or via forwarding by secondary ear piece 12s. Likewise, a voice packet sent by the phone 19 can reach the secondary ear piece 12s directly or via forwarding by primary ear piece 12p. Path diversity in the uplink means that the voice information picked up by the microphone in the ear pieces 12p, 12s can reach the phone 19 directly or via forwarding. In the simplest embodiment, only one of the ear pieces has one or more MICs 220. Let us assume the primary ear piece 12p has one MIC 220a that picks up the voice information from the user. This voice information is sent over the eSCO connection to the phone 19, but also needs to be forwarded to secondary ear piece 12s to provide the path diversity.

Figure 17B:
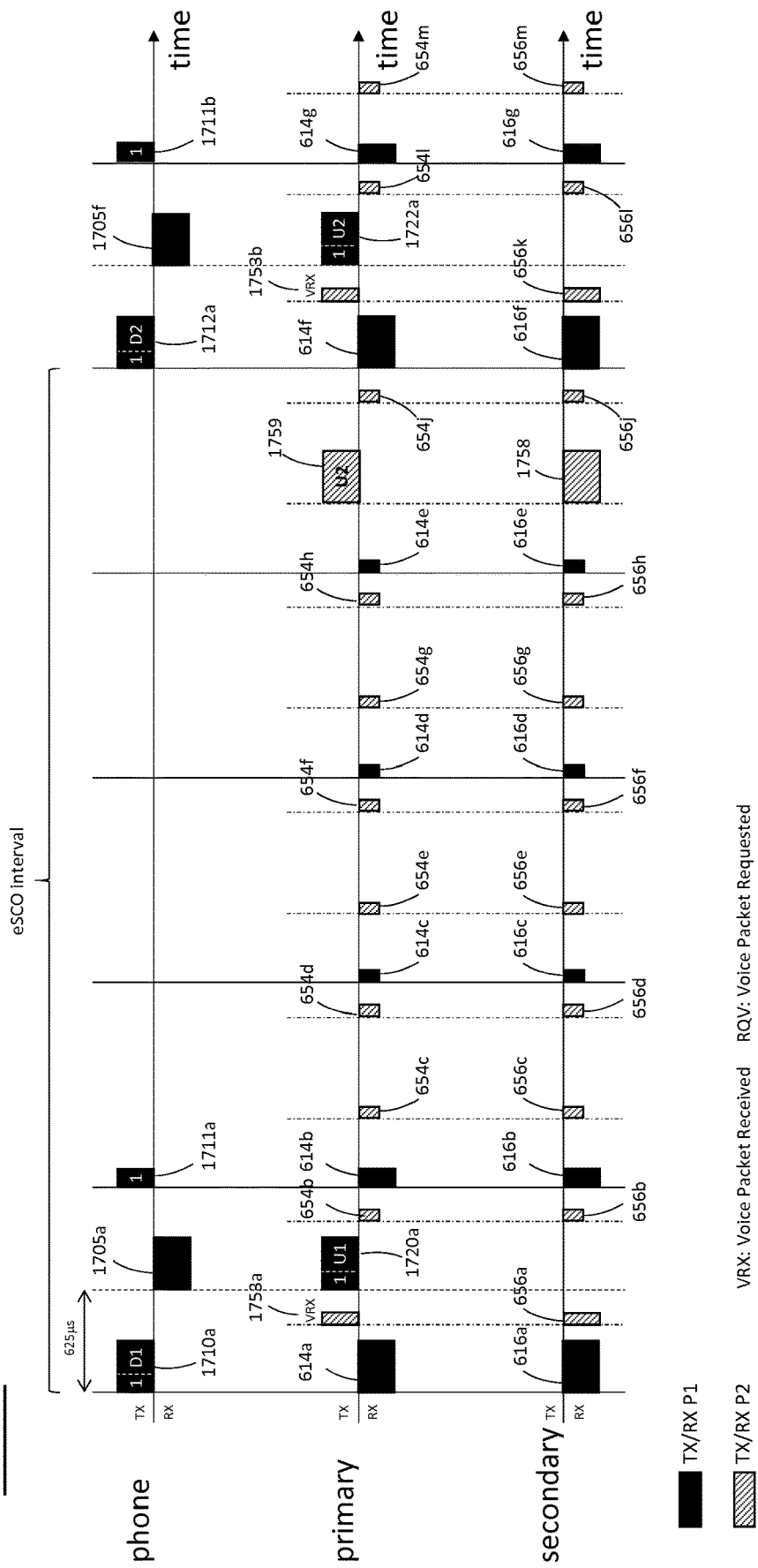
FIG. 17B is a first data flow and timing diagram of the third communication protocol showing successful operation.

The diversity protocol for a bidirectional voice link is visualized as an example in the timing diagram 1700b shown in FIG. 17B (note the eSCO interval here covers 10 time slots instead of 12 times slots as was used before—this is for illustration purposes only). In FIG. 17B, the phone 19 sends a voice packet 1710a over first piconet P1 530. It is assumed that this voice packet is received successfully both in primary ear piece 12p and secondary ear piece 12s in receive windows 614a and 616a, respectively. Directly after the successful voice packet reception in primary ear piece 12p, primary ear piece 12p sends a Voice Packet Received (VRX) packet 1753a over second piconet P2 540 to secondary ear piece 12s in order to inform secondary ear piece 12s that it has received the voice packet 1710a successfully. In the next slot, the primary ear piece 12p will send the voice information U1 picked up by its MIC(s) to the phone 19 using packet 1720a sent over first piconet P1 530. The ARQ field in the header will be set at logical "1" (ACK) to indicate that the previously received voice packet 1710a was received correctly. Since the phone 19 received an ACK in the header of packet 1720a, it will not schedule a retransmission of the voice information. Instead, a NULL packet 1711a is sent over first piconet P1 530 by the phone 19 to acknowledge the reception of the voice information in packet 1720a. The ARQ field in this NULL packet is set at logical "1" (ACK). Thereafter, no voice information exchange over first piconet P1 530 is needed in the remainder of the eSCO interval. Because control packets may be exchanged on first piconet P1 530, the primary and secondary ear pieces 12p and 12s scan at the start of each frame in scan windows 614c-e and 616c-e, respectively. Similarly, scan windows 654c-e and 656c-e are scheduled on the second piconet P2 540 to check for packets on the e2e link 17. Before the start of the next eSCO interval, primary ear piece 12p sends the voice information U2 picked up by its MIC(s) and to be sent to phone 19 in the next eSCO interval to secondary ear piece 12p via second piconet P2 540 using packet 1759. That means that secondary ear piece 12s already has the voice information U2 from primary ear piece 12p before it is sent to phone 19. In the next eSCO interval, again no errors are assumed. Voice information D2 is sent by the smartphone 19 on first piconet P1 530 in packet 1712a and received successfully by primary and secondary ear pieces 12p, 12s. Primary ear piece sends an VRX packet 1753b on the second piconet P2 540 and subsequently sends the voice information U2 in voice packet 1722a which has an ACK in the header to acknowledge the reception of voice information D2. Finally, the phone 19 sends a NULL packet 1711b to acknowledge the reception of voice information U2.

Figure 18:
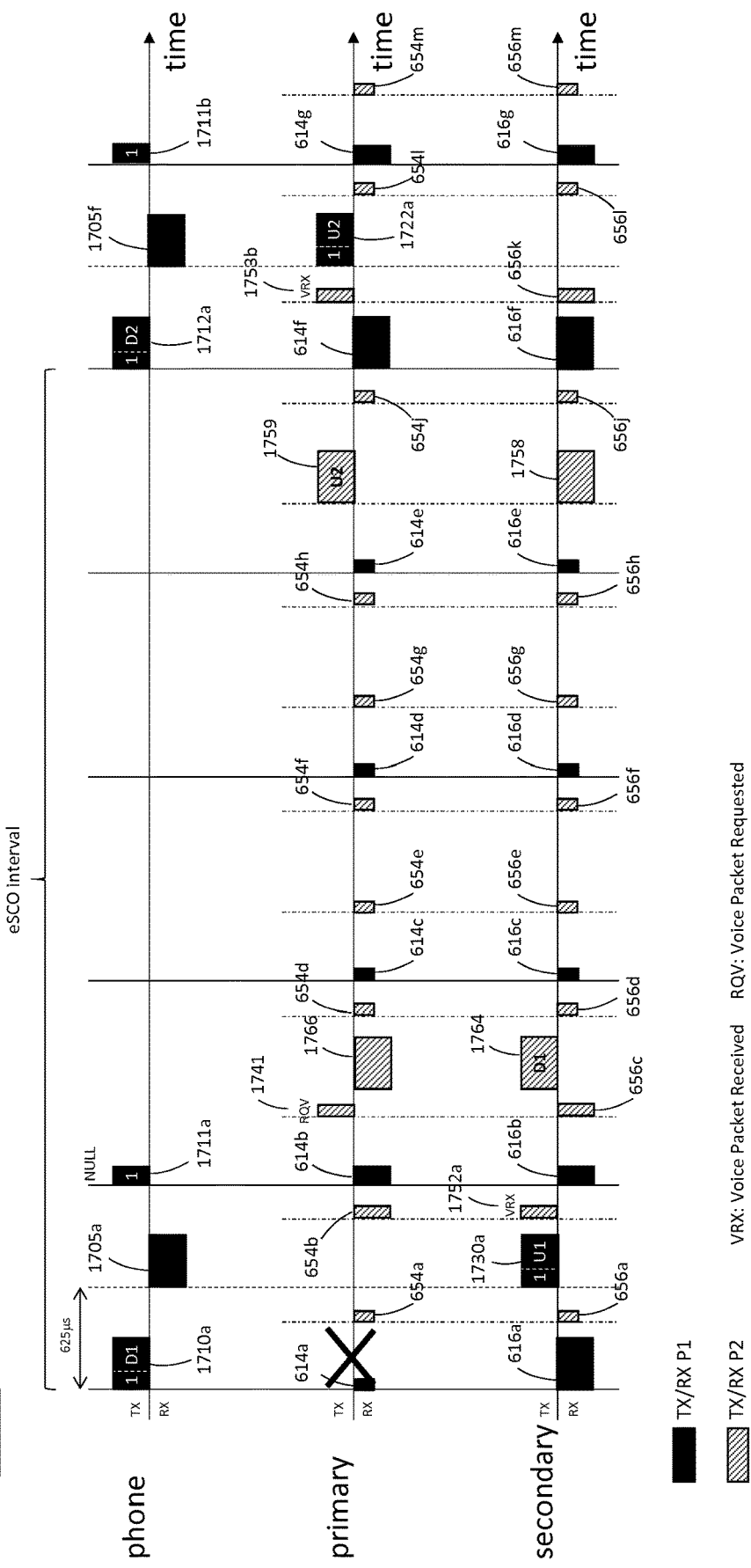
FIG. 18 is a second data flow and timing diagram of the third communication protocol showing a missed reception by the primary ear piece.

Next, in the timing diagram 1800 shown in FIG. 18 it is assumed that the voice packet 1710a containing voice information D1 and sent by smartphone 19 on the first piconet P1 530 is received successfully in secondary ear piece 12s but is missed by primary ear piece 12p. Consequently, primary ear piece 12p will not sent a VRX packet to secondary ear piece 12s over second piconet P2 540 at scan instance 656a. In response to not receiving a VRX packet, secondary ear piece 12s will now send voice information U1 (which it received from primary ear piece 12p in the previous eSCO interval, not shown) in voice packet 1730a over first piconet P1 530. Secondary ear piece 12s will set the ARQ field to ACK (logical "1") to acknowledge successful reception of voice information D1. The smartphone 19 will acknowledge the reception of voice information U1 using the NULL packet 1711a sent on first piconet P1 530. Secondary ear piece 12s will send a VRX packet 1752a over second piconet P2 540. The primary ear piece 12p is thus informed that the secondary ear piece has the voice information D1 available and will send a request for forwarding by sending a Request Voice (RQV) packet 1741 over second piconet P2 540. Secondary ear piece 12*s* will subsequently forward the voice information D1 to the primary ear piece 12*p* in packet 1764 sent over the second piconet P2 540.

Figure 19:
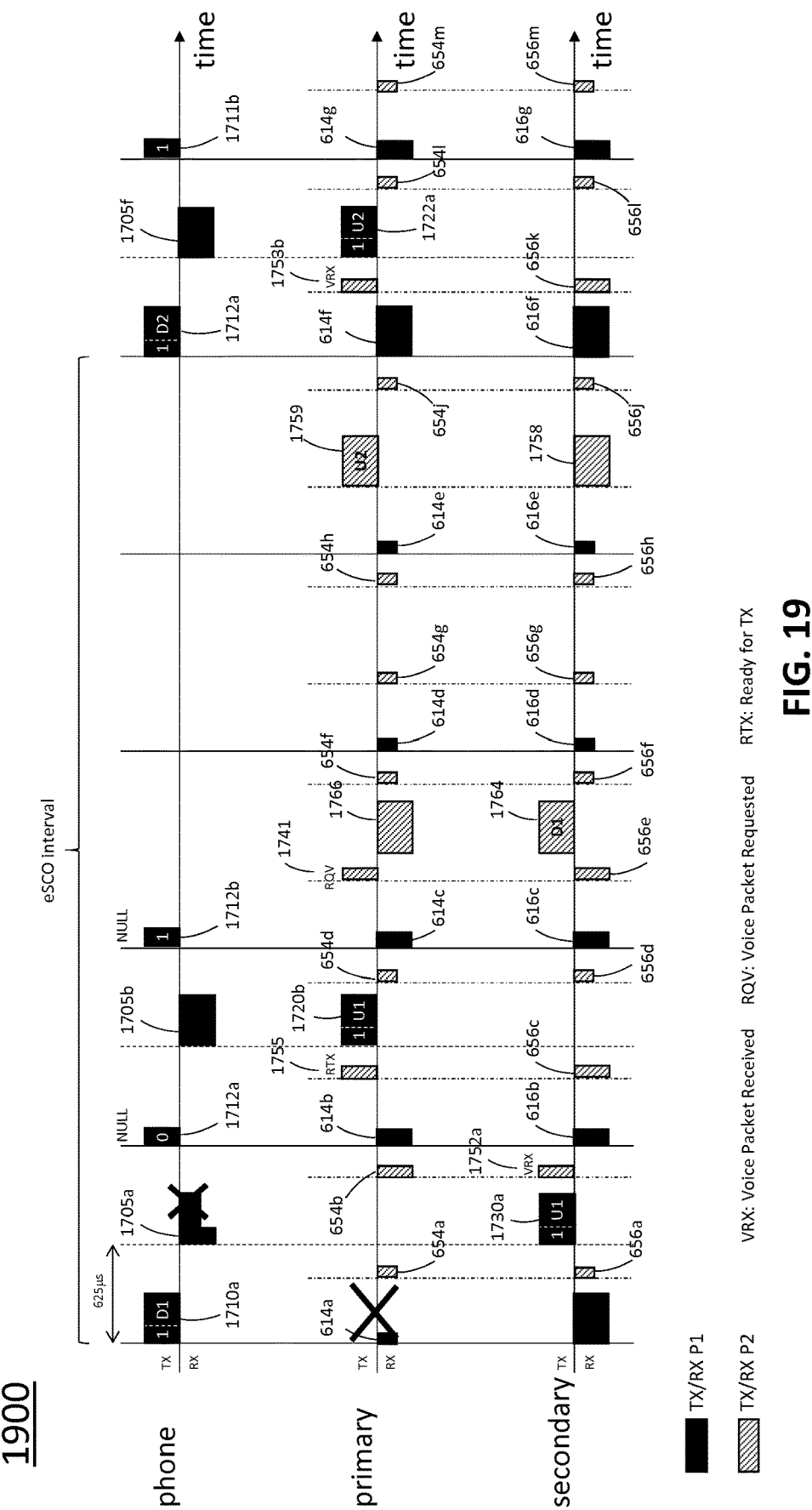
FIG. 19 is a third data flow and timing diagram of the third communication protocol showing a missed reception by the primary ear piece and the phone.

In the timing diagram 1900 shown in FIG. 19, in the first time slot, the same events occur as in FIG. 18, e.g., the voice packet 1710*a* sent by phone 19 is received successfully in the secondary ear piece 12*s* but not in the primary ear piece 12*p*. Secondary ear piece 12*s* sends the voice information U1 in packet 1730*a* over first piconet P1 530. However, it is now assumed that the reception of 1730*a* is erroneous, i.e., the preamble and header are received correctly but the payload fails. Since the reception of D1 is acknowledged properly by the header in voice packet 1730*a*, the phone 19 will not retransmit voice information D1 in a next voice packet but will sent a NULL packet 1712*a* instead. However, in the ARQ field in the header, it will put a NACK (logical "0") since it did not receive the voice information U1 successfully. On reception of the NULL packet 1712*a* in receive window 614*b* on first piconet P1 530, primary ear piece 12*p* sends a Ready to Transmit (RTX) packet 1755 over the second piconet P2 540 to indicate to the secondary ear piece 12*s* that it has received the NULL packet 1712*a* and will do the retransmission of the voice information U1 in the next time slot using packet 1720*b*. This RTX packet 1755 will withhold secondary ear piece 12*s* from sending the voice information U1 as well (assuming it also has received the NULL packet 1712*a* correctly). Assuming the transmission of voice information U1 in packet 1720*b* sent by the primary ear piece 12*p* on first piconet P1 530 is received successfully, phone 19 will return a NULL packet 1712*b* with an ACK (logical "1"). Then it is time for the primary ear piece 12*p* to request the secondary ear piece 12*s* to forward the voice information D1. For this, RQV packet 1741 is sent by primary ear piece 12*p* and the voice information D1 is returned by secondary ear piece 12*s* in data packet 1764 over second piconet P2 540.

Figure 20:
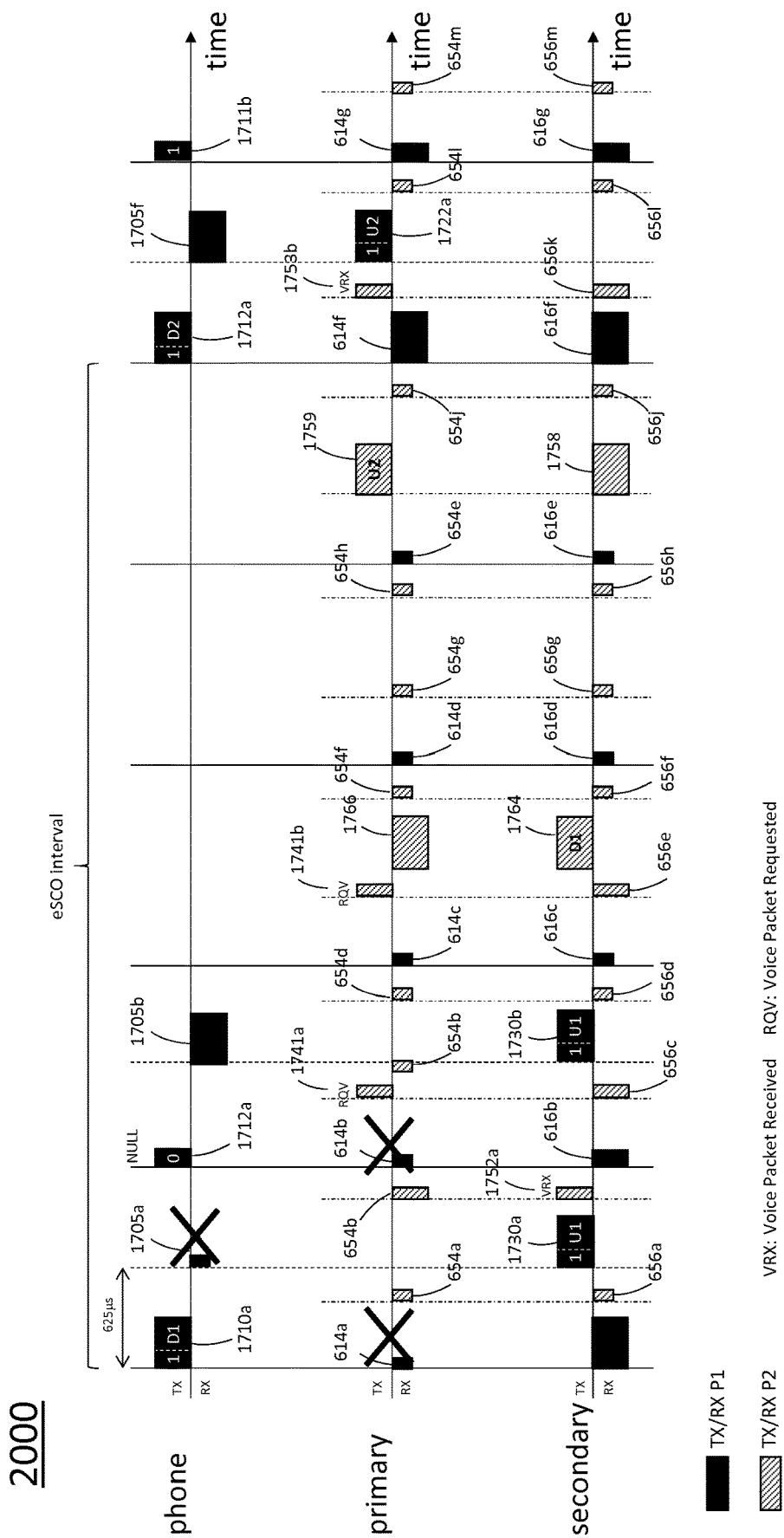
FIG. 20 is a fourth data flow and timing diagram of the third communication protocol showing multiple missed receptions by the primary ear piece.

In the previous paragraph it was assumed that the NULL packet 1712*a* sent by phone 19 over first piconet P1 530 was received correctly by both the primary and the secondary ear pieces 12*p*, 12*s*. In the timing diagram 2000 shown in FIG. 20, a situation is visualized wherein the reception of the NULL packet 1712*a* fails in the primary ear piece 12*p* at receive instance 614*b*. In that case, primary ear piece 12*p* will not send an RTX packet over second piconet P2 540. As a result, the secondary ear piece 12*s* will take the action to (re)transmit the voice information U1 using voice packet 1730*b* sent over first piconet P1 530. On reception of VRX packet 1752*a* on second piconet P2 540, the primary ear piece 12*p* will start to request for forwarding the missing voice information D1. Since there is no response on the first RQV packet 1741*a* (the secondary ear piece 12*s* is busy with resending the voice information U1 on the first piconet P1 530), it will retry with a second RQV packet 1741*b*. In response, the secondary ear piece 12*s* will forward voice information D1 with voice packet 1764 sent on the second piconet P2 540.

Figure 21:
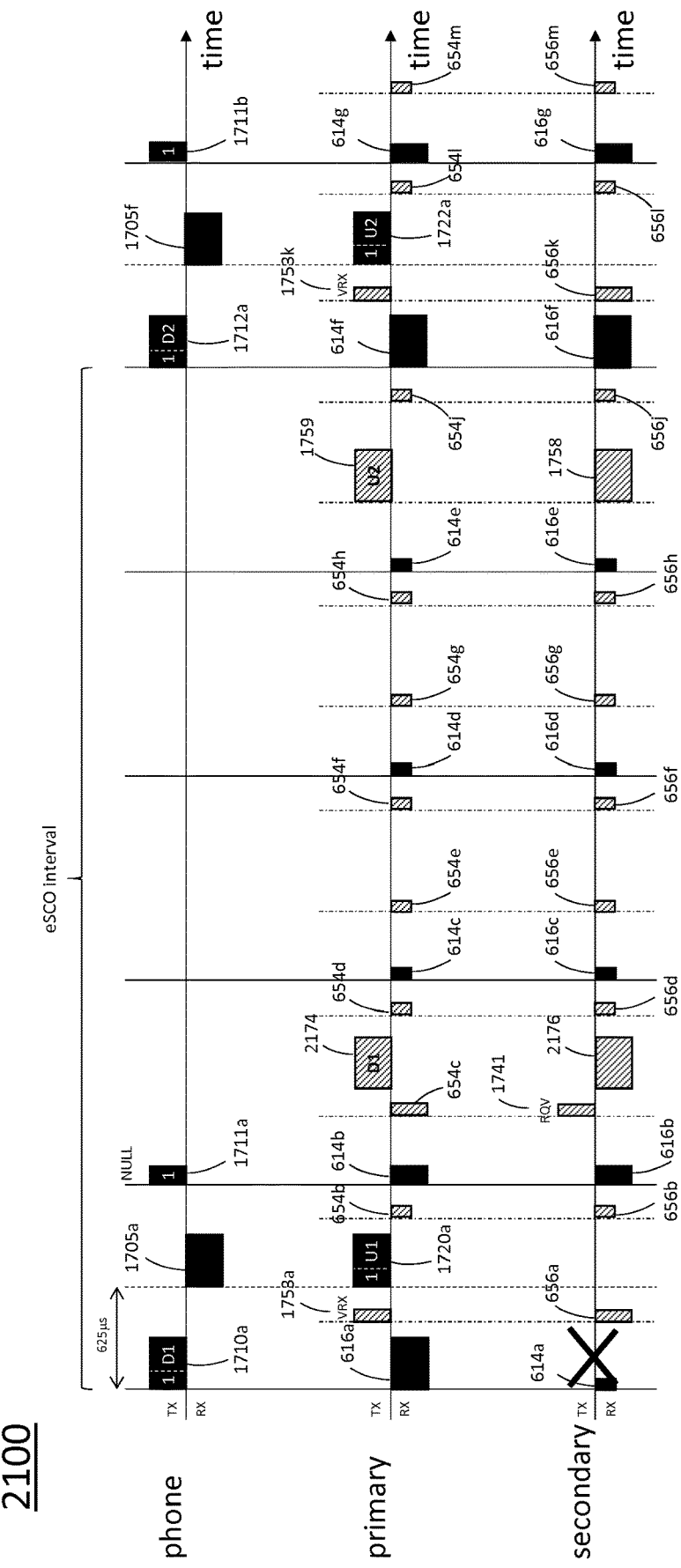
FIG. 21 is a fifth data flow and timing diagram of the third communication protocol showing a missed reception by the secondary ear piece.

In the timing diagram 2100 shown in FIG. 21, the situation is shown when the voice packet 1710*a* sent by the phone 19 on first piconet P1 530 is received successfully in the primary ear piece 12*p* but not in the secondary ear piece 12*s*. Primary ear piece 12*p* will send a VRX packet 1753*a* on second piconet P2 540 to inform the secondary ear piece 12*s* of a successful voice reception. Next, primary ear piece 12*p* will return a voice packet 1720*a* including voice information U1 on first piconet P1 530, with an ACK (logical "1") in the ARQ field 1701*e*. To request forwarding, the RQV packet 1741 is sent by the secondary ear piece 12*s* at the next communication instance on second piconet P2 540. In response, primary ear piece 12*p* will forward the voice information D1 in voice packet 2174 sent on the second piconet P2 540.

Figure 22:
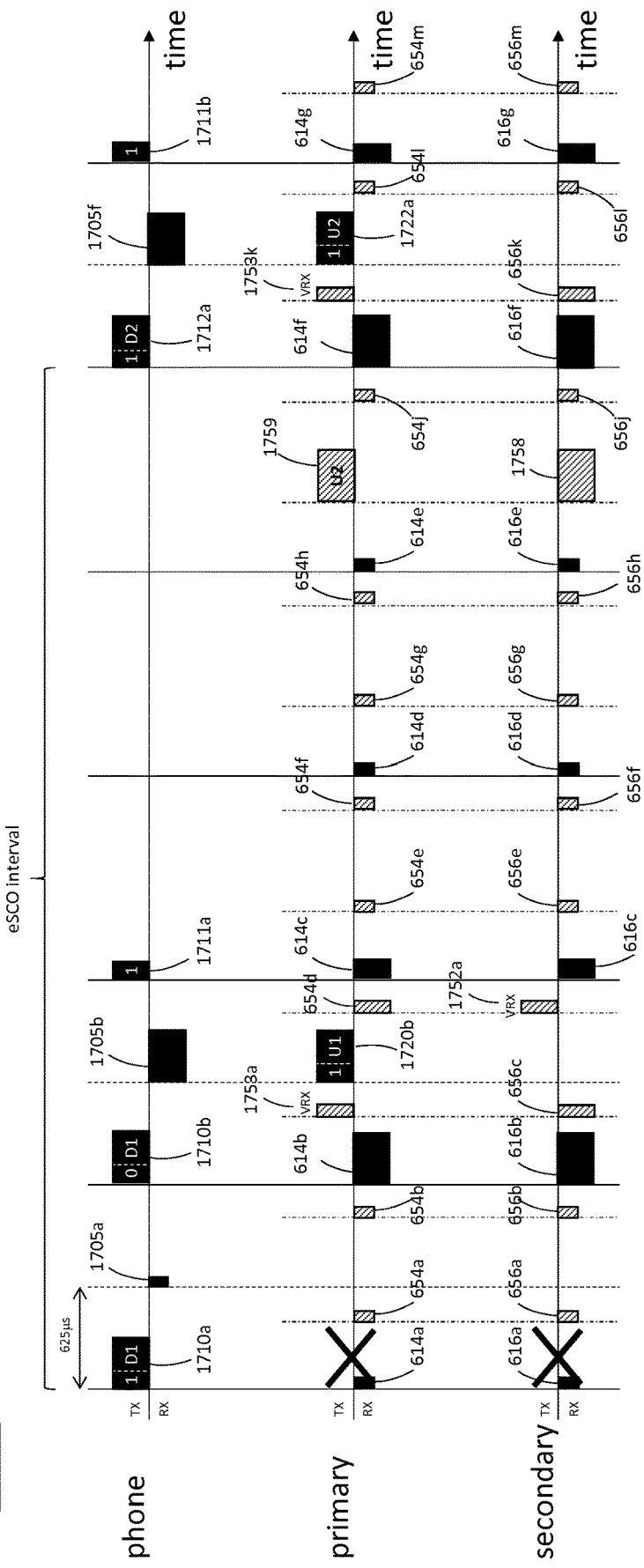
FIG. 22 is a sixth data flow and timing diagram of the third communication protocol showing a missed reception by both ear pieces.

Finally, a situation is described in the timing diagram 2200 shown in FIG. 22 when both the primary and the secondary ear pieces 12*p* and 12*s* miss the reception of voice packet 1710*a* sent by the phone 19 on first piconet P1 530. No VRX packets will be sent at scan instances on the second piconet P2 540 (656*a*, 654*a*), and no voice packets in the return direction (towards the phone 19) on first piconet P1 530 will be sent, nor the ACK information to acknowledge the reception of voice information D1. Therefore, phone 19 will apply a retransmission using voice packet 1710*b* sent on first piconet P1 530. Since it did not receive the voice information U1, it will also use a NACK (logical "0") in the ARQ field in the header of voice packet 1710*b*. Assuming that the retransmission is received successfully by both ear pieces 12*p*, 12*s*, the procedure as shown in FIG. 17B is repeated.

Figure 23:
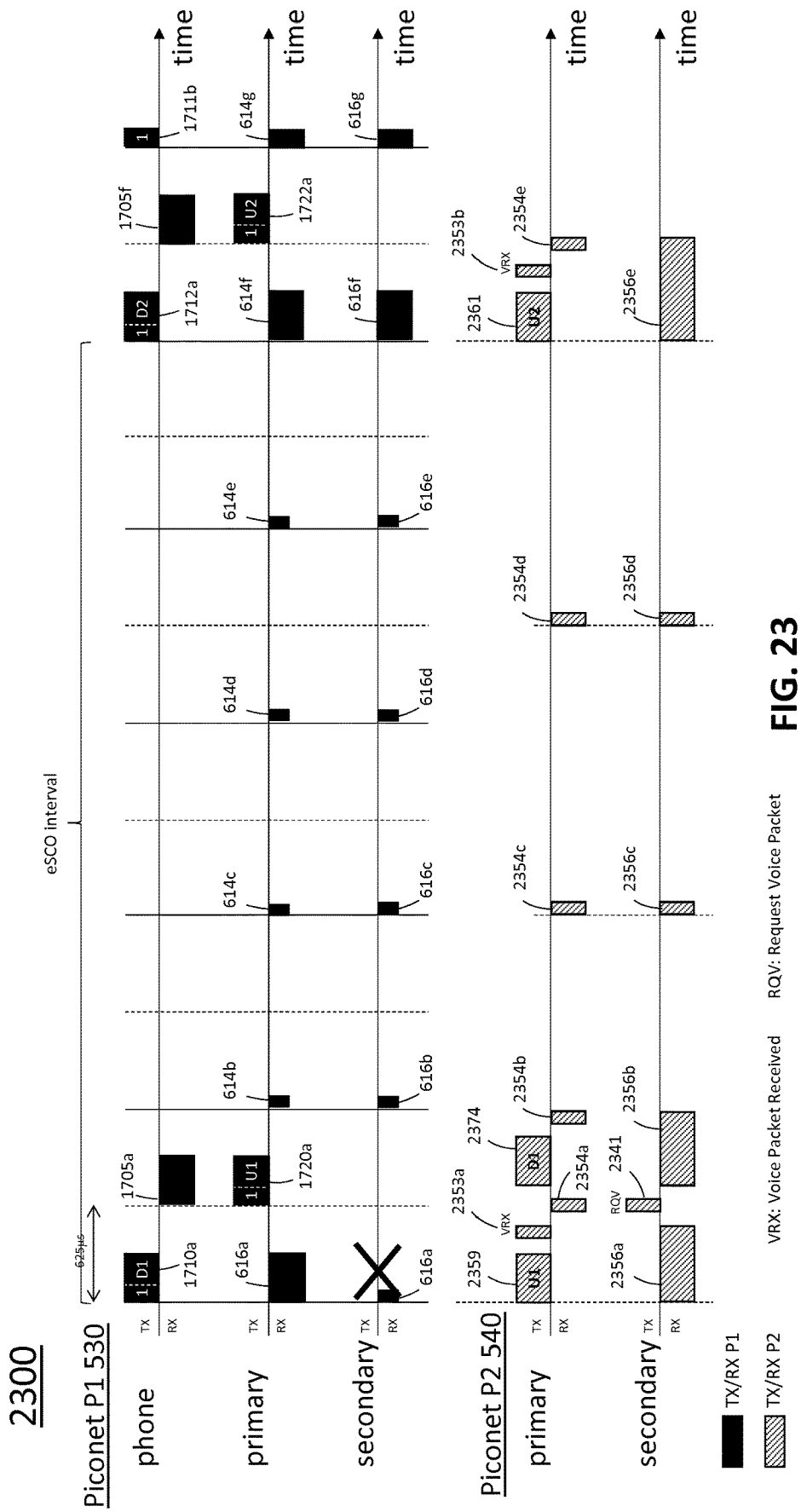
FIG. 23 is a first data flow and timing diagram of a fourth communication protocol showing a missed reception by the primary ear piece.

If the e2e link P2 540 is not a radio link that operates in the same frequency band as P1 530, or if P2 540 does not use radio at all but another technology such as magnetic communications (NFMI) or a wire, no timing multiplexing is required. That is, communications on P2 540 may happen simultaneously with communications on P1 530. This is shown in the timing diagram 2300 of FIG. 23. In FIG. 23, a transceiver 270 for the e2e link 17 is used separately from the transceiver 250 used for the link to the phone 19. The timing between transactions on first piconet P1 530 and transactions on second piconet P2 540 is loosely coupled. While the primary ear piece 12*p* receives the voice packet 1710*a* on first piconet P1 530, it can simultaneously send the voice information U1 to the secondary ear piece 12*s* using packet 2359 on second piconet P2 540. After the primary ear piece 12*p* has successfully received the voice packet 1710*a* on the first piconet P1 530, it can send a VRX packet 2353*a* on the second piconet P2 540. The secondary ear piece 12*s*, being aware of the missed voice information D1 then requests a forwarding using RQV packet 2341 on second piconet P2 540. Primary ear piece 12*p* can forward this information using packet 2374 on second piconet P2 540 roughly simultaneously to the transmission of voice information U1 in voice packet 1720*a* on first piconet P1 530. When there is no more activity on the piconets, the ear pieces can go to sleep, regularly waking up at every frame of the first piconet P1 530 (614*b-e*, 616*b-e*), and waking up at regular times on the second piconet P2 540 (2354*c-d*, 2356*c-d*). In FIG. 23 only a single error condition has been visualized (error in reception of voice packet 1710*a* by secondary ear piece 12*s*); it will be clear to those skilled in the art that the procedures for other error conditions follow the same procedures as shown in FIGS. 17A to 22, but with the communications on the second piconet P2 540 mainly happening in parallel.

It has been assumed that the voice pickup is carried out in a single ear piece (primary or secondary). An ear piece may use multiple MICs; combining the output signals of multiple MICs can provide additional acoustic features like beamforming and noise suppression. In some cases, both ear pieces may have one or multiple MICs. Preferably, the information of all MICs is processed and bundled into a single voice packet before it is sent to the phone 19. In that case, MIC information gathered in the secondary ear piece 12*s* is first sent via the second piconet P2 540 to the primary ear piece 12*p*. There, it is combined with the MIC information gathered in the primary ear piece 12p. After processing, the output is placed in a single voice packet that is first sent to the secondary ear piece 12s over the second piconet P2 540 to provide diversity, and subsequently sent to the phone 19 over the first piconet P 530.

Figure 24:
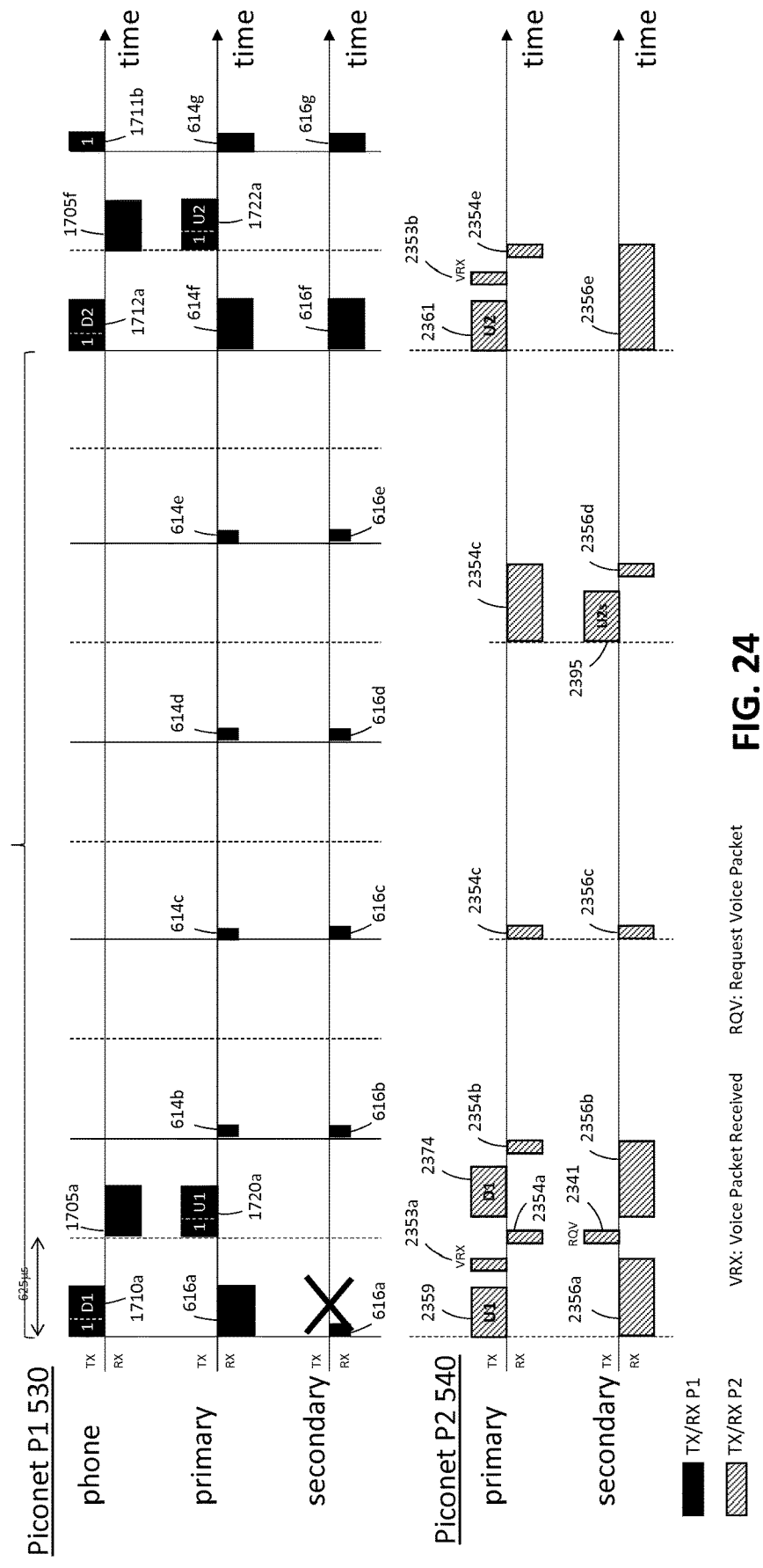
FIG. 24 is a second data flow and timing diagram of a fourth communication protocol showing a missed reception by the secondary ear piece.

An example for a system with separate transceivers for piconet P1 530 and piconet P2 540 is shown in the timing diagram 2400 of FIG. 24. Just before the start of the next eSCO interval, secondary ear piece 12s sends its MIC information U2s in data packet 2395 over second piconet P2 540 to the primary ear piece 12p. This MIC information U2s is subsequently combined and processed with MIC information U2p (not shown) gathered in the primary ear piece 12p. The final result after processing is the voice information U2 and is sent by the primary ear piece 12p first to the secondary ear piece 12p over the second piconet P2 540 using data packet 2361, and next sent to the phone 19 using voice packet 1722a over first piconet P1 530. If the packet 1712a was missed by primary ear piece 12p, secondary ear piece 12s would sent voice information U2, just received in packet 2361 over second piconet P2 540, to the phone 19 over first piconet P1 530, similar to the situation shown in FIG. 20. It will be understood by those skilled in the art that, instead of combining all MIC information in the primary ear piece 12p, the secondary ear piece 12s gathers all the information and combines it. That is, the primary ear piece 12p sends its MIC information U2p (not shown) to the secondary ear piece 12p to be combined and processed with the MIC information picked up in secondary ear piece. The final result is sent back by the secondary ear piece 12s to the primary ear piece 12p before the start of the next eSCO interval.

Figure 25:
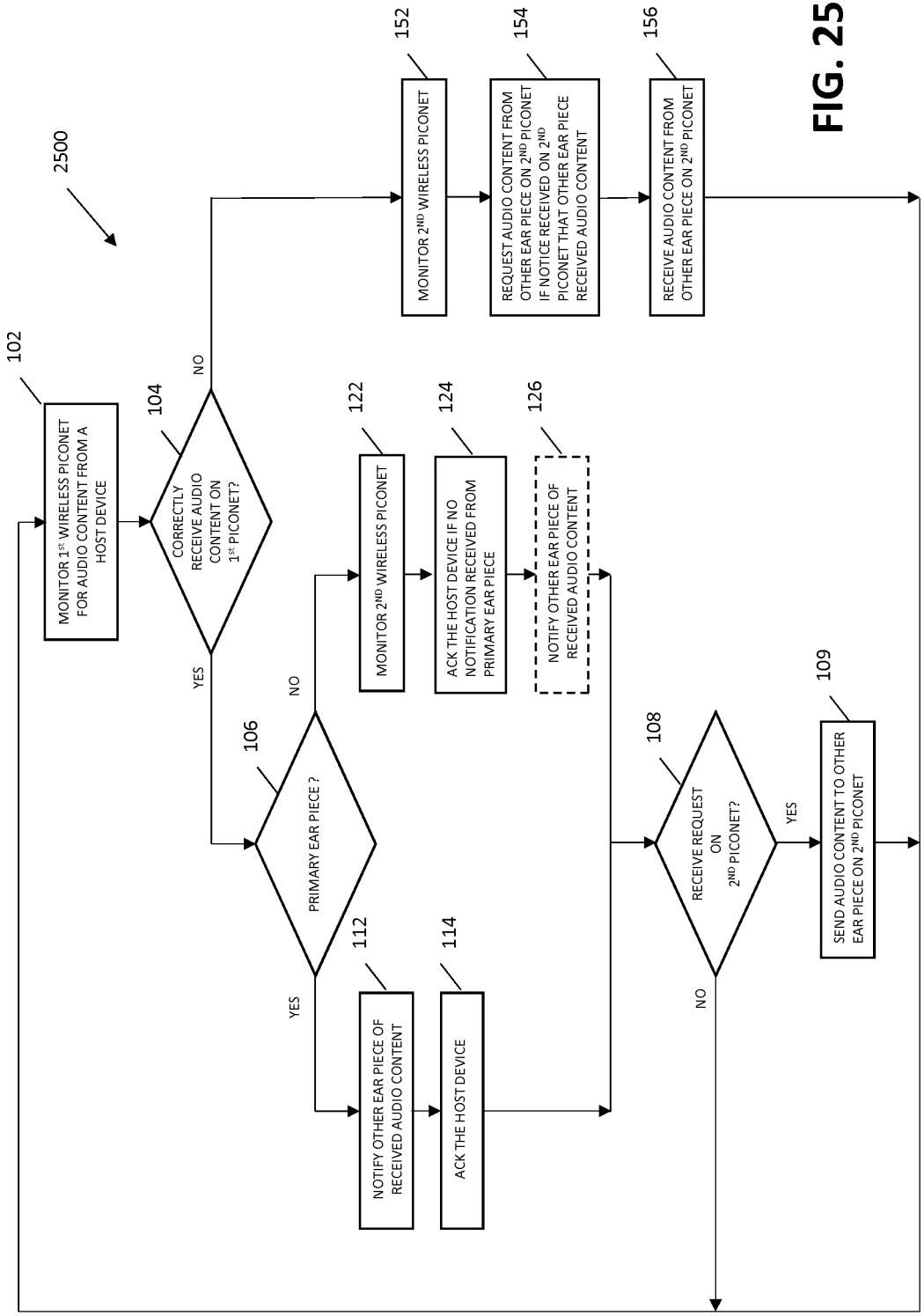
FIG. 25 is a flow diagram of a method of operating each ear piece of a wireless stereo headset, in a first embodiment.

FIG. 25 is a flow diagram of a method 2500 of operating either ear piece 12a, 12b of a wireless stereo headset 12. That is, both the first and second ear pieces 12a, 12b perform the method 2500. Without loss of generality and for ease of explanation, FIG. 25 will be described with respect to a first ear piece 12a. In FIG. 25, the audio content is assumed to be music streaming sent from the phone 19 to the ear pieces 12a and 12b. In the return direction, towards the phone 19, only ACK messages are sent.

The first ear piece 12a monitors a first wireless piconet P1 530 for audio content from a host device 19, such as a Bluetooth® audio packet 400 (block 102). If the first ear piece 12a detects, and correctly receives, the audio content on the first wireless piconet P1 530 (block 104), then if it is currently designated as the primary ear piece 12p, that is, it has established a bidirectional communication channel with the host device 19 (block 106), it sends a notice to the other ear piece (i.e., the second ear piece 12b), on a second piconet P2 540, that the host device 19 sent audio data, that it was correctly received, and that at least part of it was stored (block 112). Then, first ear piece 12a sends an ACK message to the host device 19 on the first wireless piconet P1 530 (block 114).

If first ear piece 12a is not designated as primary ear piece 12p (block 106), first ear piece 12a monitors the second piconet P2 540 (block 122), for a notice from the other ear piece (i.e., the second ear piece 12b). If such a notice is not received, first ear piece 12a sends an ACK message to the host device 19 on the first wireless piconet P1 530 (block 124). Then it sends a notice to the other ear piece (i.e., the second ear piece 12a), on a second piconet P2 540, that the host device 19 sent audio data, that it was correctly received, and that at least part of it was stored (block 126). The last step (block 126) can be skipped if the first ear piece 12a has received a notice from the other ear piece (i.e., the second ear piece 12b).

Irrespectively whether the first ear piece 12a is designated as primary or secondary, it will monitor second piconet P2 540 for a request for audio content (block 108). If, while monitoring the second piconet P2 540, a request for audio content is received from the second ear piece 12b (block 108), then the first ear piece 12a sends at least the portion of the audio content intended for the second ear piece 12b to the second ear piece 12b on the second piconet P2 540 (block 109). If no such request for audio content from the second ear piece 12b is received on the second piconet P2 540 (block 108)—that is, if the second ear piece 12b correctly received the packet on the first wireless piconet P1 530, then control flows back to block 102, and the first ear piece 12a will monitor the first wireless piconet P1 530 for audio content, such as at the beginning of the next frame.

If, at block 104, the first ear piece 12a did not correctly receive the audio content, then either it received it erroneously (errors only in payload) or it missed it (unware of any packet transmission). In either case, the first ear piece 12a monitors P2 540 for a notice on that the second ear piece 12b successfully received the audio content and has the data intended for the first ear piece 12a (block 152). The first ear piece 12a then requests the audio content from the second ear piece 12b over the second piconet P2 540 (block 154), and receives the audio content from the second ear piece 12b in one or more packets over the second piconet P2 540 (block 156).

Figure 26:
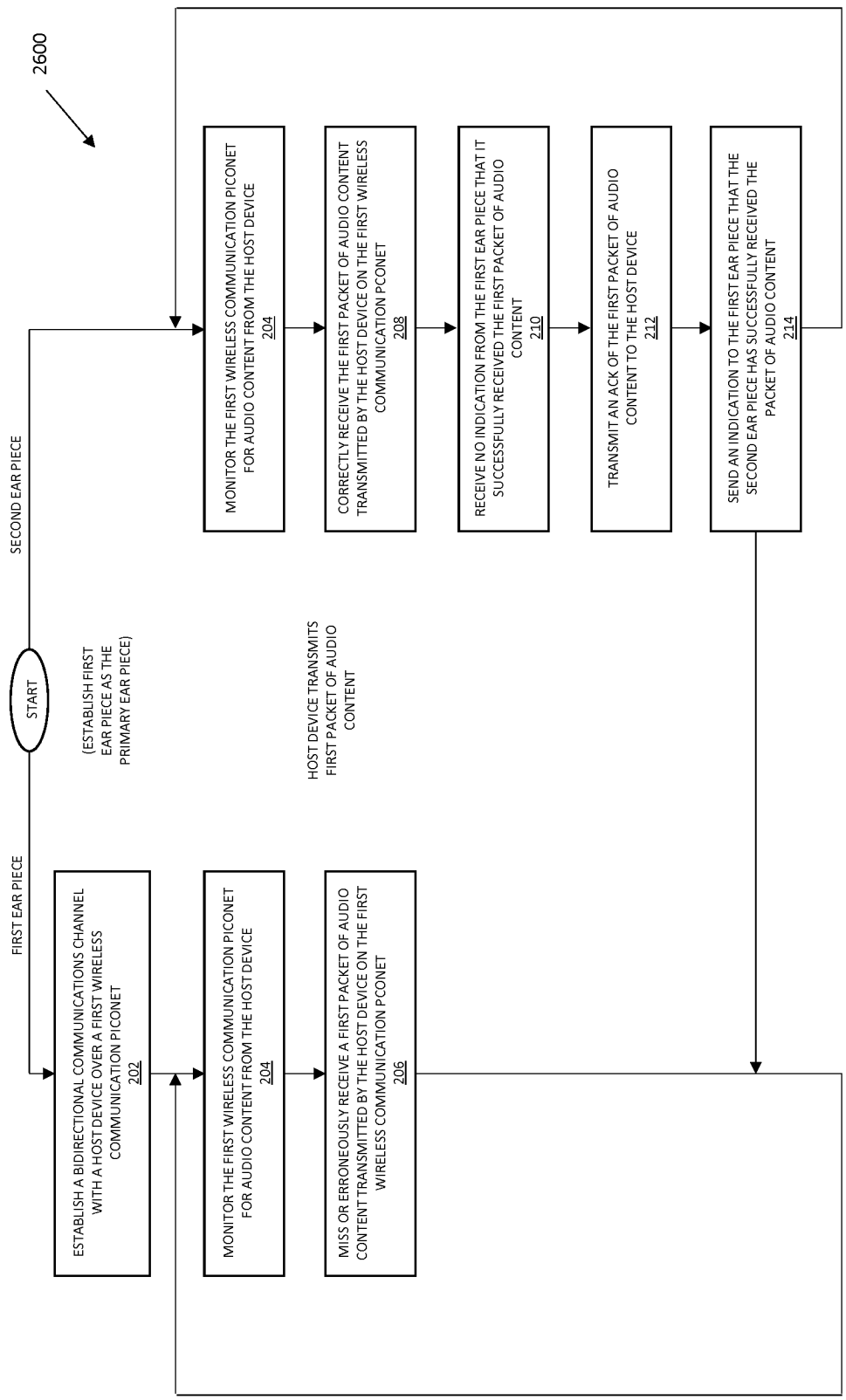
FIG. 26 is a flow diagram of a method of operating both ear pieces of a wireless stereo headset, in the first embodiment.
Figure 28:
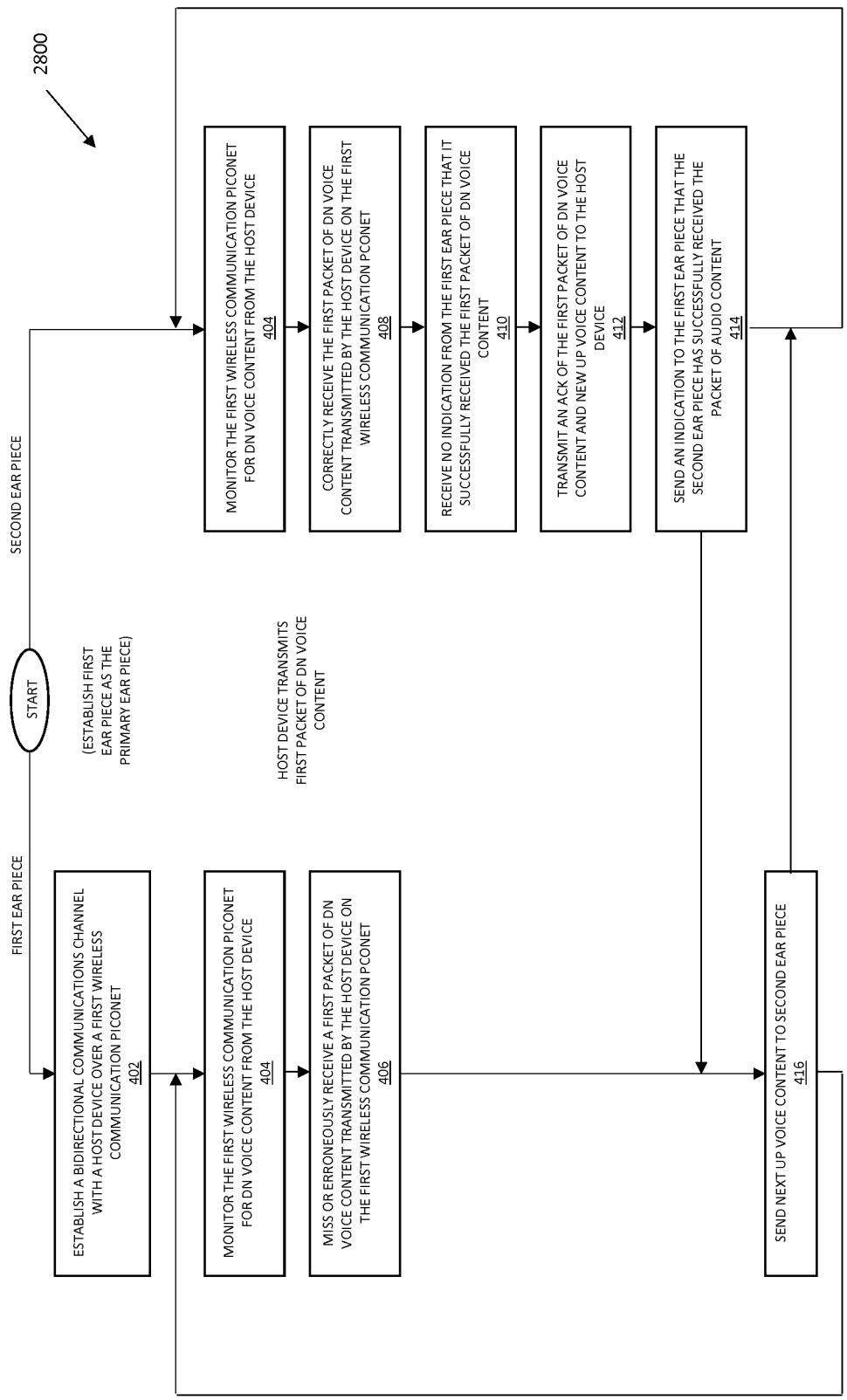
FIG. 28 is a flow diagram of a method of operating both ear pieces of a wireless stereo headset, in the second embodiment.

FIG. 26 is a flow diagram of a method 2600 of receiving audio content, such as music, by a wireless stereo headset 12 comprising first 12a and second 12b ear pieces. FIG. 28 depicts the steps performed by the first ear piece 12a on the left, and those performed by the second ear piece 12b on the right. Initially, the first ear piece 12a establishes a bidirectional communication channel between the first ear piece 12a and a host device 19 over a first wireless communication piconet P1 530 (block 202). As indicated, this makes the first ear piece 12a the primary ear piece 12p. Both the first 12a and second 12B ear pieces monitor the first wireless communication piconet P1 530 for audio content from the host device 19 (block 204, which is depicted as occurring at each ear piece 12a, 12b).

The host device 19 then transmits a first packet of audio content. The first ear piece 12a misses or erroneously receives the first packet of audio content transmitted by the host device on the first wireless communication piconet P1 530 (block 206). However, the second ear piece 12b correctly receives the first packet of audio content transmitted by the host device on the first wireless communication piconet P1 530 (block 208). The second ear piece 12b receives no indication from the first ear piece 12a that the first ear piece 12a successfully received the first packet of audio content (block 210). In one embodiment, this indication may be received on a second communication piconet P2 540. In response to not receiving this indication, the second ear piece 12b transmits an acknowledgement of the first packet of audio content to the host device 19 (block 212). This prevents a retransmission of the first packet of audio content by the host device 19. Next, the second ear piece 12b sends to the first ear piece 12a an indication that the second ear piece 12b successfully received the first packet of audio content (block 214). In one embodiment, this indication may be received on a second communication piconet P2 540.

The first ear piece 12a can then request, and receive, the audio content intended for it from the second ear piece 12b, which correctly received the first packet and stored at least the portion of it intended for the first ear piece 12*a* (not shown). Each ear piece 12*a*, 12*b* then returns to monitoring the first wireless piconet P1 530 (in one embodiment, at a predetermined packet transmission starting point, such as the beginning of every frame) for a new packet of audio content.

Figure 27A:
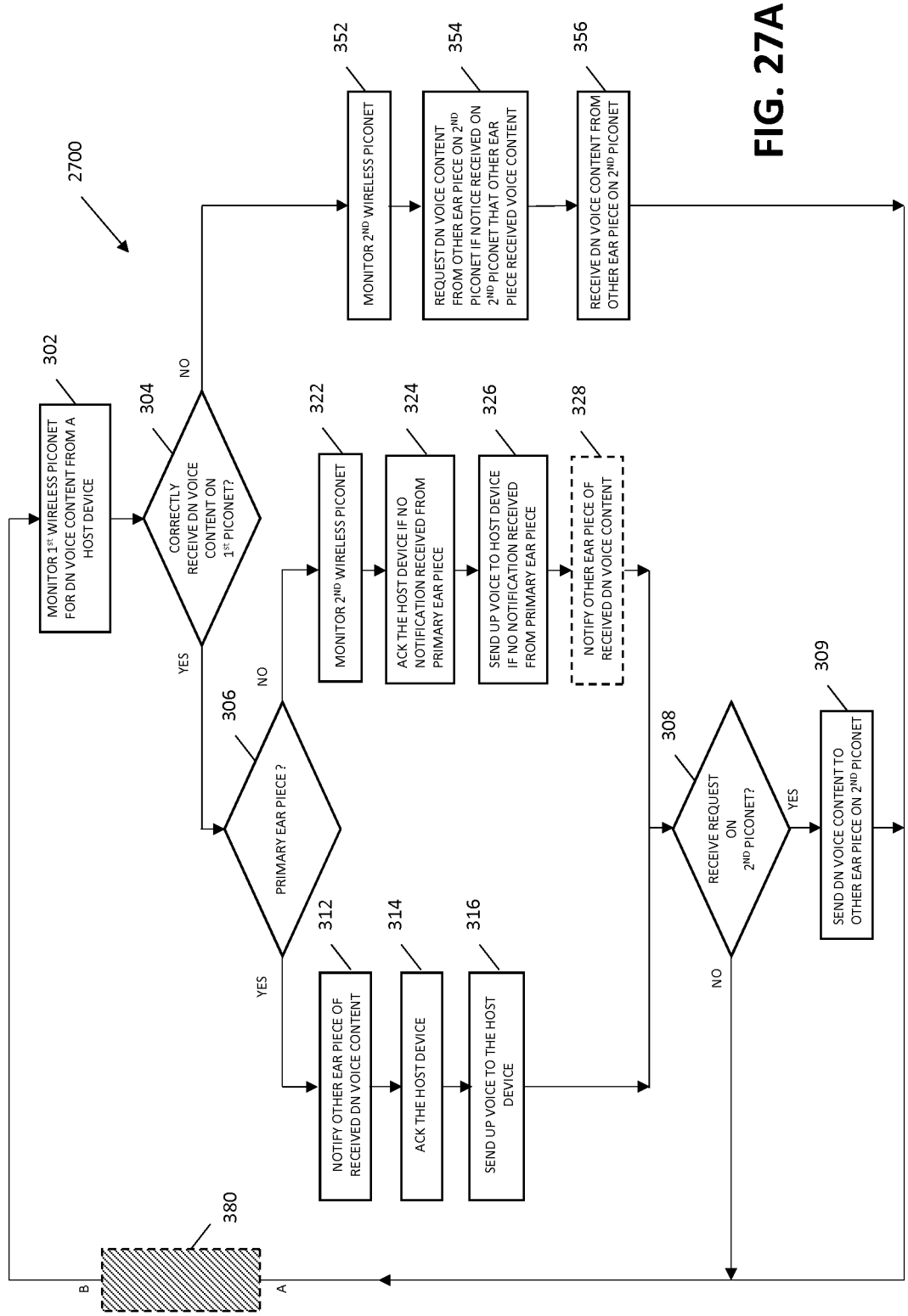
FIG. 27A is a flow diagram of a method of operating each ear piece of a wireless stereo headset, in a second embodiment.

FIG. 27A is a flow diagram of a method 2700 of exchanging audio content, such as voice, between a host device (phone 19) and a wireless stereo headset 12 comprising first 12*a* and second 12*b* ear pieces. Both the first and second ear pieces 12*a*, 12*b* perform the method 2700. Without loss of generality and for ease of explanation, FIG. 26 will be described with respect to a first ear piece 12*a*. In FIG. 27A, the audio content is assumed to be voice sent from the phone 19 to the ear pieces 12*a* and 12*b* and vice versa. It is assumed, the voice pickup takes place in the primary ear piece.

The first ear piece 12*a* monitors a first wireless piconet P1 530 for voice content from a host device 19, such as a Bluetooth® audio packet 400 (block 302). If the first ear piece 12*a* detects, and correctly receives, the voice content on the first wireless piconet P1 530 (block 304), then if it is currently designated as the primary ear piece 12*p*, that is, it has established a bidirectional communication channel with the host device 19 (block 306), it sends a notice to the other ear piece (i.e., the second ear piece 12*b*), on a second piconet P2 540, that the host device 19 sent voice data, that it was correctly received, and that at least part of it was stored (block 312). Then, first ear piece 12*a* sends an ACK message to the host device 19 on the first wireless piconet P1 530 (block 314). It will also send the voice content picked up in the headset 12 (block 316). The ACK message and voice content may be embedded in the same voice packet sent by first ear piece 12*a*—that is, blocks 314 and 316 may be combined.

If first ear piece 12*a* is not designated as primary ear piece 12*p* (block 306), first ear piece 12*a* monitors the second piconet P2 540 (block 322), for a notice from the other ear piece (i.e., the second ear piece 12*b*). If such a notice is not received, first ear piece 12*a* sends an ACK message to the host device 19 on the first wireless piconet P1 530 (block 324). It will also send the voice content picked up in the headset 12 (block 326). The ACK message and voice content may be embedded in the same voice packet sent by first ear piece 12*a*—that is, blocks 314 and 316 may be combined. Then it sends a notice to the other ear piece (i.e., the second ear piece 12*b*), on a second piconet P2 540, that the host device 19 sent audio data, that it was correctly received, and that at least part of it was stored (block 328). The last step (block 328) can be skipped if the first ear piece 12*a* has received a notice from the primary ear piece.

Irrespectively whether the first ear piece 12*a* is designated as primary or secondary, it will monitor second piconet P2 540 for a request for voice content (block 308). If, while monitoring the second piconet P2 540, a request for voice content is received from the second ear piece 12*b* (block 308), then the first ear piece 12*a* sends at least the portion of the voice content to the second ear piece 12*b* on the second piconet P2 540 (block 309). If no such request for voice content from the second ear piece 12*b* is received on the second piconet P2 540 (block 308)—that is, if the second ear piece 12*b* correctly received the packet on the first wireless piconet P1 530—then control flows back to block 302, and the first ear piece 12*a* will monitor the first wireless piconet P1 530 for voice content, such as at the beginning of the next frame.

Figure 27B:
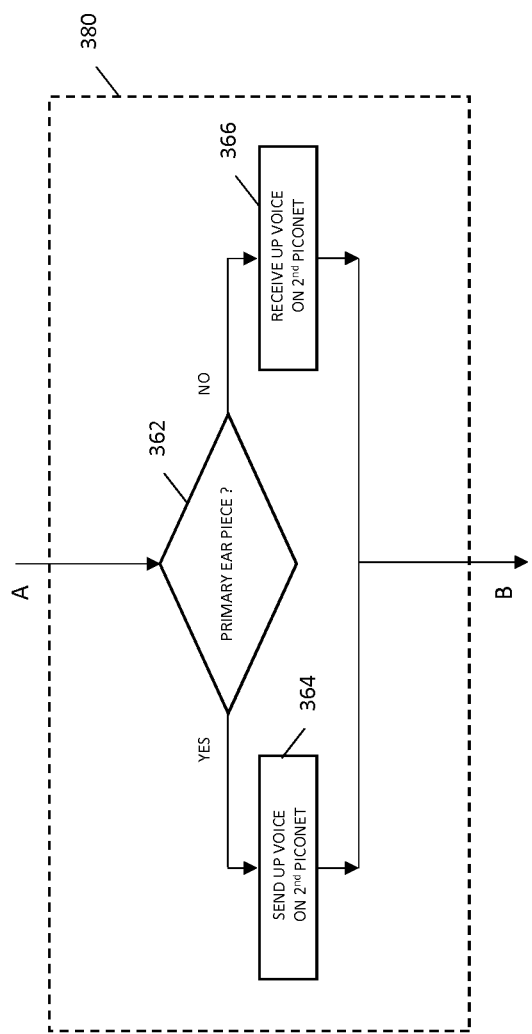
FIG. 27B is a detail of the flow diagram of a method of operating each ear piece of a wireless stereo headset, in the second embodiment.

Yet, before the start of the next frame, the primary ear piece may send the voice content intended to be sent to the phone 19 in the next frame, to the secondary ear piece on the second wireless piconet P2 540. The procedure (block 380) is visualized in the flow diagram shown in FIG. 27B. If the first ear piece 12*a* is designated as the primary ear piece (block 362), it will send the voice content picked up by its MIC(s) to the secondary ear piece over second wireless piconet P2 540 (block 364). If the first ear piece 12*a* is not designated as the primary ear piece (block 362), it will receive the voice content sent by the primary ear piece over second wireless piconet P2 540 (block 366).

We will now return to the start of the frame, with reference to FIG. 27A. If, after monitoring the first wireless piconet P1 530 (block 302), the first ear piece 12*a* did not correctly receive the voice content (block 304), then either it received it erroneously (errors only in payload) or it missed it (unware of any packet transmission). In either case, the first ear piece 12*a* may receive a notice on the second piconet P2 540 that the second ear piece 12*b* successfully received the voice content and has the data intended for the first ear piece 12*a* (block 352). The first ear piece 12*a* then requests the voice content from the second ear piece 12*b* over the second piconet P2 540 (block 354), and receives the voice content from the second ear piece 12*b* in one or more packets over the second piconet P2 540 (block 356).

FIG. 28 is a flow diagram of a method 2800 of receiving and transmitting voice content by a wireless stereo headset 12 comprising first 12*a* and second 12*b* ear pieces. FIG. 28 depicts the steps performed by the first ear piece 12*a* on the left, and those performed by the second ear piece 12*b* on the right. Initially, the first ear piece 12*a* establishes a bidirectional communication channel between the first ear piece 12*a* and a host device 19 over a first wireless communication piconet P1 530 (block 402). As indicated, this makes the first ear piece 12*a* the primary ear piece 12*p*. As explained above, prior to the beginning of a P1 frame, an ear piece having a MIC, such as for example the right ear piece 12*a*, may send to the other (left) ear piece 12*b* voice data, over the e2e link 17 (not shown). Both the first 12*a* and second 12*b* ear pieces monitor the first wireless communication piconet P1 530 for voice content from the host device 19 (block 404, which is depicted as occurring at each ear piece 12*a*, 12*b*).

The host device 19 then transmits a first packet of (downlink) voice content. The first ear piece 12*a* misses or erroneously receives the first packet of (downlink) voice content transmitted by the host device on the first wireless communication piconet P1 530 (block 406). However, the second ear piece 12*b* correctly receives the first packet of (downlink) voice content transmitted by the host device on the first wireless communication piconet P1 530 (block 408). The second ear piece 12*b* receives no indication from the first ear piece 12*a* that the first ear piece 12*a* successfully received the first packet of (downlink) voice content (block 410). In one embodiment, this indication is monitored for on a second communication piconet P2 540. In response to not receiving this indication, the second ear piece 12*b* transmits an acknowledgement of the first packet of (downlink) voice content to the host device 19 (block 412) and transmits the (uplink) voice content picked up by the headset 12. Next, the second ear piece 12*b* sends to the first ear piece 12*a* an indication that the second ear piece 12*b* successfully received the first packet of (downlink) voice content (block 414). In one embodiment, this indication may be sent on a second communication piconet P2 540.

The first ear piece 12a can then request, and receive, the voice content from the second ear piece 12b, which correctly received the first packet and stored at least the portion of it intended for the first ear piece 12a (not shown). Thereafter, the first ear piece 12a sends the (uplink) voice content it picked up in its MIC(s) to the second ear piece 12b (416). In one embodiment, this (uplink) voice content may be transmitted on a second communication piconet P2 540. Finally, each ear piece 12a, 12b returns to monitoring the first wireless piconet P1 530 (in one embodiment, at a predetermined packet transmission starting point, such as the beginning of every frame) for a new packet of (downlink) voice content.

Figure 29:
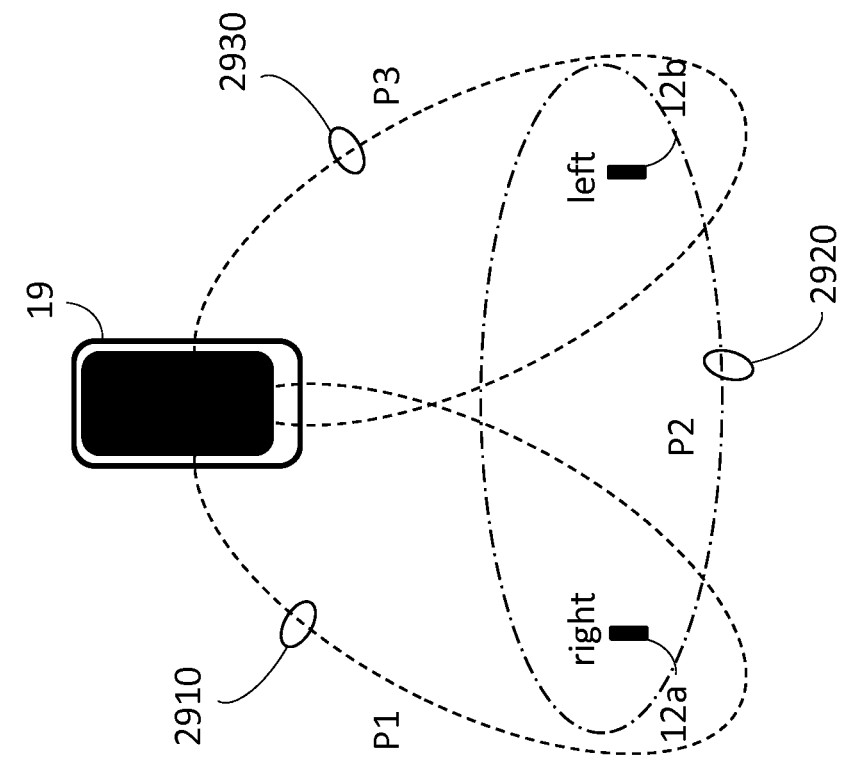
FIG. 29 shows three Bluetooth® piconets.

In FIG. 29, another embodiment is shown. To support the configuration 2900 of FIG. 29, either the circuit diagram shown in FIG. 2 or FIG. 3 can be used. In contrast to the configuration shown in FIG. 5, FIG. 29 depicts an embodiment in which three piconets are active. A first piconet P1 2910 connects the smartphone 19 and one ear piece, for example the right ear piece 12a, similar to the piconet P1 530 of FIG. 5. A second piconet P2 2920 provides an e2e channel connecting the right and left ear pieces 12a, 12b, similar to the piconet P2 540 of FIG. 5. New to the embodiment of FIG. 29 is a third piconet P3 1630, connecting the smartphone 19 with the left ear piece 12b. That is, in the configuration shown in FIG. 29, the phone 19 serves the left and right ear pieces 12a, 12b with two separate piconets P1 and P3. In embodiments in which the piconets P1, P3 are implemented with Bluetooth®, each has its own frequency hop pattern, addresses, and possibly access codes. In this embodiment, the ear pieces 12a and 12b operate independently, while coordinating to provide diversity. Accordingly, the concept of "primary" and "secondary" roles does not apply. In the following discussion, the ear pieces 12 are referred to as right 12a and left 12b, although those of skill in the art will appreciate that any particular transaction discussed herein could be implemented with the ear pieces 12 interchanged. In this embodiment, the left ear piece 12b does not "listen in" and receive packets sent on piconet P1 2910, which are intended for the right ear piece 12a. Nor can the left ear piece 12b receive packets sent by right ear piece 12a on piconet P1 2910, intended for the smartphone 19. In other words, ear pieces 12a and 12b can only communicate via the e2e link formed by piconet P2 2920. For those skilled in the art, it will be clear that P1 2910 and P3 2930 can also represent different channels in the same piconet. For example, P1 and P3 can be separate ACL channels in a Bluetooth® Classic piconet, each with its own Logical Transport Address (LT_ADDR). Alternatively, P1 and P3 can be different physical channels as defined in Bluetooth® Low Energy, each with its own hopping sequence and access address.

In order for the diversity concept to operate in this configuration, the same left and right audio information is sent on both links P1 and P3 to ear piece 12a and ear piece 12b, respectively. Since both left and right audio information is present in each ear piece 12a, 12b, one ear piece 12 can forward the proper audio information via the e2e link P2 to the other ear piece 12 in case the latter ear piece 12 misses the audio information and requests a forwarding. As discussed above, the P2 link can be either a radio link, for example based on Bluetooth®; a magnetic link, for example based on NFMI; or a wired link.

Figure 30:
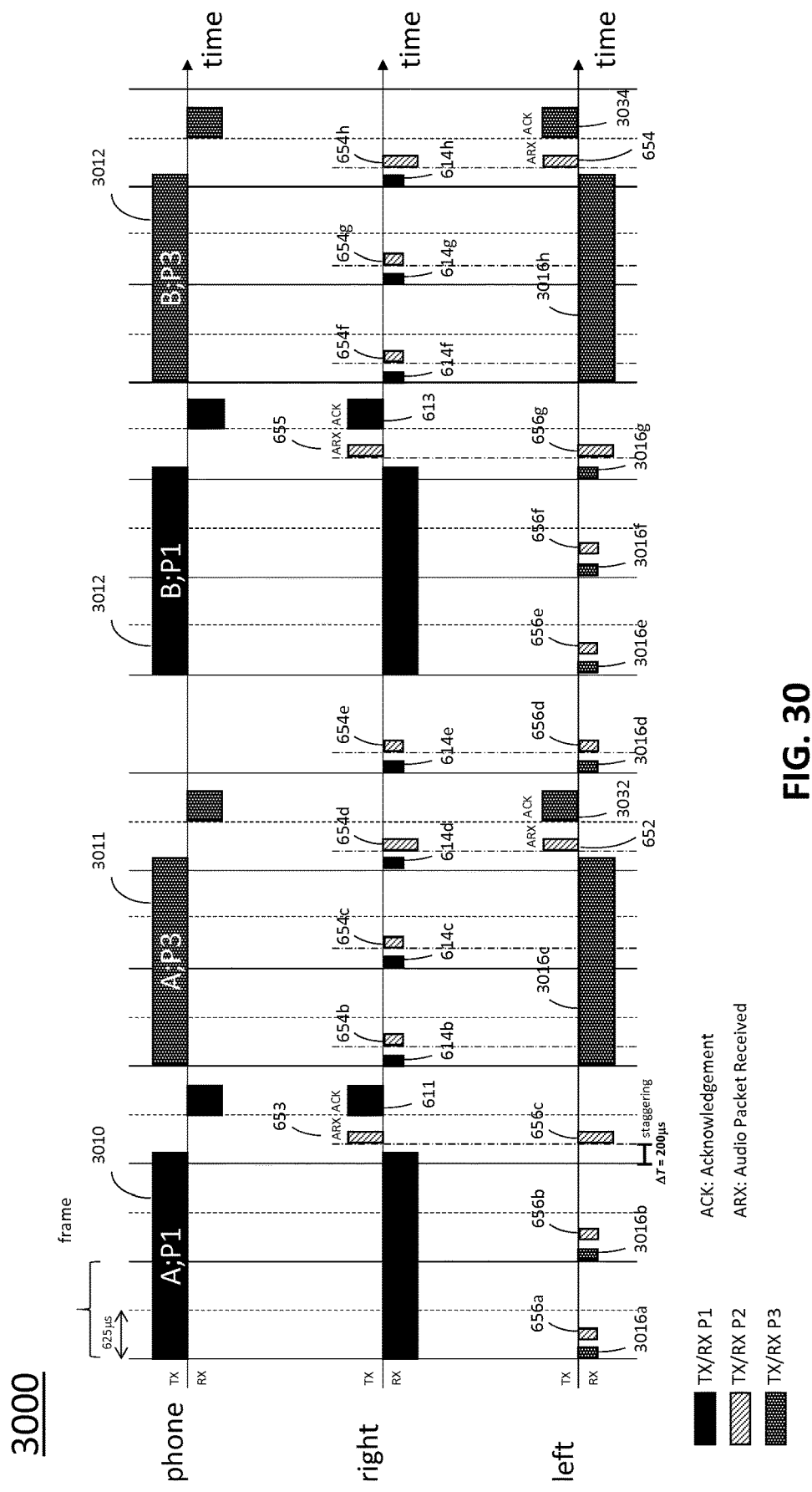
FIG. 30 is a first data flow and timing diagram of a fifth communication protocol showing successful operation.

FIG. 30 shows a first data flow and timing diagram 3000 of a communication protocol providing diversity in the 3-piconet embodiment of FIG. 30. In this first diagram, no packet failures are experienced on the links. The smartphone 19 first sends packet A 3010 on piconet P1 2910 towards the right ear piece 12a. This packet 3010 contains both the left and right audio information. The right ear piece 12a will only use the right audio information intended for the right ear, and will produce an audible sound in the right speaker 210a. The left audio information is (temporarily) stored in the right ear piece 12a for later use. After receiving the packet 3010 correctly, at the next frame boundary in piconet P2 2920, the right ear piece 12a will send an ARX packet 653 to the left ear piece 12b to inform 12b that 12a has successfully received the audio packet A 3010. Thereafter, right ear piece 12a returns an ACK packet 611 on P1 2910 to inform the smartphone 19 of a successful reception. In the meantime, the left ear piece 12b alternatively listens on piconet P3 2930 (listening instances 3016a, 3016d, etc.) and on piconet P2 2920 (listening instances 656a, 656b, etc.) for packets sent by the smartphone 19 or the right ear piece 12a, respectively. The left ear piece 12b listens on P3 2930 at the start of the frames defined by piconet P3 2930, and listens on P2 2920 at the start of the frames defined by piconet P2 2920, which are staggered in time.

After the transmission of packet 3010 to the right ear piece 12a, the smartphone 19 sends a packet 3011 with the same (left and right) audio information on piconet P3 2930 to the left ear piece 12b. The left ear piece 12b will only use the left audio information intended for the left ear to produce an audible sound in the left speaker 210b. The right audio information is (temporarily) stored in the left ear piece 12b for later use. After receiving the packet 3011 correctly, the left ear piece 12b sends an ARX packet 652 to the right ear piece 12a to inform 12a that 12b has successfully received the audio packet A 3011 using piconet P2 2920, and returns an ACK packet 3032 to inform the smartphone 19 of a successful reception using piconet P3 2930. In the meantime, the right ear piece 12a alternatively listens on piconet P1 2910 (listening instances 614b, 614c, etc.) and on piconet P2 2920 (listening instances 654b, 654c, etc.) for packets sent by the smartphone 19 and the left ear piece 12b, respectively. Since there were no errors, no further action is taken. The right ear piece 12a will listen alternatively on P1 and P2, and the left ear piece 12b will listen alternatively on P3 and P2, until the next audio packet from the smartphone 19 arrives (for example packet B 3012).

Figure 31:
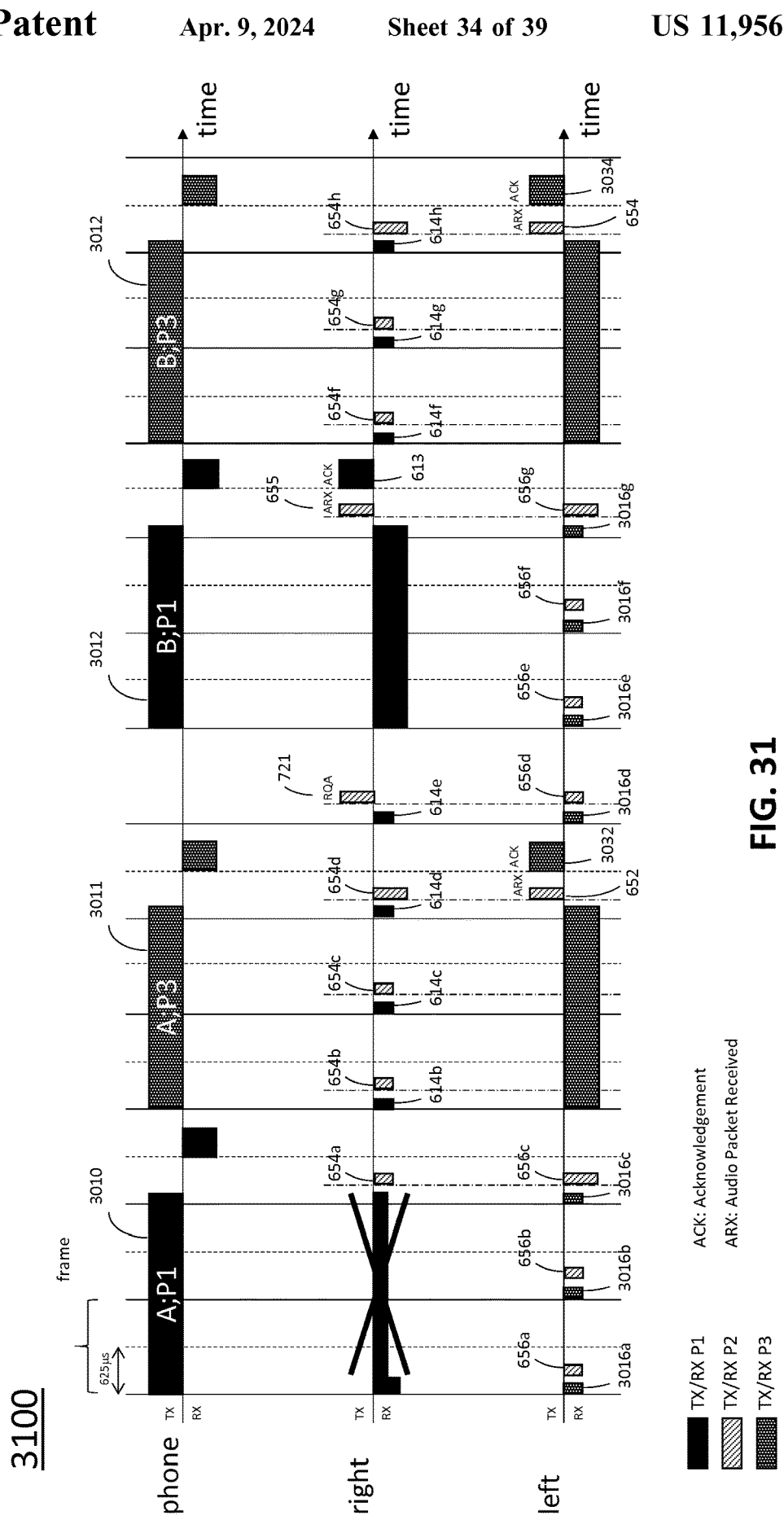
FIG. 31 is a second data flow and timing diagram of a fifth communication protocol showing a missed reception by the primary ear piece.

FIG. 31 shows a second data flow and timing diagram 3100 of a communication protocol providing diversity in the 3-piconet embodiment of FIG. 29. In this case, the packet A 3010 sent by the smartphone 19 over P1 2910 and intended for the right ear piece 12a is erroneously received (or missed). Since the audio information was not received in the right ear piece 12a, this ear piece will not send an ARX packet over P2 2920. Nor is an ACK sent by right ear piece 12a. The smartphone 19 continues by sending packet A 3011 to the left ear piece 12b over P3 2930. This transmission is successfully received and an ARX packet 652 over P2 2920 is sent by left ear piece 12b to the right ear piece 12a. Furthermore, the packet A 3011 reception is acknowledged to the phone 19 by sending ACK packet 3032 over P3 2930. After receiving ARX packet 652, right ear piece 12a will request forwarding of packet A, starting with sending an RQA packet 721 to left ear piece 12b over piconet P2 2920. The left ear piece 12b will start forwarding in a similar fashion as described and shown for FIG. 7 (these details on the forwarding protocol are not shown in FIG. 31).

Since the phone has received an ACK packet 3032 for the reception of packet A 3011, it is aware that the audio information in packet A is present in at least one of the ear pieces 12a, 12b. Therefore, it will not initiate a retransmission; instead it will rely on forwarding between the ear pieces 12. The phone 19 will send the next packet in its transmit buffer, i.e., packet B 3012.

Figure 32:
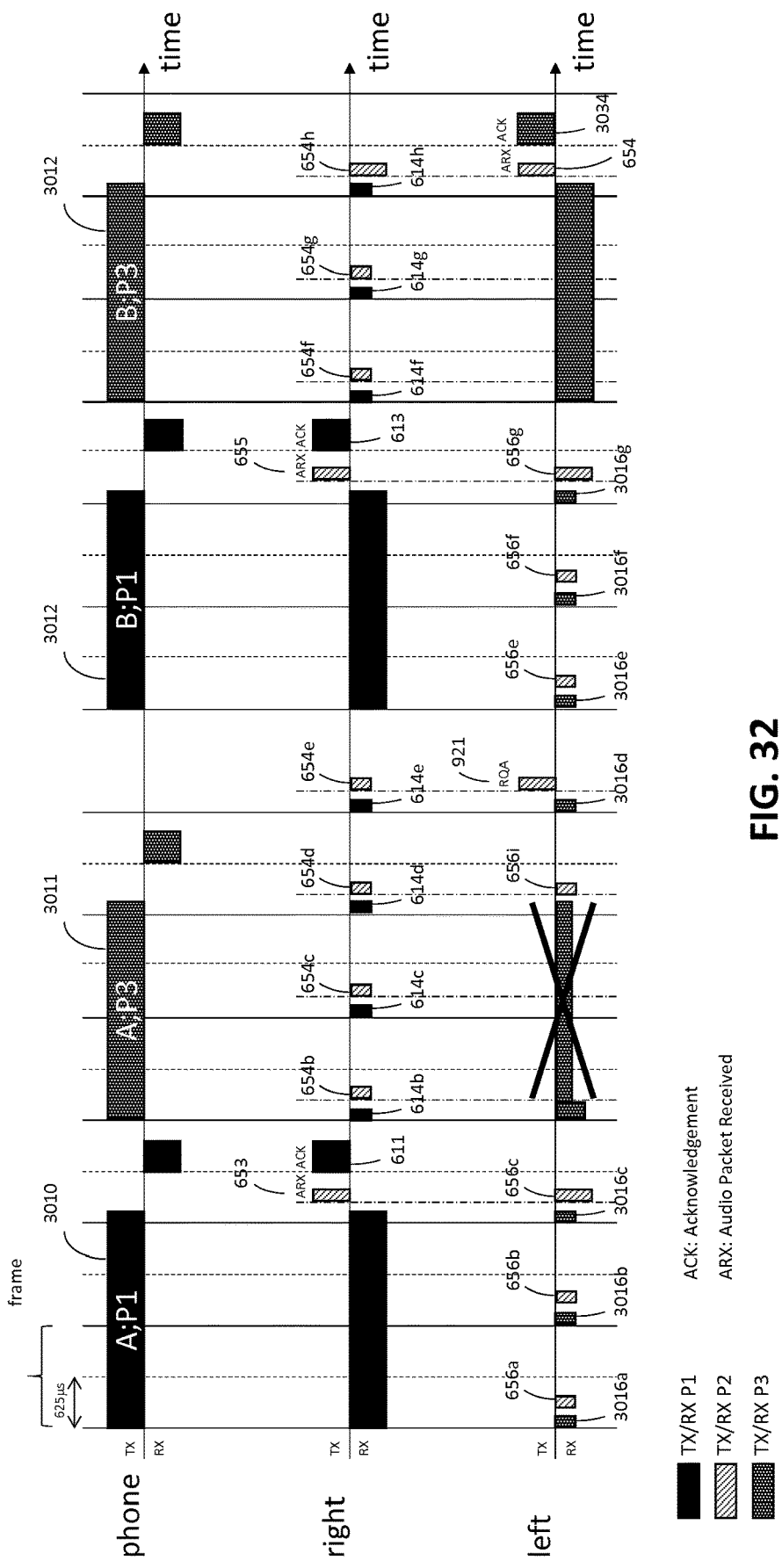
FIG. 32 is a third data flow and timing diagram of a fifth communication protocol showing a missed reception by the secondary ear piece.

In diagram 3200 of FIG. 32, a similar situation as described above is shown, but now the left ear piece 12*b* receives the packet transmission erroneously (or misses it). The transmission on P1 2910 to the right ear piece 12*a* is successful, and the right ear piece 12*a* informs the left ear piece 12*b* via e2e link P2 2920 that left audio information is present in the right ear piece 12*a*, using ARX packet 653. Thereafter, an ACK packet 611 is sent on P1 2910 to the phone to acknowledge the successful reception of packet A 3010 in right ear piece 12*a*.

After the transmission of packet 3010 to the right ear piece 12*a*, the smartphone 19 sends a packet 3011 with the same (left and right) audio information on piconet P3 2930 to the left ear piece 12*b*. This packet is received erroneously in left ear piece 12*b*. The left ear piece 12*b* will, therefore, not send an ARX packet on P2 2920 nor an ACK packet on P1 2910. But since ARX packet 653 was sent by the right ear piece 12*a* on P1 2910, left ear piece 12*b* knows the audio information is present in the right ear piece 12*a* and will send an RQA packet 921 to request a forwarding of the audio data. The forwarding is not further visualized in FIG. 32 but is similar to the procedure shown in FIG. 9.

Although the phone 19 has not received an ACK packet from the left ear piece 12*b* in response to the transmission of packet A 3011, it will not retransmit the audio data embedded in packet A 3011. It has received an ACK packet 611 for the reception of packet A 3011, and is aware that the audio information in packet A is present in at least one of the ear pieces 12*a*, 12*b*. Therefore, it will not initiate a retransmission; instead it will rely on forwarding between the ear pieces 12. The phone 19 will send the next packet in its transmit buffer, i.e., packet B 3012.

Figure 33:
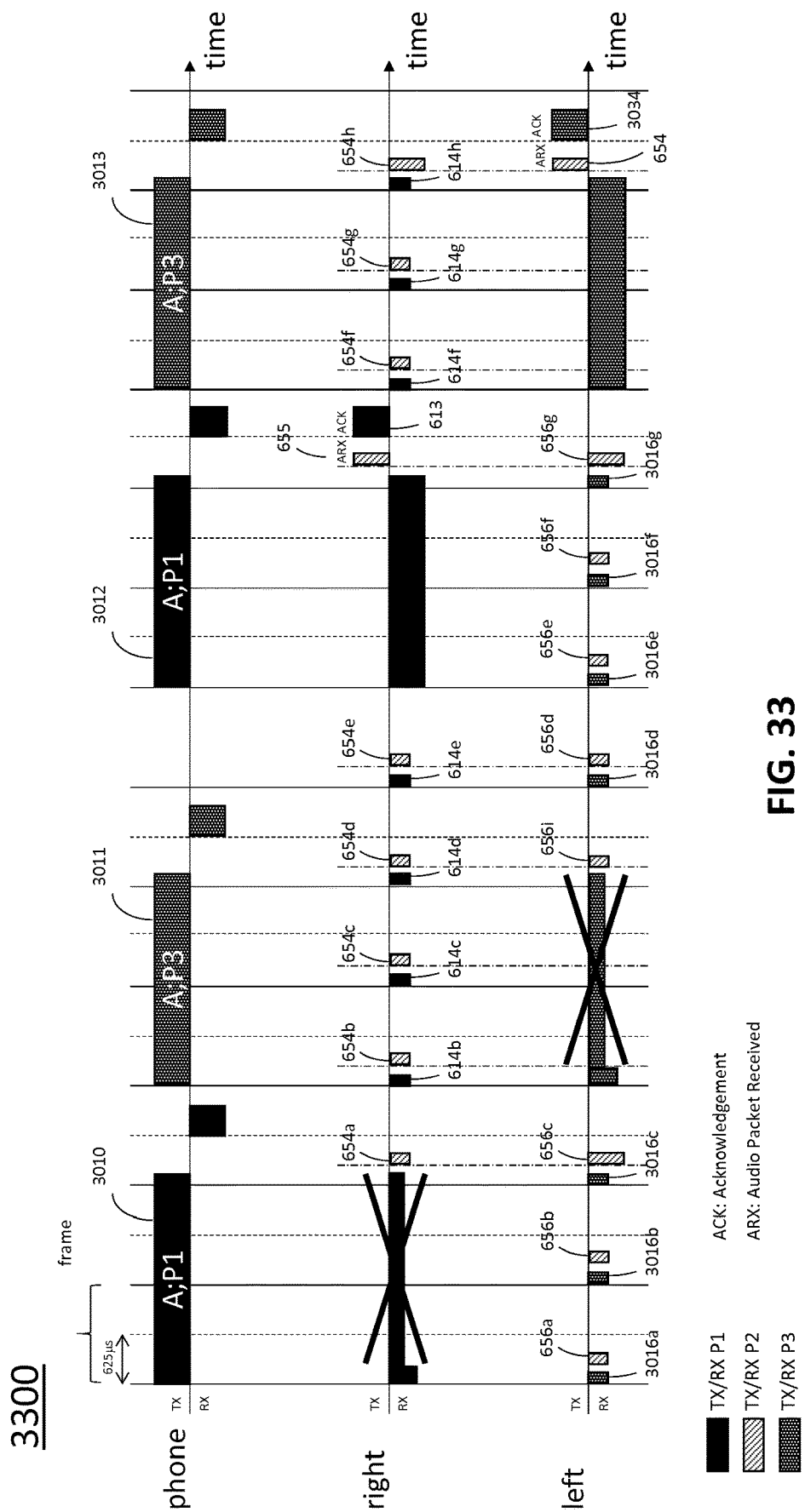
FIG. 33 is a fourth data flow and timing diagram of a fifth communication protocol showing a missed reception by both ear pieces.

FIG. 33 shows a third data flow and timing diagram 3300 of a communication protocol providing diversity in the 3-piconet embodiment of FIG. 29. In this figure, both packets A 3010 and 3011 sent on piconet P1 2910 and piconet P3 2930, respectively, are received in error. No ACK or ARX packets are sent by the ear pieces 12. As a result, the phone 19 will initiate retransmissions to both ear pieces 12. Packets 3012 and 3013 are retransmissions of the audio information contained in packets 3010 and 3011, sent on piconet P1 2910 and piconet P3 2930, respectively.

If the e2e link P2 2920 is not a radio link that operates in the same frequency band as P1 2910 and P3 2930, or if P2 2920 does not use radio at all but another technology such as magnetic communications, no timing multiplexing is required. That is, communications on P2 2920 may happen simultaneously with communications on P1 2910 or P3 2930. The exchange of ARX packets and possibly forwarding packets will be loosely coupled to the events happening in P1 2910 and P3 2930, and will follow the same procedures are shown in FIGS. 15 and 16 for embodiment 500.

Figure 34:
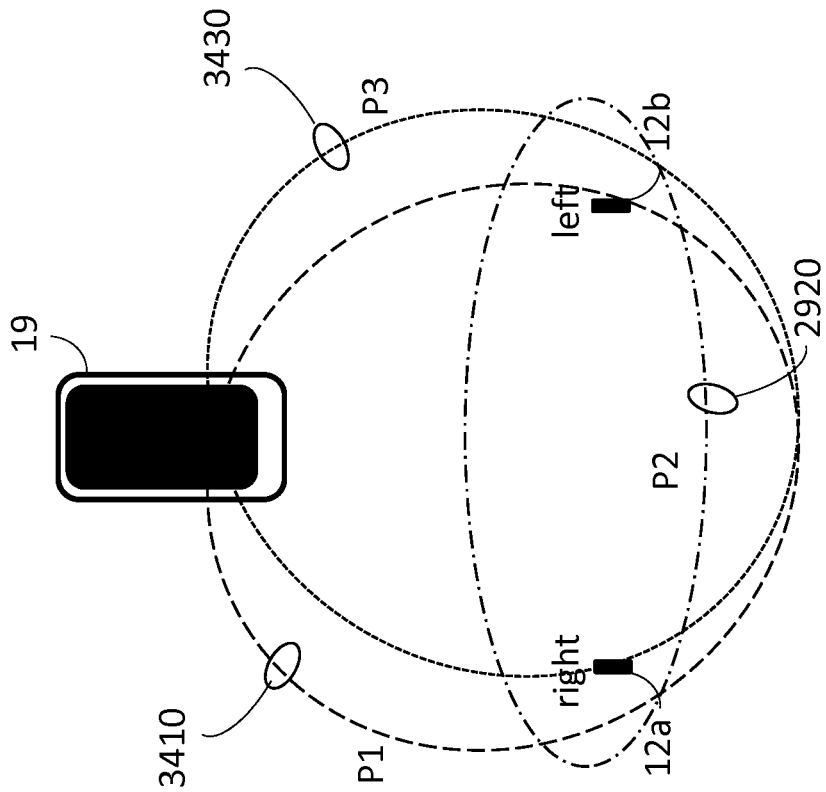
FIG. 34 shows a second embodiment with three Bluetooth® piconets.

Finally, in FIG. 34, a configuration 3400 is shown which combines the features of configuration 500 in FIG. 5A and configuration 2900 in FIG. 29. The configuration in 3400 has three piconets, similar to the configuration 2900 in FIG. 29: a first piconet P1 3410 connects the smartphone 19 and the right ear piece 12*a*, a second piconet P2 2920 connects the right and left ear pieces 12*a*, 12*b* (i.e., is an e2e channel), and a third piconet P3 3430 connects the smartphone 19 and the left ear piece 12*b*. However, different from the configuration 2900 in FIG. 29, the links P1 and P3 do not carry the same audio information. In the configuration of 2900, the same left and right audio information is sent to the left and right ear piece 12*a*, 12*b* on separate piconets. In the configuration 3400, only right audio information is sent to the right ear piece 12*a*, and only left audio information is sent to the left ear piece 12*b*. For diversity, both left and right audio information should be present in both ear pieces 12. For this, the concept of configuration 500 is used where the left ear piece 12*b* receives packets sent by smartphone 19 on P1 intended for the right ear piece 12*a*. More particularly, the left ear piece 12*b* will receive the left audio information while listening on piconet P1 3410 and will receive the right audio information while listening on piconet P3 3430. In a similar fashion, the right ear piece 12*a* will receive the left audio information while listening on piconet P1 3410 and will receive the right audio information while listening on piconet P3 3430.

Figure 35:
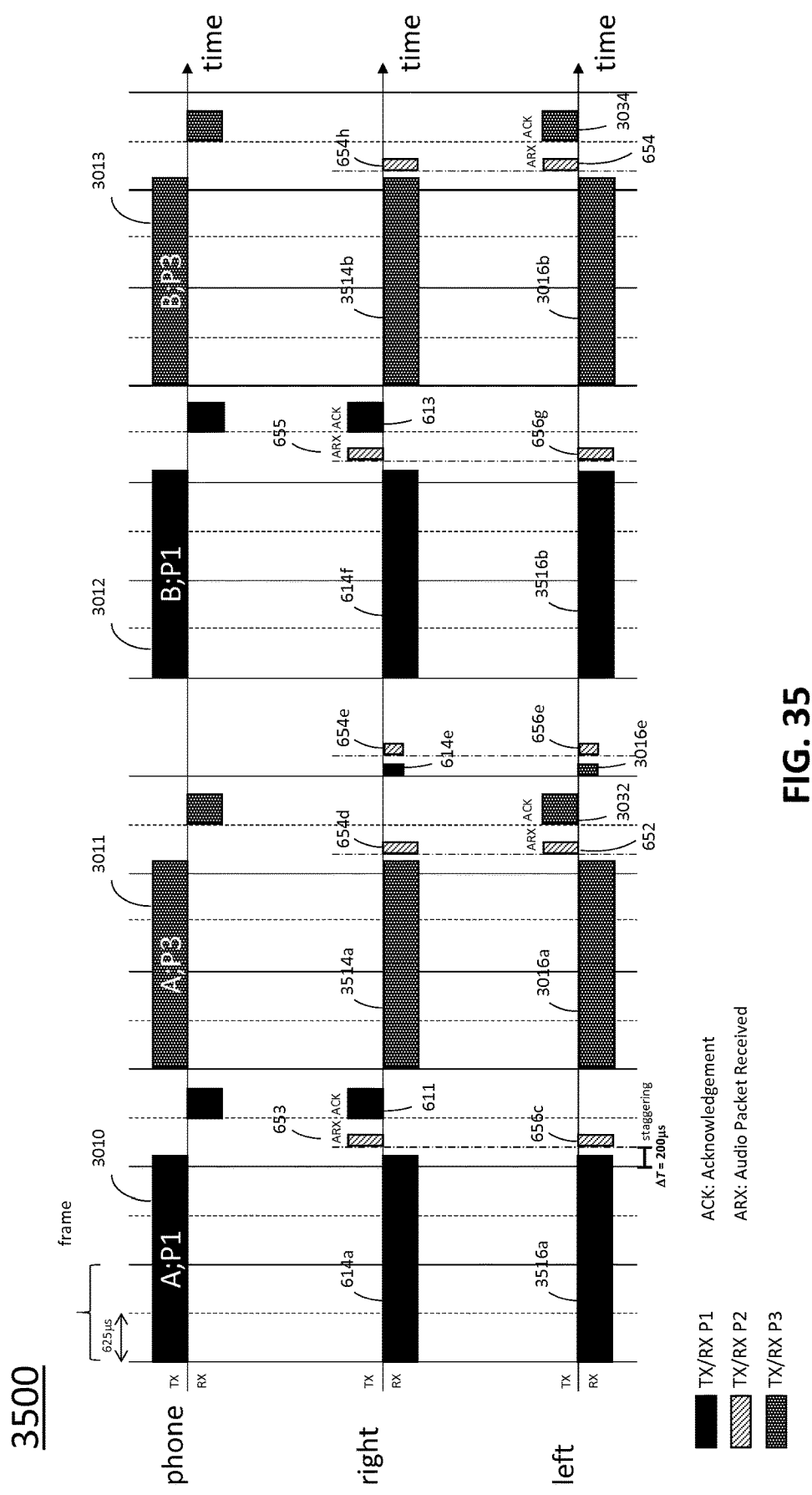
FIG. 35 is a first data flow and timing diagram of a sixth communication protocol showing successful operation.

An example is shown in the dataflow and timing diagram 3500 of FIG. 35. Packet 3010 containing right audio information is sent by phone 19 to right ear piece 12*a* over first piconet P1 3410. The packet is received by right ear piece 12*a* in scan window 614*a*. Simultaneously, left ear piece 12*b* listens to first piconet P1 3410 during scan window 3516*a*. On successful reception of the right audio information, right ear piece 12*a* sends an ARX packet 653 over second piconet P2 2920 to inform the left ear piece 12*b* that it has received the right audio information successfully. Thereafter, right ear piece 12*a* sends an ACK packet 611 on first piconet P1 3410 to acknowledge the packet reception to phone 19. Likewise, packet 3011 containing left audio information is sent by phone 19 to left ear piece 12*b* over third piconet P3 3430, which is also received by the right ear piece 12*a* at scan window 3514*a*. On successful reception of the left audio information, left ear piece 12*b* sends an ARX packet 652 via second piconet P2 2920 to inform the right ear piece 12*a* that it has received the left audio information successfully. Thereafter, left ear piece 12*b* sends an ACK packet 3032 on third piconet P3 3430 to acknowledge the packet reception to phone 19.

Preferably, ARX packet 652 should indicate not only that the left audio information has been received by the left ear piece 12*b* successfully (packet 3011), but also that the right audio information has been received by the left ear piece 12*b* in a previous transmission (i.e., packet 3010). Likewise, the ARX packet sent by the right ear piece 12*a* preferably includes information about successful reception of the right and left audio information. In particular, ARX packet 655 could include the information of successful reception of right audio information sent in packet 3012 and successful reception of left audio information sent in packet 3011. In an alternative embodiment, an additional ARX packet (not shown) could be sent by right ear piece 12*a* over piconet P2 2920 on position 654*e* to inform the left ear piece 12*b* that the left audio information sent in packet 3011 was successfully received in right ear piece 12*a*. This latter embodiment is preferable when the audio information contains music, which is asynchronous and may include a long delay between packets 3011 and 3012. On the other hand, the first embodiment is preferable when the audio information contains voice, where the delay between packets is at least limited by the eSCO interval.

Figure 36:
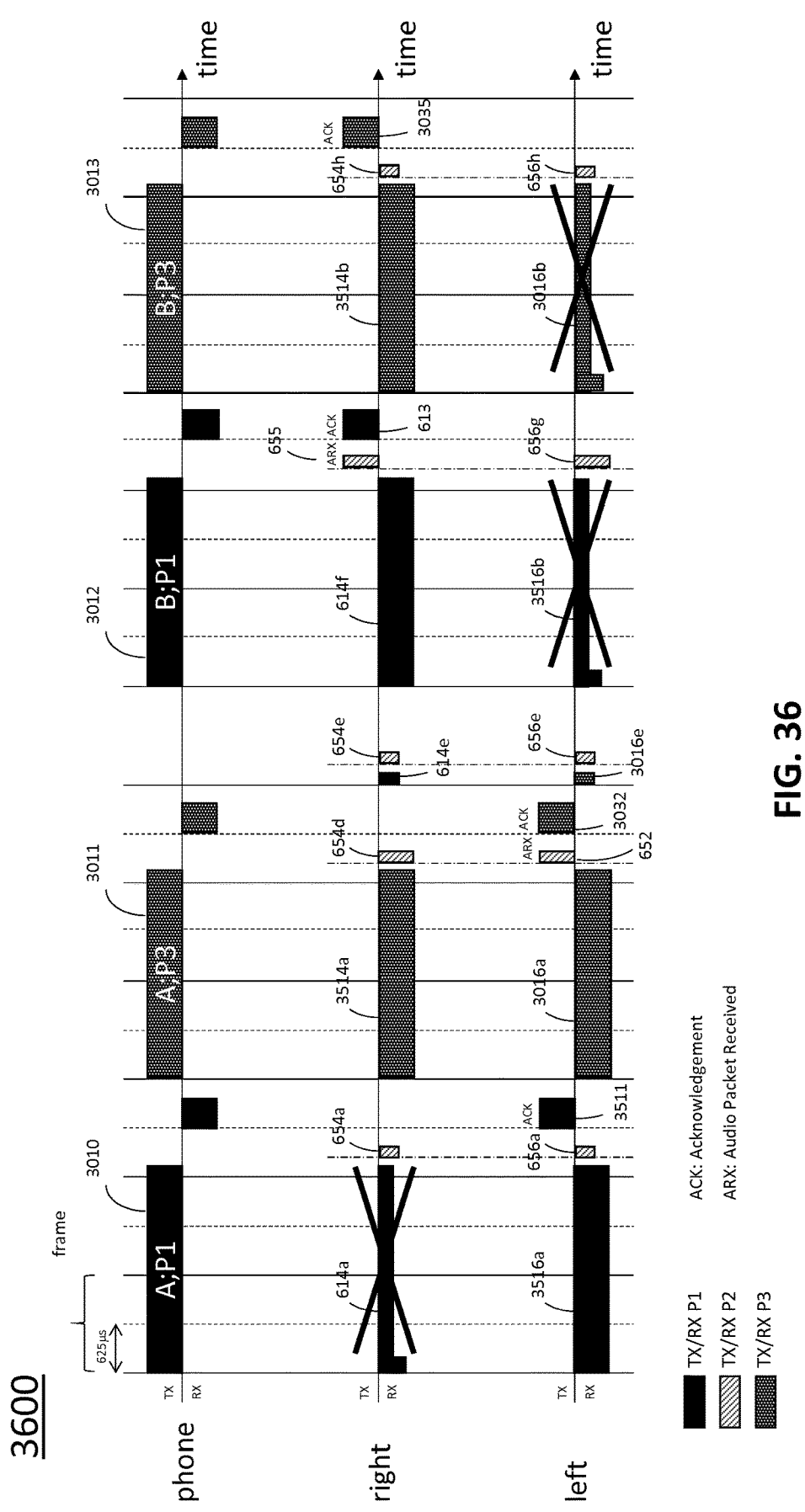
FIG. 36 is a second data flow and timing diagram of a sixth communication protocol showing missed receptions by both ear pieces.

An example when downlink errors are experienced on the piconet links is shown in the dataflow and timing diagram 3600 of FIG. 36. First, the packet 3010 sent to the right ear piece 12*a* in scan window 614*a* is received erroneously (or missed). An ARX packet, such as 653 of FIG. 35, is therefore not sent by right ear piece 12*a* on second piconet P2 2920 at position 654*a*. Because left ear piece 12*b* received packet 3010 successfully and it did not receive an ARX packet from right ear piece 12*a*, the left ear piece 12*b* will send an ACK packet 3511 on first piconet P1 3410 to acknowledge the reception of packet 3010 to the phone 19. The next packet 3011 is received successfully by both ear pieces 12, and the ARX packet 652 includes information about the successful reception of packet 3010 (in scan window 3516*a*) and of packet 3011 (in scan window 3016*a*). In response, right ear piece 12*a* will ask for a forwarding of the audio information of packet 3010 sending an RQA packet over second piconet P2 2920. This request and forwarding are not shown, but follow the same procedures as described before. Packets 3012 and 3013 are both successfully received in right ear piece 12*a* and both erroneously received in left ear piece 12*b*. Right ear piece 12*a* sends an ACK 613 on first piconet P1 3410 to acknowledge the audio information in packet 3012 and sends an ACK 3035 on third piconet P3 3430 to acknowledge the audio information in packet 3013. The latter is sent by right ear piece 12*a* because it did not receive an ARX packet from left ear piece 12*b* over second piconet P2 2920 at scan instance 654*h*. ARX packet 655 sent by right ear piece 12*a* over second piconet P2 2920 informs left ear piece 12*b* that right ear piece 12*a* has successfully received the left audio information sent in packet 3011 and the right audio information sent in packet 3012.

In the embodiment of FIGS. 34-36, each of the first piconet P1 3410 and third piconet P3 3430 may be implemented using the same technology, such an RF wireless communication protocol, such as Bluetooth®. The piconets may be independent, each having separate frequency hopping and other parameters, so long as each ear piece 12*a*, 12*b* is aware of the parameters of both piconets P1 3410, P3 3430, to facilitate monitoring, and possibly sending acknowledgements, on the "other" piconet. In some embodiments, the piconets P1 3410, P3 3430 may be different logical channels of the same Bluetooth® connection.

In the embodiments depicted in FIGS. 35 and 36, the piconets P1 3410 and P3 3430 have the same timing, and share a frame structure. While this facilitates implementation in many cases, it is not required, and is not a limitation of the present invention. In general, the frame timing of piconets P1 3410, P3 3430 may be offset by any arbitrary amount, so long as it is a constant offset (i.e., not sliding). The host device 19 simply "ping-pongs" between sending left and right audio information on the first and third piconets, and the first 12*a* and second 12*b* ear pieces together switch between monitoring the first and third piconets, respectively, with each one sending an acknowledgement on the "other's" piconet only if the other ear piece 12 failed to indicate successful packet reception.

To facilitate mutual monitoring, the frame timing of the second piconet P2 2920 (i.e., the e2e channel) is preferably offset from both the first piconet P1 3410 and the third piconet P3 3430, in embodiments where the second piconet P2 2920 utilizes the same technology and/or protocol. In embodiments where the second piconet P2 2920 is, e.g., a magnetic or wired technology interface, the timing of P2 relative to P1 and P3 is not critical.

Although not explicitly depicted in drawings, the ear pieces 12 in this embodiment exhibit diversity in the uplink as well (transmitting voice audio information from a mic 220 in one or both ear pieces 12 to the host device 19). In one embodiment, the procedure is substantially the same, for each earpiece 12*a*, 12*b*, as that described herein with reference to FIG. 28, with the straightforward difference of an additional third piconet P3 3430, and wherein the roles of the first and second ear pieces 12*a*, 12*b* swap with respect third piconet P3 3430.

Embodiments of the present invention present numerous advantages over the prior art. By exploiting path diversity to obtain audio information missed or erroneously received from a host device, embodiments of the present invention allow the host device to nevertheless be ACK'ed, thus freeing it from repeated retransmissions. This reduces traffic in the host-headset audio channel(s), and preserves battery life in the host device. Several flexible protocols are disclosed, allowing for efficient use of available spectrum for both host-headset and e2e synchronization and communications.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of receiving audio content with uplink diversity by a wireless stereo headset comprising first and second ear pieces, wherein the first ear piece establishes a bidirectional communication channel with a host device over a first wireless communication piconet, characterized by the second ear piece, which is not currently a participant in the first wireless piconet:
    monitoring the first wireless communication piconet for audio content from the host device;
    correctly receiving a first packet of audio content transmitted by the host device on the first wireless communication piconet; and
    in response to not receiving from the first ear piece, over an ear-to-ear (e2e) communication link between the first and second ear pieces, within a predetermined duration after correctly receiving the first packet, an indication that the first ear piece successfully received the first packet, transmitting an acknowledgement of the first packet of audio content to the host device on the first wireless communication piconet.

2. The method of claim 1 further characterized by the second ear piece:
    sending an indication to the first ear piece that the first packet of audio content was received from the host device;
    receiving a request from the first ear piece for audio content from the first packet; and
    sending at least a portion of audio content from the first packet to the first ear piece.

3. The method of claim 2 wherein the e2e communication link is a second communication piconet.

4. The method of claim 3 wherein
    the second communication piconet employs the same technology and protocol as the first wireless communication piconet; and
    communications over the first and second piconets are time division multiplexed.

5. The method of claim 4 wherein both the first and second ear pieces allocate a time division duration to the first wireless communication piconet that includes a predetermined packet transmission starting point, and is of sufficient length to ascertain whether or not the host device is transmitting a packet of audio content.

6. The method of claim 4 further comprising using the same transceiver circuit to communicate over the first and second piconets.

7. The method of claim 1 wherein the first wireless communication piconet comprises a radio frequency (RF) communication channel.

8. The method of claim 1 wherein the e2e communication link comprises a Near Field Magnetic Induction (NFMI) communication channel.

9. The method of claim 1 wherein the e2e communication link comprises a wired connection to the second ear piece.

10. The method of claim 1 wherein the audio content comprises voice content, and further characterized by the second ear piece:
in response to not receiving from the first ear piece an indication that the first ear piece successfully received the first packet, transmitting a second packet of voice content picked up in the headset to the host device.

11. The method of claim 10 wherein transmitting an acknowledgement to the host device comprises transmitting the acknowledgement in a header of the second packet.

12. The method of claim 10 wherein the voice content picked up in the headset comprises at least partially voice content picked up by a microphone in the first ear piece, and further characterized by the second ear piece receiving voice content from the first ear piece prior to the second ear piece correctly receiving the first packet of voice content transmitted by the host device.

13. The method of claim 10 further characterized by, in response to the host device indicating that it did not correctly receive the second packet transmitted by the second ear piece on the first wireless communication piconet:
the first ear piece sending to the second ear piece an indication that it will retransmit the second packet of voice content; and
the first ear piece retransmitting the second packet of voice content picked up in the headset to the host device on the first wireless communication piconet.

14. The method of claim 10 further comprising, in response to the host device indicating that it did not correctly receive the second packet transmitted by the second ear piece on the first wireless communication piconet and further in response to the first ear piece not indicating to the second ear piece that it will retransmit the second packet of voice content:
the second ear piece retransmitting the second packet of voice content picked up in the headset to the host device on the first wireless communication piconet.

15. The method of claim 1 wherein the second ear piece establishes a bidirectional communication channel with a host device over a third wireless communication piconet, further characterized by the first ear piece:
monitoring the third wireless communication piconet for audio content from the host device;
correctly receiving a second packet of audio content transmitted by the host device on the third wireless communication piconet; and
in response to not receiving from the second ear piece, within a predetermined duration after the second packet, an indication that the second ear piece successfully received the second packet, transmitting an acknowledgement of the second packet of audio content to the host device on the third wireless communication piconet.

16. The method of claim 15 further characterized by the first ear piece:

sending an indication to the second ear piece that the second packet of audio content was received from the host device;
receiving a request from the second ear piece for audio content from the first packet; and
sending at least a portion of audio content from the second packet to the second ear piece.

17. The method of claim 15 wherein:
the first packet, sent to the first ear piece on the first wireless communication piconet, includes only one of left or right audio information;
the second packet, sent to the second ear piece on the third wireless communication piconet, includes only the other of left or right audio information; and
the host device retransmits a packet, on the piconet on which the packet was transmitted, in response to not receiving an acknowledgement .

18. The method of claim 15 wherein the audio content comprises voice content, and further characterized by the first ear piece:
in response to not receiving from the second ear piece an indication that the second ear piece successfully received the first packet, transmitting a second packet of voice content picked up in the headset to the host device.

19. A wireless stereo headset comprising first and second ear pieces, wherein the first ear piece establishes a bidirectional communication channel with a host device over a first wireless communication piconet, characterized by:
a first transceiver in the second ear piece, which is not currently a participant in the first wireless piconet, adapted to:
monitor the first wireless communication piconet, for audio content from the host device;
correctly receive a first packet of audio content from the host device on the first wireless communication piconet, and
in response to not receiving from the first ear piece, over an ear-to-ear (e2e) communication link between the first and second ear pieces, within a predetermined duration after correctly receiving the first packet, an indication that the first ear piece successfully received the first packet, transmit an acknowledgement of the first packet of audio content to the host device on the first wireless communication piconet.

20. The headset of claim 19 further characterized by a second transceiver functionality in the second ear piece adapted to:
send an indication to the first ear piece that the first packet of audio content was received from the host device;
receive a request from the first ear piece for audio content from the first packet; and
send at least a portion of audio content from the first packet to the first ear piece.

21. The headset of claim 19 wherein the first transceiver comprises a radio frequency (RF) transceiver.

22. The headset of claim 19 wherein the e2e communication link is a second communication piconet.

23. The headset of claim 22 wherein
the second transceiver functionality is implemented by the first transceiver using the same protocol as the first wireless communication piconet; and
communications over the first and second piconets are time division multiplexed.

24. The headset of claim 23 wherein transceivers in both the first and second ear pieces are adapted to allocate a time division duration to the first wireless communication piconet that includes a predetermined packet transmission starting point, and is of sufficient length to ascertain whether or not the host device is transmitting a packet of audio content.

25. The headset of claim 22 wherein the second transceiver functionality is implemented by a second transceiver comprising a Near Field Magnetic Induction (NFMI) transceiver.

26. The headset of claim 22 wherein the second transceiver functionality is implemented by a modem implementing a wired connection between the first and second ear pieces.

27. The headset of claim 19 wherein the audio content comprises voice content, and further characterized by the first transceiver in the second ear piece being adapted to:
   in response to not receiving from the first ear piece an indication that the first ear piece successfully received the first packet, transmitting a second packet of voice content picked up in the headset to the host device.

28. The headset of claim 27 wherein transmitting an acknowledgement to the host device comprise transmitting the acknowledgement in a header of the second packet.

29. The headset of claim 27 wherein the voice content picked up in the headset comprises at least partially voice content picked up by a microphone in the first ear piece, and further characterized by the second ear piece receiving voice content from the first ear piece prior to the second ear piece correctly receiving the first packet of voice content transmitted by the host device.

30. The headset of claim 27 further characterized by, in response to the host device indicating that it did not correctly receive the second packet transmitted by the second ear piece on the first wireless communication piconet:
   a second transceiver functionality in the first ear piece sending to the second transceiver functionality in the second ear piece an indication that the first ear piece will retransmit the second packet of voice content; and
   a first transceiver in the first ear piece retransmitting the second packet of voice content picked up in the headset to the host device on the first wireless communication piconet.

31. The headset of claim 27 further comprising, in response to the host device indicating that it did not correctly receive the second packet transmitted by the second ear piece on the first wireless communication piconet and further in response to the first ear piece not indicating to the second ear piece that it will retransmit the second packet of voice content:
   the first transceiver in the second ear piece retransmitting the second packet of voice content picked up in the headset to the host device on the first wireless communication piconet.

32. The headset of claim 19 wherein the second ear piece establishes a bidirectional communication channel with a host device over a third wireless communication piconet, further characterized by the first ear piece:
   a first transceiver in the first ear piece adapted to:
      monitor the third wireless communication piconet for audio content from the host device;
      correctly receive a second packet of audio content transmitted by the host device on the third wireless communication piconet; and
      in response to not receiving from the second ear piece, within a predetermined duration after the second packet, an indication that the second ear piece successfully received the second packet, transmit an acknowledgement of the second packet of audio content to the host device on the third wireless communication piconet.

33. The headset of claim 32 wherein:
   the first packet, sent to the first ear piece on the first wireless communication piconet, includes only one of left or right audio information;
   the second packet, sent to the second ear piece on the third wireless communication piconet, includes only the other of left or right audio information; and
   the host device retransmits a packet, on the piconet on which the packet was transmitted, in response to not receiving an acknowledgement.

34. The headset of claim 32 wherein the audio content comprises voice content, and further characterized by the first transceiver in the first ear piece being adapted to:
   in response to not receiving from the second ear piece an indication that the second ear piece successfully received the first packet, transmit a second packet of voice content picked up in the headset to the host device.

* * * * *